(12) United States Patent
Shinohara

(10) Patent No.: US 8,542,448 B2
(45) Date of Patent: Sep. 24, 2013

(54) IMAGING LENS, IMAGING APPARATUS AND PORTABLE TERMINAL DEVICE

(71) Applicant: FUJIFILM Corporation, Tokyo (JP)

(72) Inventor: Yoshikazu Shinohara, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/682,451

(22) Filed: Nov. 20, 2012

(65) Prior Publication Data

US 2013/0113976 A1 May 9, 2013

Related U.S. Application Data

(63) Continuation of application No. 12/755,020, filed on Apr. 6, 2010, now Pat. No. 8,334,922.

(30) Foreign Application Priority Data

Apr. 7, 2009 (JP) ................................ 2009-093137
Mar. 23, 2010 (JP) ................................ 2010-065646

(51) Int. Cl.
*G02B 3/02* (2006.01)
*G02B 9/60* (2006.01)
*H04N 5/225* (2006.01)

(52) U.S. Cl.
USPC ........................... 359/714; 359/764; 348/340

(58) Field of Classification Search
USPC ................. 348/335, 340; 359/713, 714, 756, 359/757, 763, 764
See application file for complete search history.

(56) References Cited

U.S. PATENT DOCUMENTS

| 7,502,181 | B2 | 3/2009 | Shinohara |
| 7,710,665 | B2 | 5/2010 | Park et al. |
| 7,864,454 | B1 | 1/2011 | Tang et al. |
| 8,334,922 | B2* | 12/2012 | Shinohara ............ 348/340 |
| 2007/0229984 | A1 | 10/2007 | Shinohara |
| 2007/0236811 | A1 | 10/2007 | Mori |
| 2010/0134904 | A1 | 6/2010 | Tsai |
| 2010/0214467 | A1 | 8/2010 | Ohtsu |
| 2010/0220229 | A1 | 9/2010 | Sano |
| 2010/0254029 | A1 | 10/2010 | Shinohara |
| 2011/0013069 | A1 | 1/2011 | Chen |
| 2011/0134305 | A1 | 6/2011 | Sano et al. |

FOREIGN PATENT DOCUMENTS

| JP | 3788133 B2 | 6/2006 |
| JP | 2007-264180 A | 10/2007 |
| JP | 2007-279282 A | 10/2007 |
| WO | 2010/024198 A1 | 3/2010 |

* cited by examiner

*Primary Examiner* — David N Spector
(74) *Attorney, Agent, or Firm* — Birch, Stewart, Kolasch & Birch, LLP.

(57) ABSTRACT

An imaging lens is provided and includes: in order from the object side, a first lens having a positive refractive power; a second lens having a negative refractive power; a third lens having a concave surface on the image side near the optical axis and having a positive refractive power; a fourth lens having a positive refractive power near the optical axis; and a fifth lens having a negative refractive power near the optical axis. An image side surface of the fifth lens is concave near the optical axis and has a region where a negative power of the region decreases toward a periphery of the fifth lens as compared with a negative power near the optical axis.

14 Claims, 34 Drawing Sheets

FIG. 1  EXAMPLE 1
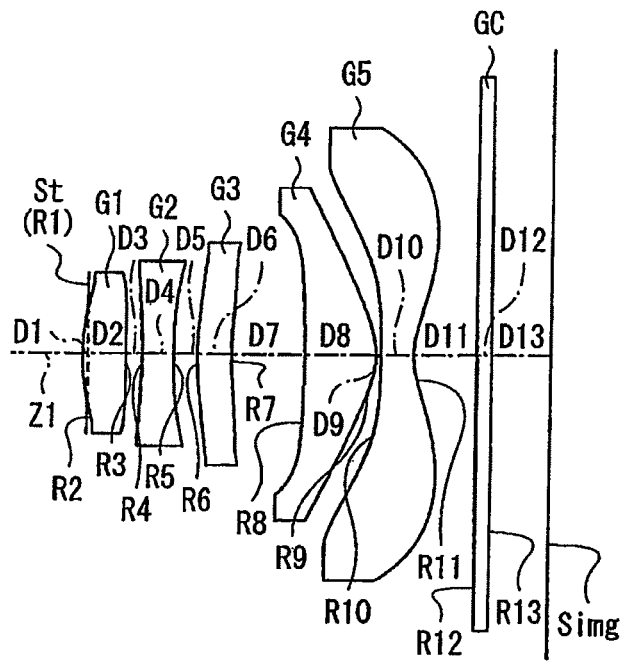
FIG. 2  EXAMPLE 2
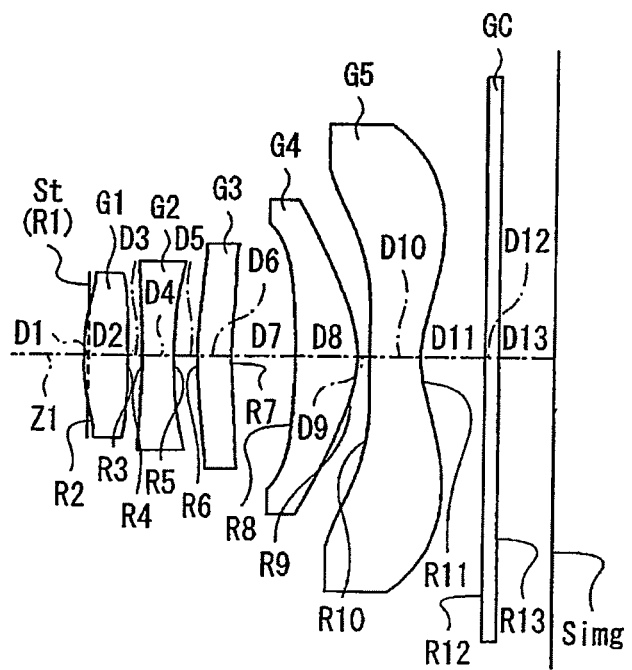

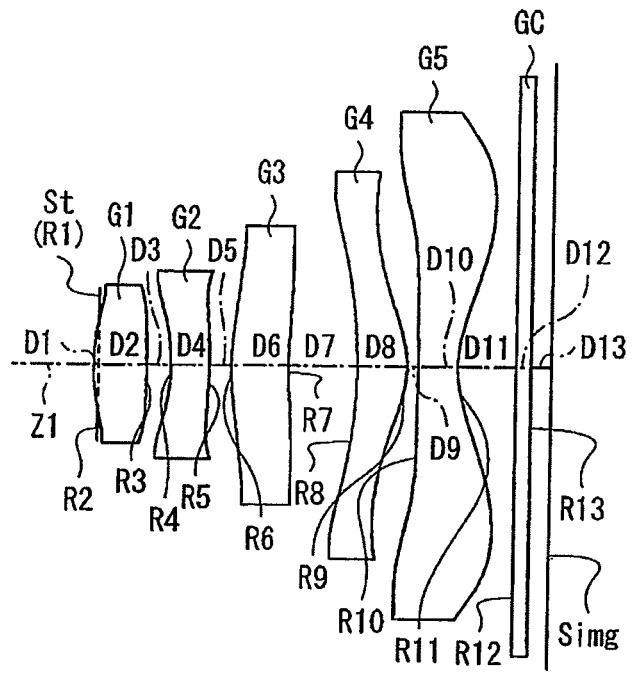
FIG. 3  EXAMPLE 3
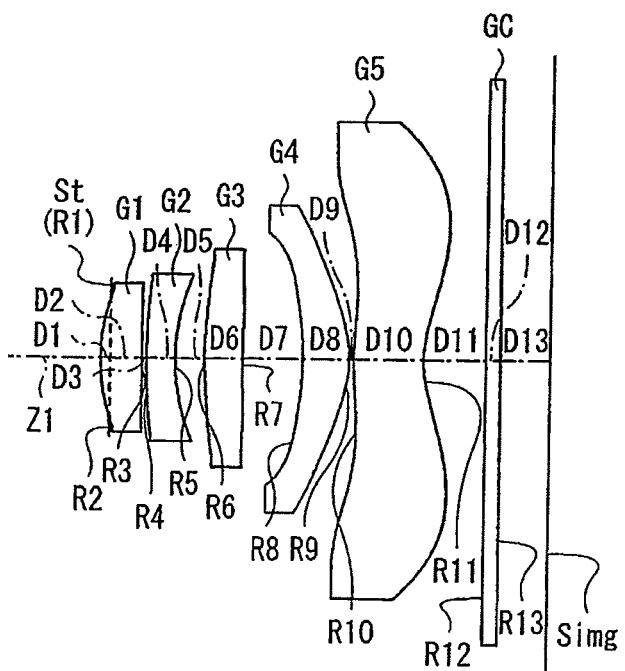
FIG. 4  EXAMPLE 4

FIG. 5    EXAMPLE 5
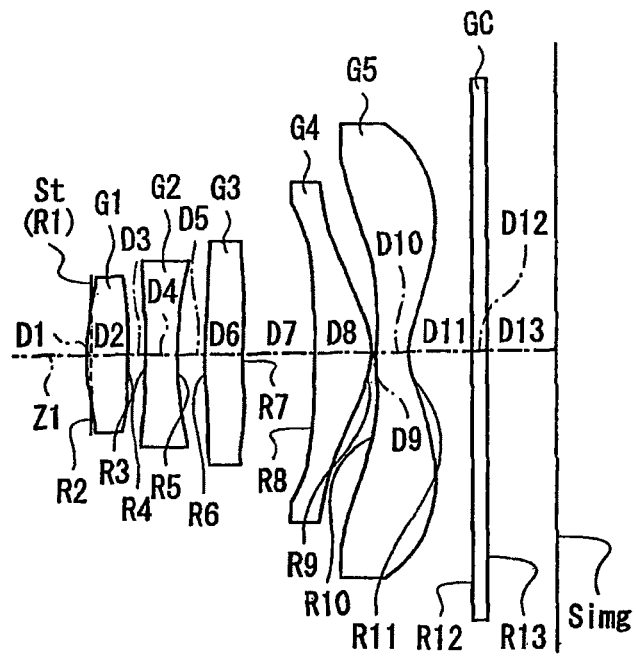
FIG. 6    EXAMPLE 6
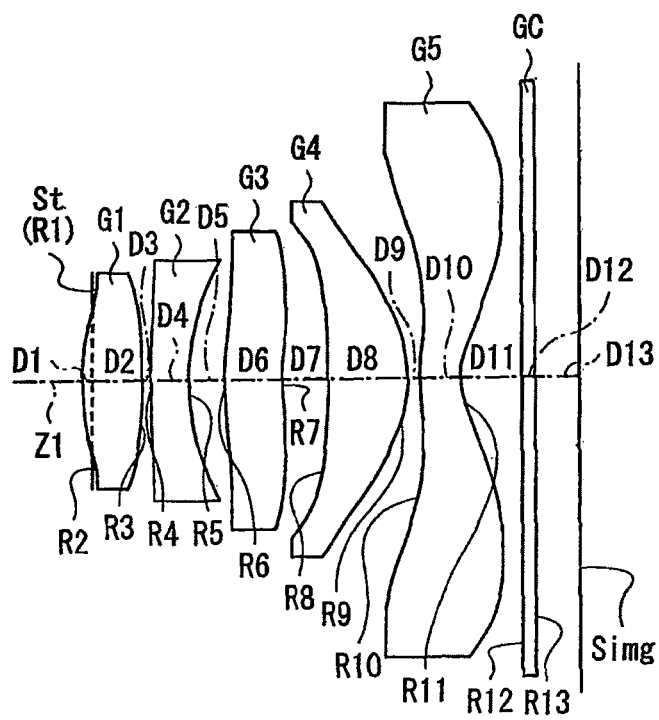

FIG. 7  EXAMPLE 7
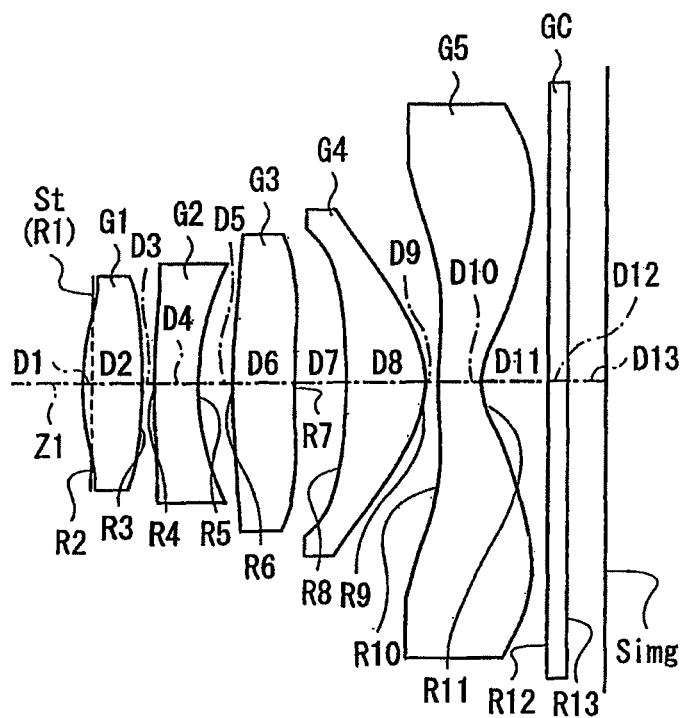
FIG. 8  EXAMPLE 8
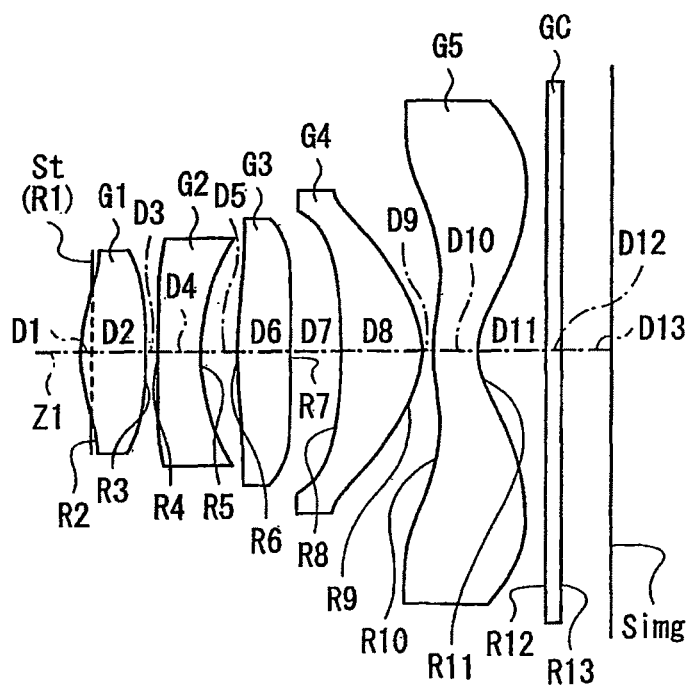

FIG. 9  EXAMPLE 9
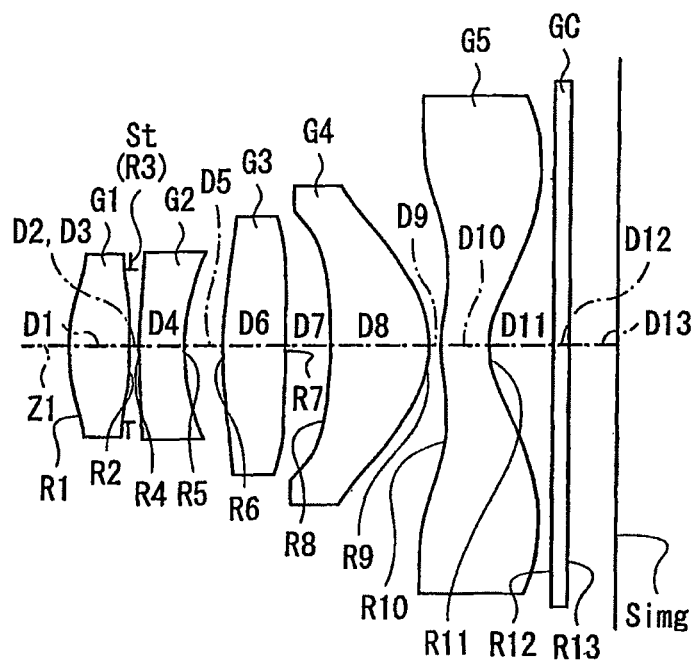
FIG. 10  EXAMPLE 10
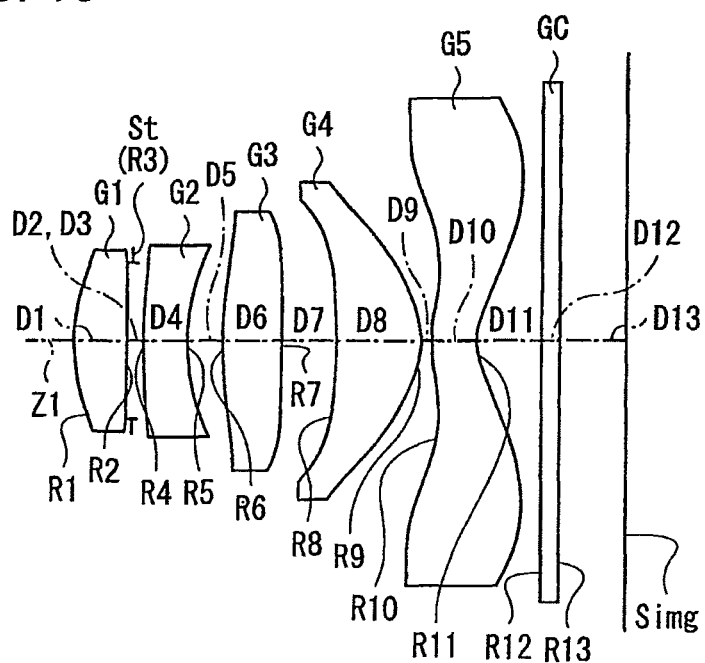

FIG. 11  EXAMPLE 11
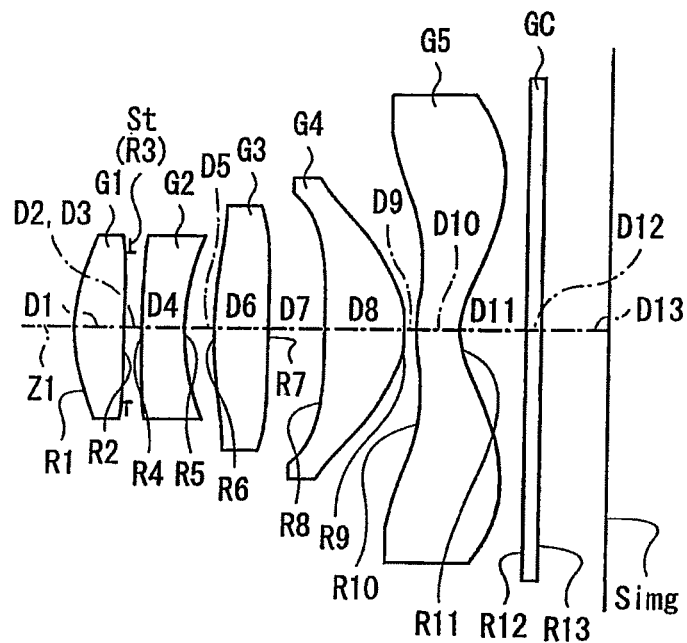
FIG. 12  EXAMPLE 12
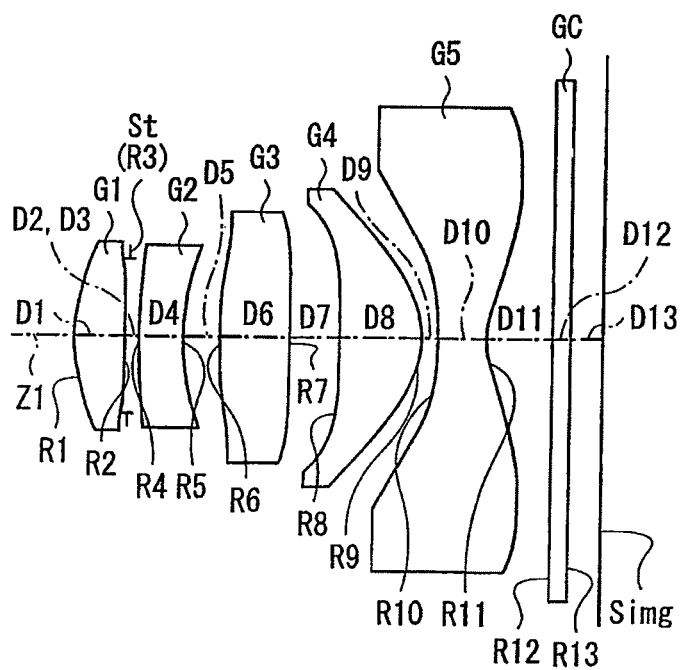

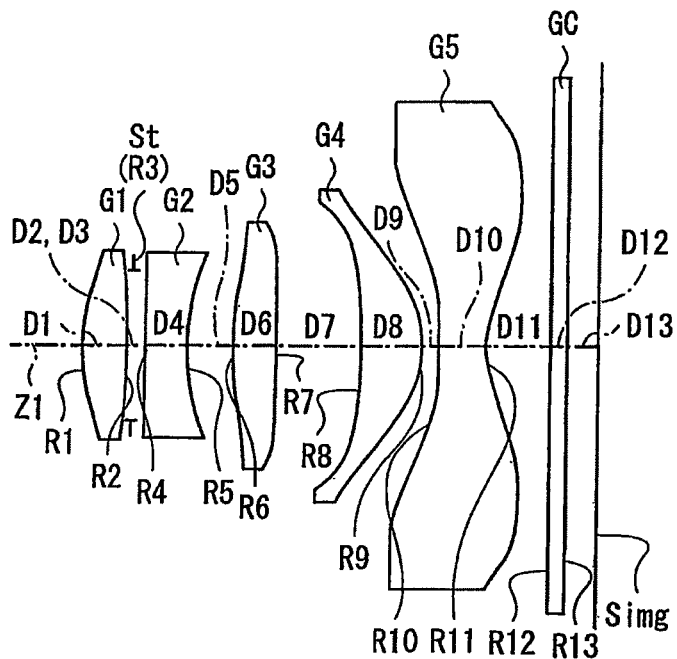
FIG. 13  EXAMPLE 13
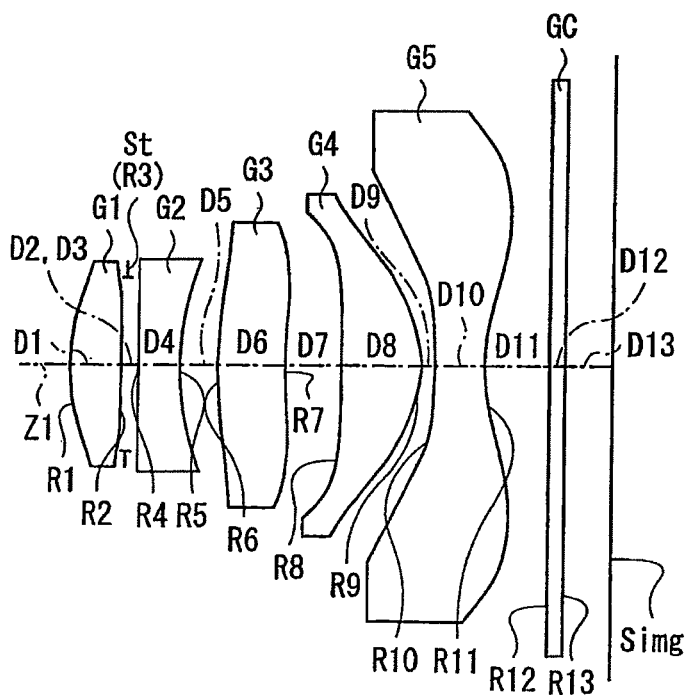
FIG. 14  EXAMPLE 14

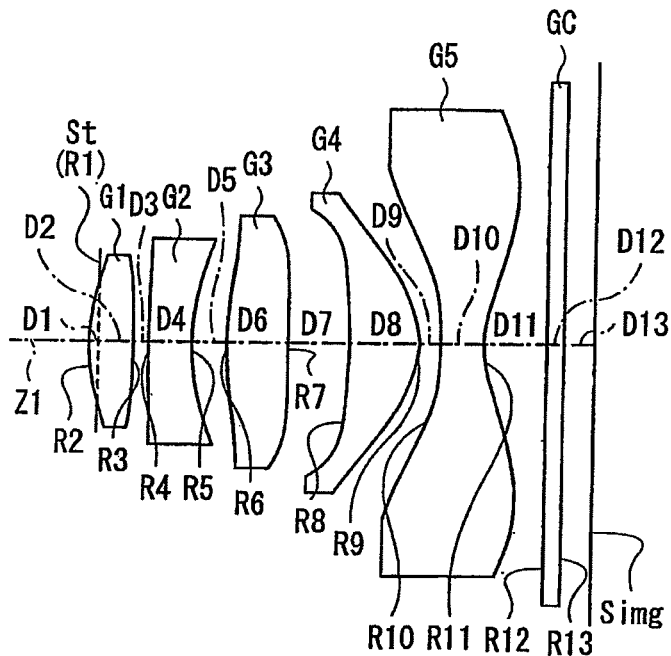
FIG. 15  EXAMPLE 15
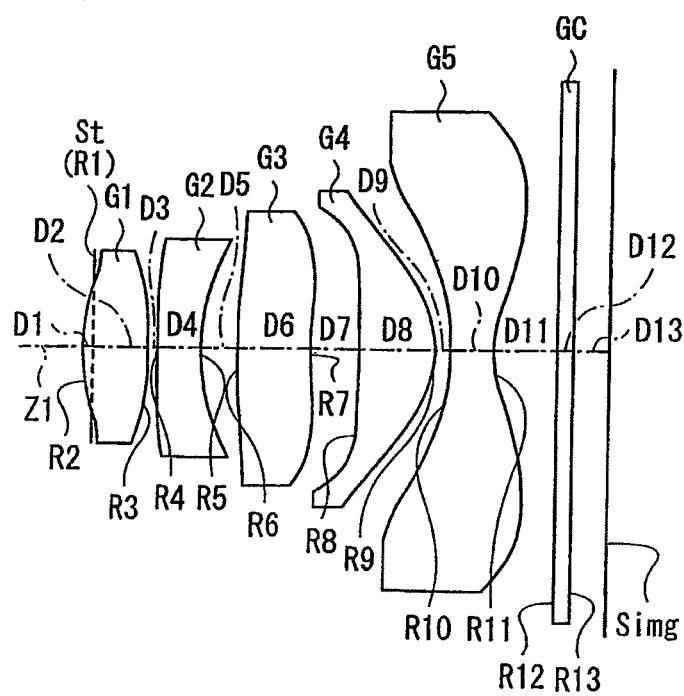
FIG. 16  EXAMPLE 16

FIG. 17    EXAMPLE 17
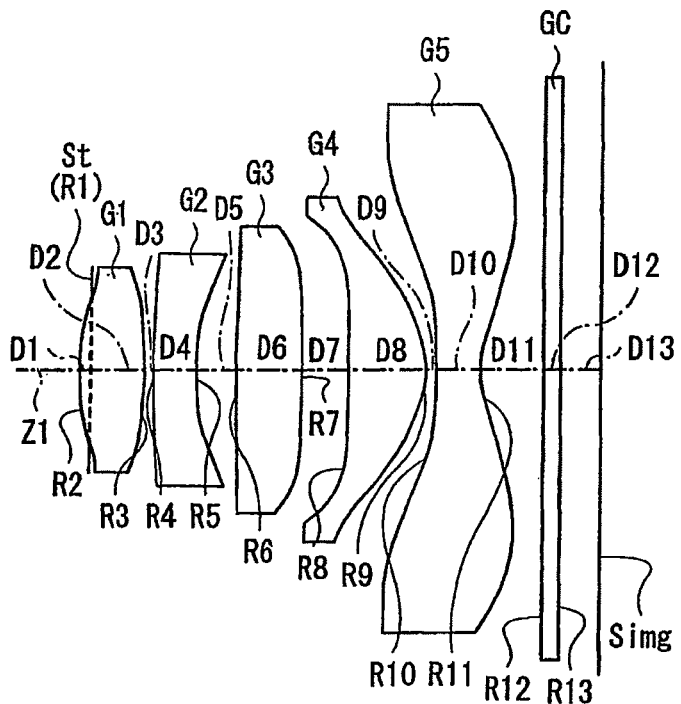
FIG. 18    EXAMPLE 18
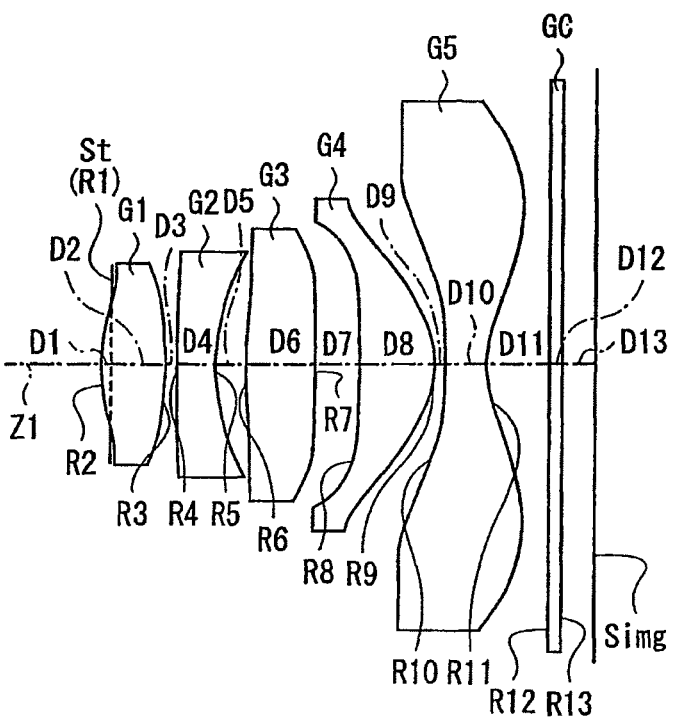

FIG. 19  EXAMPLE 19
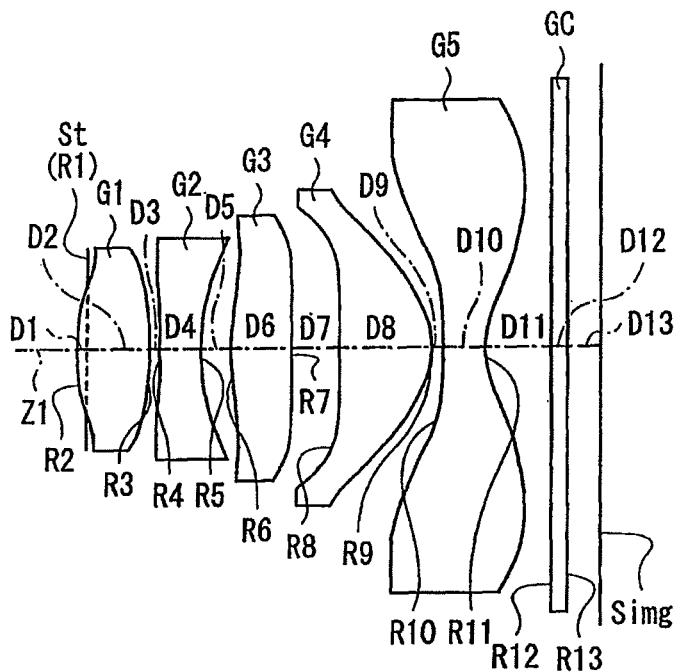
FIG. 20  EXAMPLE 20
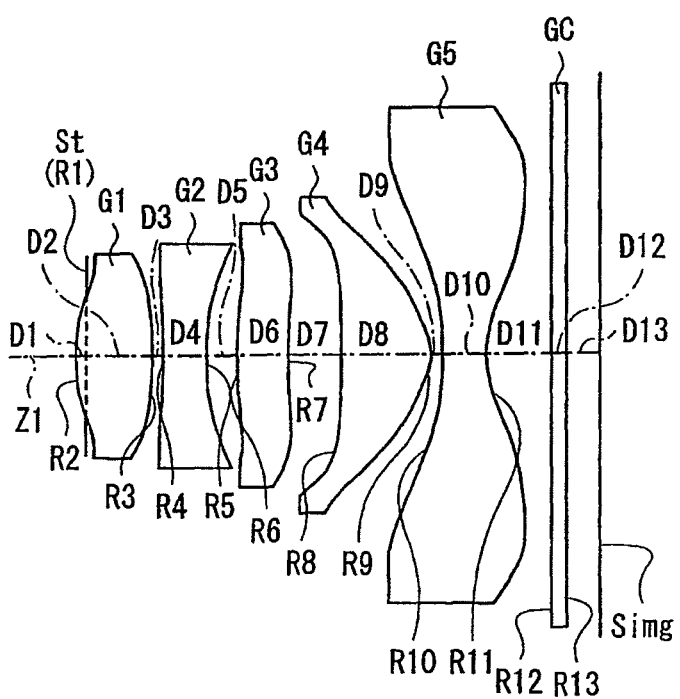

EXAMPLE 21

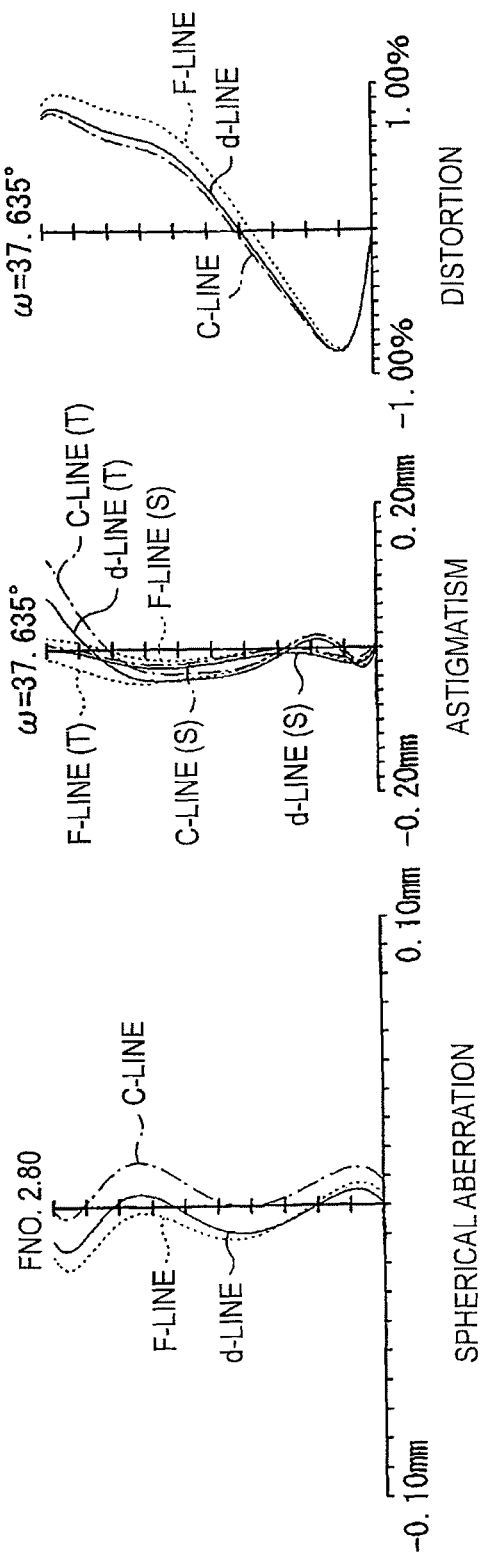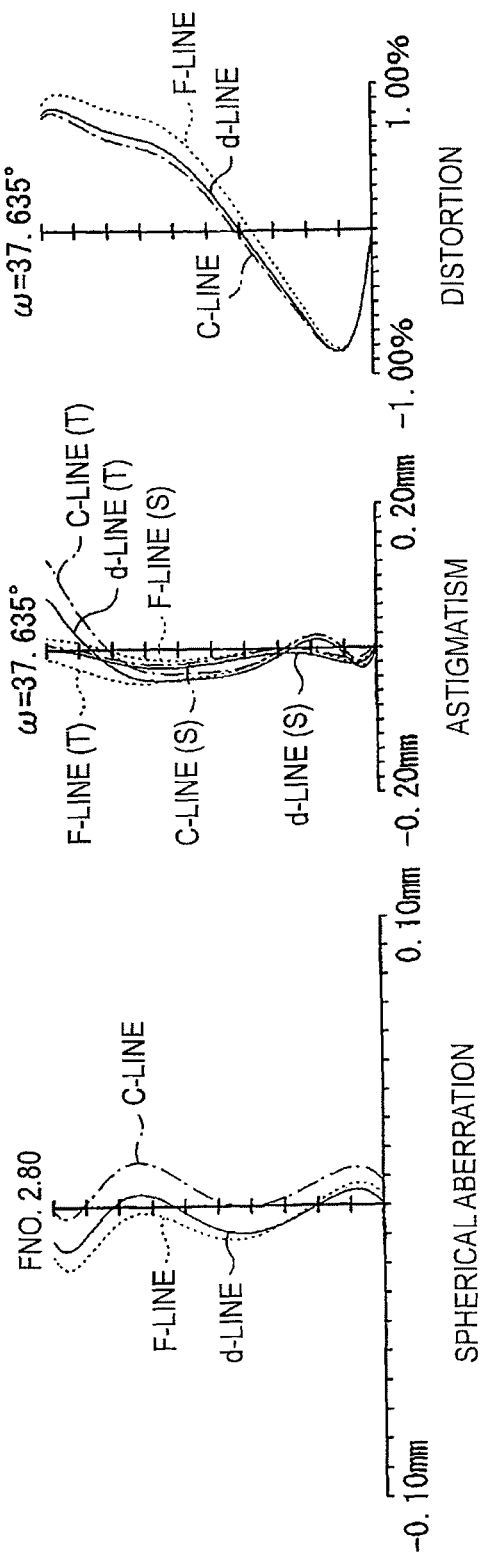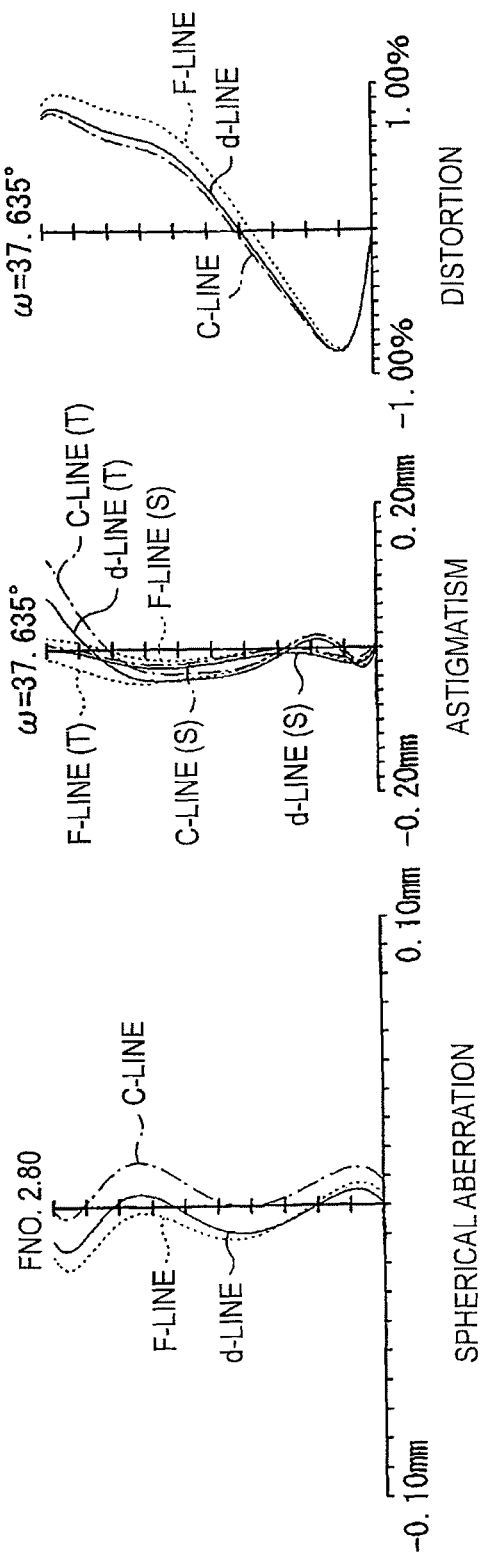

EXAMPLE 2

EXAMPLE 3

EXAMPLE 4

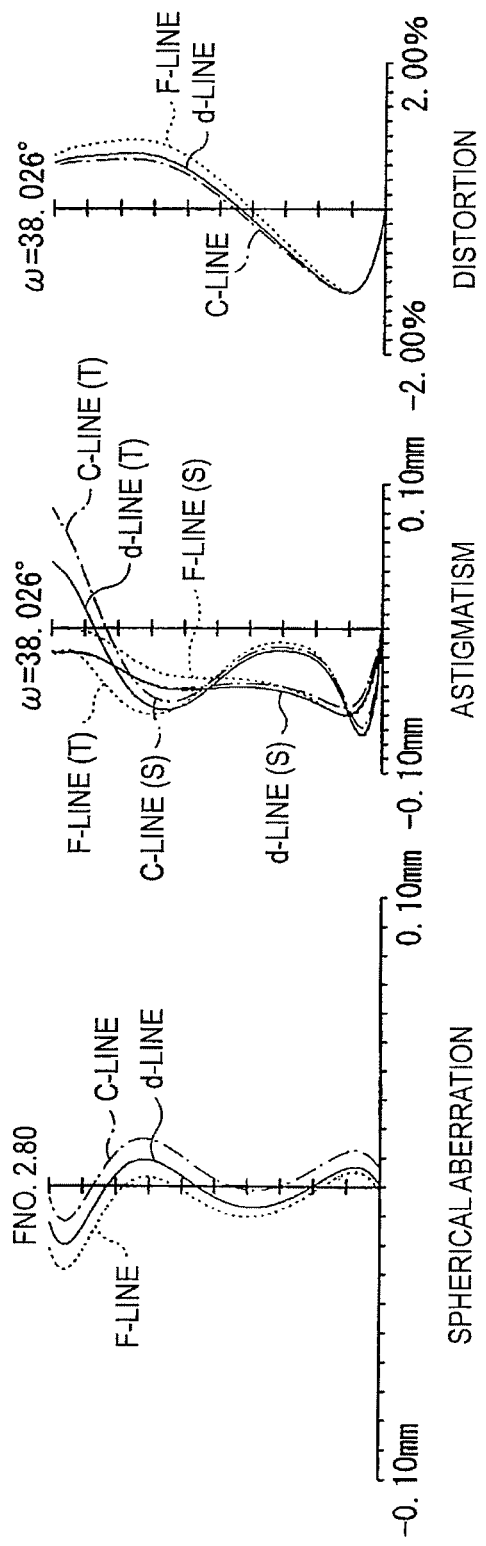

EXAMPLE 6

EXAMPLE 7

EXAMPLE 8

EXAMPLE 9

EXAMPLE 10

EXAMPLE 11

EXAMPLE 12

EXAMPLE 13

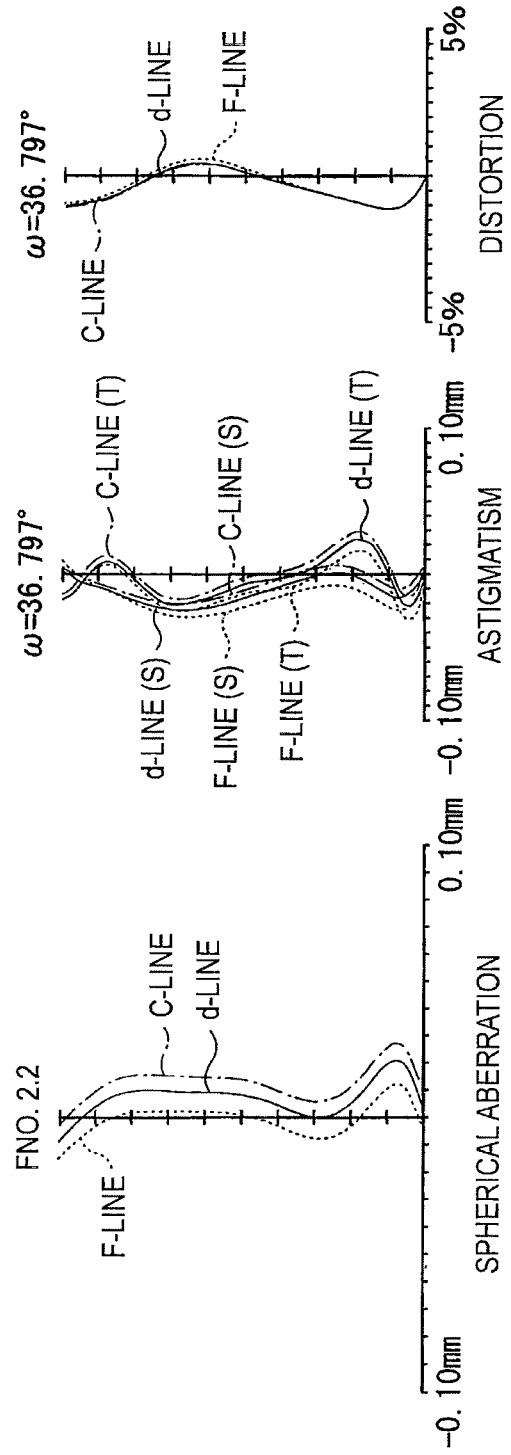

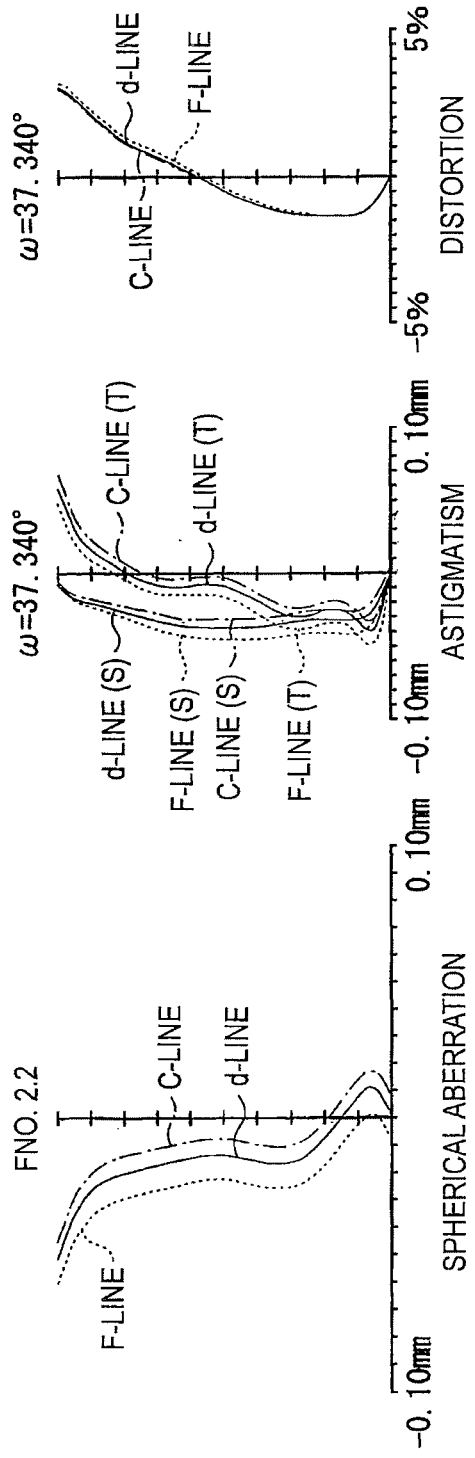

EXAMPLE 16

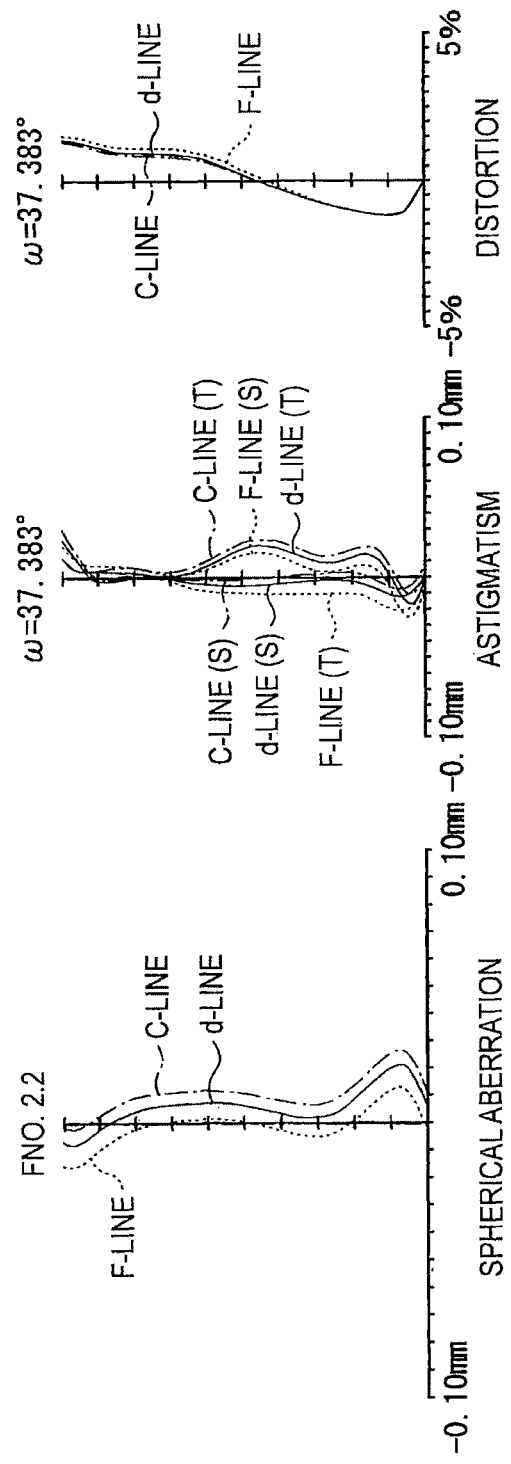

EXAMPLE 18

EXAMPLE 19

EXAMPLE 20

EXAMPLE 21

IMAGING LENS, IMAGING APPARATUS AND PORTABLE TERMINAL DEVICE

This application is a Continuation of copending application Ser. No. 12/755,020 filed on Apr. 6, 2010, which claims priority to Application Nos. 2009-093137 and 2010-065646 filed in Japan, on Apr. 7, 2009 and Mar. 23, 2010, respectively. The entire contents of all of the above applications is hereby incorporated by reference.

BACKGROUND OF THE INVENTION

1. Field of the Invention

The present invention relates to an imaging lens that forms an optical image of a subject on an imaging device such as a CCD (Charge Coupled Device) or a CMOS (Complementary Metal Oxide Semiconductor), and an imaging apparatus such as a digital still camera that performs photographing with the imaging lens mounted therein, and a portable terminal device such as a cellular phone equipped with a camera and a portable information terminal (PDA: Personal Digital Assistance).

2. Description of Related Art

In recent years, as personal computers have become popular in homes, digital still cameras which are capable of transferring image information about photographed scenes, persons, and the like into the personal computers have spread rapidly. In addition, the incorporation of a camera module for inputting images into a cellular phone has been increasing. In these imaging apparatuses, imaging devices such as a CCD and a CMOS are used. In such imaging apparatuses, recently, because the imaging device has been reduced in size, a reduction in size of the whole of the imaging apparatus and an imaging lens mounted therein has also been required. Also, since the number of pixels included in the imaging device has also been increasing, the enhancing of the resolution and performance of the imaging device has been required. In order to cope with the requirements, in the past, an imaging lens was developed which was configured to have a total of four lenses. In contrast, recently, there is a tendency of increasing the number of lenses in order to achieve higher resolution and higher performance.

Japanese Patent No. 3788133, JP-A-2007-264180, and JP-A-2007-279282 disclose imaging lenses in which high performance is achieved by using five lenses. However, recently, further high performance has been required even for the disclosed imaging lenses.

SUMMARY OF THE INVENTION

An object of the invention is to provide an imaging lens capable of achieving high resolution performance, an imaging apparatus, and a potable terminal device.

According to an aspect of the invention, there is an imaging lens including: in order from an object side thereof, a first lens having a positive refractive power; a second lens having a negative refractive power; a third lens having a concave surface on an image side near the optical axis thereof and having a positive refractive power; a fourth lens having a positive refractive power near the optical axis thereof; and a fifth lens having a negative refractive power near the optical axis thereof. An image side surface of the fifth lens is concave near the optical axis and has a region where a negative power of the region decreases toward a periphery of the fifth lens as compared with a negative power near the optical axis.

An imaging lens according the aspect of the invention has a five-lens configuration, and is configured so that the number of the lenses increases as compared with the existing imaging lens having a four-lens configuration and the configuration of the respective lenses is optimized. With such a configuration, it is possible to obtain a lens system having a high resolution performance for coping with an increase in the number of pixels.

Furthermore, by appropriately adopting and satisfying the following preferable configuration, it becomes easier to achieve an increase in performance.

In order to obtain higher resolution performance, it is preferable that an imaging lens according to the aspect of the invention satisfies at least one of the following conditional expressions.

$$D7 > D6 \tag{1}$$

$$0.8 < f/f1 < 1.5 \tag{2}$$

$$f1 < |f2| < f3 \tag{3}$$

$$vd2 < 35 \tag{4}$$

Here, D6 is a thickness of the third lens on the optical axis, and D7 is an air space between the third lens and the fourth lens on the optical axis. In addition, f1 is the focal length of the first lens, f2 is a focal length of the second lens, f3 is a focal length of the third lens, and f is a focal length of the whole system. vd2 is an Abbe number of the second lens at the d-line.

Further, it is preferable to satisfy the following conditional expression. Here, f4 is the focal length of the fourth lens.

$$f4 < f1 \tag{5A}$$

$$f4 < |f2| \tag{5B}$$

$$f4 < f3 \tag{5C}$$

Further, in an imaging lens according to the aspect of the invention, it is preferable that the object side surface of the first lens is convex toward the object side near the optical axis. In addition, it is also preferable that the image side surface of the fourth lens is convex toward the image side near the optical axis.

In an imaging lens according to the aspect of the invention, it is preferred that both surfaces in each of the first lens, the second lens, the third lens, the fourth lens, and the fifth lens is aspheric.

An imaging apparatus according to another aspect of the invention includes: an imaging lens according to the aspect of the invention; and an imaging device for outputting an imaging signal based on an optical image formed by the imaging lens.

A portable terminal device according to still another aspect of the invention includes: an imaging apparatus according to the other aspect of the invention; and a display unit that displays an image taken by the imaging apparatus.

In an imaging apparatus or a portable terminal device according to the other aspects of the invention, a high resolution imaging signal is obtained on the basis of a high resolution optical image formed by the imaging lens according to the aspect of the invention.

According to an aspect of the invention, an imaging lens has a lens configuration using a total of five elements, and the shapes of the respective lenses and the like are appropriately set so as to be optimized. With such a configuration, it is possible to obtain high resolution performance.

Further, according to other aspects of the invention, an imaging apparatus or a portable terminal device is configured to output the imaging signal based on the optical image formed by the imaging lens having high resolution performance according to the aspect of the invention. With such a configuration, it is possible to obtain a high resolution photographing image.

BRIEF DESCRIPTION OF THE DRAWINGS

The features of the invention will appear more fully upon consideration of the exemplary embodiment of the invention, which are schematically set forth in the drawings, in which:

FIG. 1 is a sectional diagram illustrating a first exemplary configuration of an imaging lens according to an exemplary embodiment of the invention, corresponding to Example 1;

FIG. 2 is a sectional diagram illustrating a second exemplary configuration of the imaging lens, corresponding to Example 2;

FIG. 3 is a sectional diagram illustrating a third exemplary configuration of the imaging lens, corresponding to Example 3;

FIG. 4 is a sectional diagram illustrating a fourth exemplary configuration of the imaging lens, corresponding to Example 4;

FIG. 5 is a sectional diagram illustrating a fifth exemplary configuration of the imaging lens, corresponding to Example 5;

FIG. 6 is a sectional diagram illustrating a sixth exemplary configuration of the imaging lens, corresponding to Example 6;

FIG. 7 is a sectional diagram illustrating a seventh exemplary configuration of the imaging lens, corresponding to Example 7;

FIG. 8 is a sectional diagram illustrating a eighth exemplary configuration of the imaging lens, corresponding to Example 8;

FIG. 9 is a sectional diagram illustrating a ninth exemplary configuration of the imaging lens, corresponding to Example 9;

FIG. 10 is a sectional diagram illustrating a tenth exemplary configuration of the imaging lens, corresponding to Example 10;

FIG. 11 is a sectional diagram illustrating a eleventh exemplary configuration of the imaging lens, corresponding to Example 11;

FIG. 12 is a sectional diagram illustrating a twelfth exemplary configuration of the imaging lens, corresponding to Example 12;

FIG. 13 is a sectional diagram illustrating a thirteenth exemplary configuration of the imaging lens, corresponding to Example 13;

FIG. 14 is a sectional diagram illustrating a fourteenth exemplary configuration of the imaging lens, corresponding to Example 14;

FIG. 15 is a sectional diagram illustrating a fifteenth exemplary configuration of the imaging lens, corresponding to Example 15;

FIG. 16 is a sectional diagram illustrating a sixteenth exemplary configuration of the imaging lens, corresponding to Example 16;

FIG. 17 is a sectional diagram illustrating a seventeenth exemplary configuration of the imaging lens, corresponding to Example 17;

FIG. 18 is a sectional diagram illustrating a eighteenth exemplary configuration of the imaging lens, corresponding to Example 18;

FIG. 19 is a sectional diagram illustrating a nineteenth exemplary configuration of the imaging lens, corresponding to Example 19;

FIG. 20 is a sectional diagram illustrating a twelfth exemplary configuration of the imaging lens, corresponding to Example 20;

FIGS. 22A to 22C are aberration diagrams illustrating aberrations of the imaging lens according to Example 1, where FIG. 22A shows spherical aberration, FIG. 22B shows astigmatism, and FIG. 22C shows distortion;

FIG. 23A shows spherical aberration, FIG. 23B shows astigmatism, and FIG. 23C shows distortion;

FIG. 24A shows spherical aberration, FIG. 24B shows astigmatism, and FIG. 24C shows distortion;

FIG. 25A shows spherical aberration, FIG. 25B shows astigmatism, and FIG. 25C shows distortion;

FIGS. 26A to 26C are aberration diagrams illustrating aberrations of the imaging lens according to Example 5, where FIG. 26A shows spherical aberration, FIG. 26B shows astigmatism, and FIG. 26C shows distortion;

FIG. 27A shows spherical aberration, FIG. 27B shows astigmatism, and FIG. 27C shows distortion;

FIG. 28A shows spherical aberration, FIG. 28B shows astigmatism, and FIG. 27C shows distortion;

FIG. 29A shows spherical aberration, FIG. 29B shows astigmatism, and FIG. 29C shows distortion;

FIG. 30A shows spherical aberration, FIG. 30B shows astigmatism, and FIG. 30C shows distortion;

FIG. 31A shows spherical aberration, FIG. 31B shows astigmatism, and FIG. 31C shows distortion;

FIG. 32A shows spherical aberration, FIG. 32B shows astigmatism, and FIG. 32C shows distortion;

FIG. 33A shows spherical aberration, FIG. 33B shows astigmatism, and FIG. 33C shows distortion;

FIG. 34A shows spherical aberration, FIG. 34B shows astigmatism, and FIG. 34C shows distortion;

FIGS. 35A to 35C are aberration diagrams illustrating aberrations of the imaging lens according to Example 14, where FIG. 35A shows spherical aberration, FIG. 35B shows astigmatism, and FIG. 35C shows distortion;

FIGS. 36A to 36C are aberration diagrams illustrating aberrations of the imaging lens according to Example 15, where FIG. 36A shows spherical aberration, FIG. 36B shows astigmatism, and FIG. 36C shows distortion;

FIG. 37A shows spherical aberration, FIG. 37B shows astigmatism, and FIG. 37C shows distortion;

FIGS. 38A to 38C are aberration diagrams illustrating aberrations of the imaging lens according to Example 17, where FIG. 38A shows spherical aberration, FIG. 38B shows astigmatism, and FIG. 38C shows distortion;

FIG. 39A shows spherical aberration, FIG. 39B shows astigmatism, and FIG. 39C shows distortion;

FIG. 40A shows spherical aberration, FIG. 40B shows astigmatism, and FIG. 40C shows distortion;

FIG. 41A shows spherical aberration, FIG. 42B shows astigmatism, and FIG. 41C shows distortion;

FIGS. 42A to 42C are aberration diagrams illustrating aberrations of the imaging lens according to Example 21, where FIG. 42A shows spherical aberration, FIG. 42B shows astigmatism, and FIG. 42C shows distortion;

DETAILED DESCRIPTION OF THE EXEMPLARY EMBODIMENTS

Hereinafter, exemplary embodiments of the invention will be described in detail with reference to drawings.

FIG. 1 shows a first exemplary configuration of an imaging lens according to an exemplary embodiment of the invention. The exemplary configuration corresponds to a lens configuration of a first numerical example to be described later. Likewise, FIGS. 2 to 21 show sectional views of second to twenty first exemplary configurations corresponding to lens configurations of second to twenty first numerical examples to be described later. In FIGS. 1 to 21, the reference sign Ri represents a radius of curvature of i-th surface, where the number i is the sequential number that sequentially increases as it gets closer to an image side (an imaging side) when a surface of a lens element closest to an object side among the elements including the aperture diaphragm St is regarded as a first surface. The reference sign Di represents an on-axis surface spacing between i-th surface and (i+1)th surface on an optical axis Z1. In addition, since the respective exemplary configurations are basically similar in configuration, the following description will be given on the basis of the first exemplary configuration shown in FIG. 1

Figure 43A:
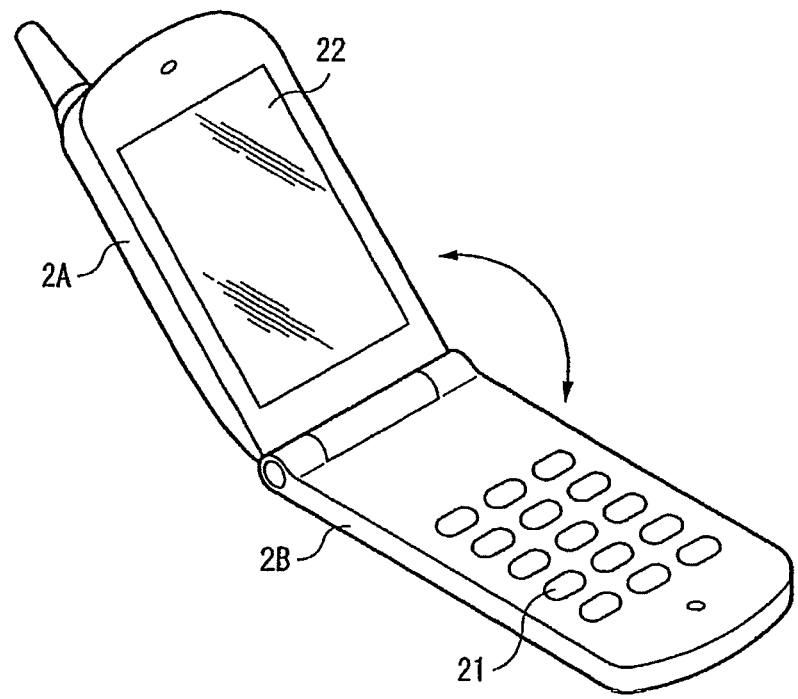
FIGS. 43A and 43B are exterior views illustrating an exemplary configuration of a cellular phone equipped with a camera as a portable terminal device according to an exemplary embodiment of the invention.
Figure 43B:
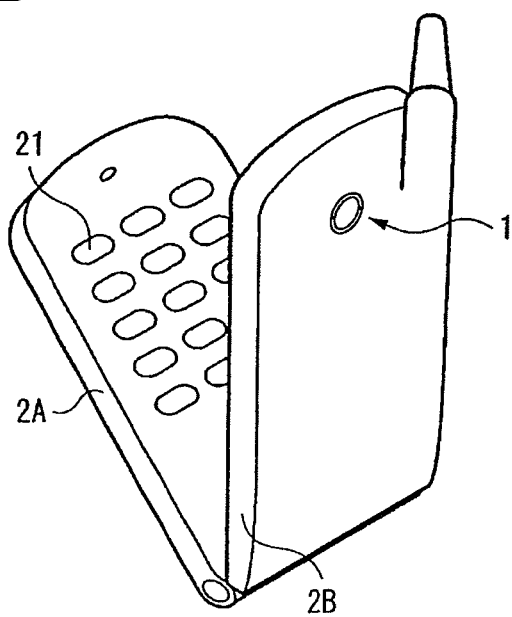
Figure 44:
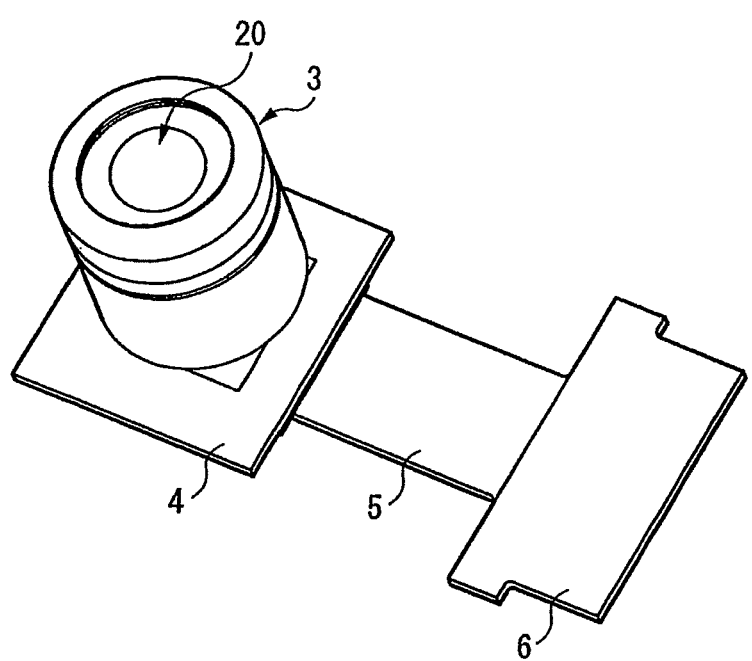
FIG. 44 is a perspective view illustrating an exemplary configuration of a camera module as an imaging apparatus according to an exemplary embodiment of the invention.

FIGS. 43A and 43B show a cellular phone equipped with a camera, as an exemplary embodiment of a portable terminal device. Further, FIG. 44 shows an exemplary configuration of a camera module as an exemplary embodiment of an imaging apparatus. As shown in FIGS. 43A and 43B, the cellular phone equipped with a camera has an upper casing 2A and a lower casing 2B, and both of the casings are configured to be able to freely rotate in an arrow direction shown in FIG. 143A. In the lower casing 2B, an operation key 21 and the like are disposed. In the upper casing 2A, a camera section 1 (shown in FIG. 43B) and a display section (display unit) 22 (FIG. 43A) are disposed. The display section 22 is formed of a display panel such as a LCD (Liquid Crystal Display) or an EL (Electro-Luminescence) panel. The display section 22 is disposed on an inner surface in a state where the cellular phone is folded. The display section 22 is able to display not only various menus for a telecommunication function but also images taken by the camera section 1. The camera section 1 is disposed on, for example, the rear side of the upper casing 2A. However, a location on which the camera section 1 is disposed is not limited to this.

The camera section 1 has, for example, the camera module as shown in FIG. 44. As shown in FIG. 44, the camera module includes a barrel 3 in which an imaging lens 20 is placed, a supporting substrate 4 which supports the barrel 3, and the imaging device (not shown in the drawing) which is disposed on a location corresponding to the imaging plane of the imaging lens 20 on the supporting substrate 4. The camera module further includes a flexible substrate 5 which is electrically connected to the imaging device on the supporting substrate 4, and a external connection terminal 6 which is configured to be connected to the flexible substrate 5 and be able to be connected to a signal processing circuit of a main body in cellular phones. These components are integrally formed.

In the camera section 1, an optical image formed by the imaging lens 20 is converted into an electric imaging signal by the imaging device, and the imaging signal is output to a signal processing circuit of the apparatus main body side. In such a cellular phone equipped with a camera, a high-resolution imaging signal in which aberration is sufficiently corrected is obtained by using an imaging lens according to the embodiment as the imaging lens 20. In the main body of the cellular phone, a high resolution image can be obtained on the basis of the imaging signal.

Furthermore, the imaging lens according to the embodiment can be applied to various imaging apparatuses using an imaging device such as CCD or CMOS or portable terminal devices. The imaging apparatus or portable terminal device according to the embodiment is not limited to the cellular phone equipped with a camera, and may be, for example, a digital camera, a PDA, or the like. Further, the imaging lens according to the embodiment is appropriately applicable to, in particular, an imaging apparatus or a portable terminal device equipped with the small-size and high-pixel imaging device having a pixel number of 2 mega or more and having a pixel pitch of 3 μm or less.

The imaging lens includes, along the optical axis Z1 in order from the object side, a first lens G1, a second lens G2, a third lens G3, a fourth lens G4, and a fifth lens G5. An optical aperture diaphragm St is disposed ahead of the first lens G1. More specifically, for example, the aperture diaphragm St is disposed closer to the object side than the image side surface of the first lens G1 on the optical axis Z1. Here, similarly to the exemplary configurations of FIGS. 9 to 14, the aperture diaphragm St may be disposed between the image side surface of the first lens G1 and the object side surface of the second lens G2.

In the imaging plane (the imaging surface) Simg of this imaging lens, an imaging device such as a CCD is arranged. Between the fifth lens G5 and the imaging device, various optical members CG may be disposed in accordance with a configuration of the camera side equipped with the lens system. For example, flat-plate-shaped optical members such as an infrared cut filter and a cover glass for protecting the imaging surface may be disposed. In this case, as the optical members GC, for example, members formed by applying a coat functioning as the infrared cut filter, an ND filter, or the like to a flat-plate-shaped cover glass may be used. Further, in the imaging lens, the coat functioning as the infrared cut filter, the ND filter, or the like or an antireflective coat may be applied to all of the first lens G1 to the fifth lens G5 or at least one lens surface.

The first lens G1 has a positive refractive power. The first lens G1 may be formed as a positive lens whose object side surface is convex toward the object side near the optical axis. Alternatively, the first lens may be formed as a biconvex lens near the optical axis or a meniscus lens convex toward the object side near the optical axis.

The second lens G2 has a negative refractive power. It is preferable that the second lens G2 is configured so that the image side surface thereof is concave near the optical axis. Here, similarly to the exemplary configuration of FIG. 3, the image side surface may be convex.

The third lens G3 is a positive lens having a shape in which the image side surface thereof is concave near the optical axis. For example, the third lens G3 may be formed as a positive meniscus lens concave toward the image side near the optical axis.

The fourth lens G4 has a positive refractive power near the optical axis. For example, the fourth lens G4 may be configured so that the image side surface thereof is convex toward the image side near the optical axis.

The fifth lens G5 has a negative refractive power near the optical axis. For example, the fifth lens G5 may be configured so that the image side surface is concave toward the image side near the optical axis. Alternatively, the fifth lens G5 may have a meniscus shape (for example, the exemplary configuration of FIG. 1) near the optical axis or may have a biconcave shape (for example, the exemplary configuration of FIG. 15) near the optical axis.

It is preferable that the imaging lens is configured to satisfy the following conditional expression.

$$D7 > D6 \quad (1)$$

Here, D6 is a thickness of the third lens G3 on the optical axis, and D7 is an air space between the third lens G3 and the fourth lens G4 on the optical axis.

It is preferable that the imaging lens satisfies at least one of the following conditional expressions. Here, f1 is defined as a focal length of the first lens G1, f2 is defined as a focal length of the second lens G2, f3 is defined as a focal length of the third lens G3, and f is defined as a focal length of the whole system. In addition, vd2 is defined as an Abbe number of the second lens G2 at the d-line.

$$0.8 < f/f1 < 1.5 \quad (2)$$

$$f1 < |f2| < f3 \quad (3)$$

$$vd2 < 35 \quad (4)$$

Furthermore, it is preferable that the following conditional expression is satisfied. Here, f4 is a focal length of the fourth lens.

$$f4 < f1 \quad (5A)$$

$$f4 < |f2| \quad (5B)$$

$$f4 < f3 \quad (5C)$$

In the imaging lens, it is preferable that both surfaces of each of the first lens G1, the second lens G2, the third lens G3, the fourth lens G4, and the fifth lens G5 is aspheric. In particular, it is preferable that the fourth lens G4 and the fifth lens G5 has aspheric shapes in which the tendency of the concave/convex profile of the lens is different between a portion of the lens near the optical axis and the peripheral portion thereof.

For example, it is preferable that the image side surface of the fifth lens G5 is concave near the optical axis and has a region in which, as the periphery gets closer, a negative refractive power of the lens decreases as compared with that near the optical axis. Further, it is preferable that the image side surface of the fifth lens G5 has an aspheric shape having an inflection point in the effective diameter thereof. Furthermore, it is preferable that the image side surface of the fifth lens G5 has an aspheric shape having a local maximum or minimum point at a position other than the center of the optical axis in the effective diameter thereof. Specifically, for example, it is preferable that the image side surface of the fifth lens G5 is formed as an aspheric surface which is concave near the optical axis and is convex in the peripheral portion thereof. Furthermore, it is preferable that the object side surface of the fifth lens G5 has an aspheric shape having an inflection point in the effective diameter thereof.

Generally, the aspheric surface expression is represented by the following Expression (A):

$$Z = C \cdot h^2 / \{1 + (1 - K' \cdot C^2 \cdot h^2)^{1/2}\} + \Sigma A_i \cdot h^i \quad (A),$$

where $K' = 1 + K$

K is an eccentricity,

Z is the depth (mm) of an aspheric surface, h is the distance (a height, mm) from the optical axis to the lens surface, C is a paraxial curvature equal to 1/R (R: a paraxial radius of curvature), and $\Sigma A_i \cdot h^i$ is the sum of $A_i \cdot h^i$ when i=1 to n (n=an integer of 3 or more)

$A_i$ is an i-th order aspheric surface coefficient.

The Z represents the length (mm) of a perpendicular line dropped from a point, which exists on an aspheric surface at the height h from the optical axis, to a tangent plane (a plane perpendicular to the optical axis) to the vertex of the aspheric surface. That is, the Z represents the sag amount (depth) of the aspheric surface based on the position of the vertex of the surface at the height h from the optical axis.

Effect and Advantage

Next, operations and effects of the imaging lens configured as described above will be described. The imaging lens has a five-element lens configuration, and is configured so that the number of the lenses increases as compared with the existing imaging lens having a four-element configuration and the configuration of the respective lenses is optimized. With such a configuration, it is possible to obtain a lens system having high resolution performance for coping with an increase in the number of pixels.

In particular, the image side surface of the third lens G3 is formed in a concave shape, and the space between the third lens G3 and the fourth lens G4 is formed to be relatively large so as to satisfy Conditional Expression (1), thereby easily obtaining high resolution performance. When Conditional Expression (1) is not satisfied and the space between the third lens G3 and the fourth lens G4 becomes relatively small, the image field curvature becomes large, thereby not obtaining high resolution performance.

Conditional Expression (2) relates to the refractive power of the first lens G1. In the imaging lens, the first lens G1 has a main imaging function so as to satisfy Conditional Expression (2), thereby obtaining an optical system of which the entire length is short. When the result value of Conditional Expression (2) is less than the lower limit, the entire length thereof increases. When the result value is more than the upper limit, it is advantageous in the reduction of the entire length, but an image field curvature is increased, and thus it becomes difficult to obtain high resolution performance.

In order to decrease the entire length and increase resolution performance, it is preferable that the numerical value range of Conditional Expression (2) is the numerical value range of the following Conditional Expression (2A).

$$1.0 < f/f1 < 1.4 \quad (2A)$$

It is more preferable to satisfy the numerical value range of the following Conditional Expression (2B).

$$1.1 < f/f1 < 1.35 \quad (2B)$$

Furthermore, it is preferable to satisfy the numerical range of the following conditional expression (2C).

$$1.12 < f/f1 < 1.35 \quad (2C)$$

Conditional Expression (3) represents the appropriate relationship of the focal lengths of the first lens G1, the second lens G2, and the third lens G3. Conditional Expression (4) relates to an appropriate Abbe number of the second lens G2. Satisfying Conditional Expression (3) and Conditional Expression (4) is advantageous in correction of chromatic aberration. In particular, when the result value of Conditional Expression (4) is more than the upper limit, it becomes insufficient to correct chromatic aberration.

In order to more satisfactorily correct chromatic aberration, it is preferable that the upper limit of Conditional Expression (4) satisfies the following Conditional Expression (4A).

$$vd2 < 25 \quad (4A)$$

The conditional expressions (5A), (5B), and (5C) define the appropriate relationships of the focal lengths of the first lens G1, the second lens G2, and the third lens G3 relative to the focal length of the fourth lens G4. By satisfying the conditional expressions (5A), (5B), and (5C), it becomes easy to decrease the F number and achieve a fast lens system.

In order to obtain a higher speed and higher resolution performance, it is preferable that the focal lengths of the first lens G1, the second lens G2, the third lens G3, and the fourth lens G4 satisfy the relationship of the following conditional expression (5D).

$$f4 < f1 < |f2| < f3 \quad (5D)$$

Further, in the imaging lens, the fourth lens G4 and the fifth lens G5, which are disposed closer to the image side than the other lenses, have aspheric shapes in which the tendency of the concave/convex profile of the lens is different between a portion of the lens near the optical axis and the peripheral portion thereof. With such a configuration, it is possible to satisfactorily correct the image field curvature in the range from the center portion of the image plane to the peripheral portion thereof. In particular, the image side surface of the fifth lens G5 has a region in which, as the periphery gets closer, the negative refractive power thereof decreases as compared with that near the optical axis. Thus, it is possible to satisfactorily correct image field curvature, and it is also possible to obtain high resolution performance.

As described above, according to the embodiment of the invention, the imaging lens has a lens configuration using a total of five elements, and the shapes of the respective lenses and the like are appropriately set so as to satisfy the conditional expression. With such a configuration, it is possible to obtain high resolution performance. Further, according to the embodiment of the invention, the imaging apparatus or the portable terminal device is configured to output the imaging signal based on the optical image formed by the imaging lens having high resolution performance according to the aspect of the invention. With such a configuration, it is possible to obtain a high resolution photographing image.

EXAMPLES

Next, specific numerical examples of the imaging lens according to the embodiment will be described. In the following explanation, a plurality of numerical examples will be partially and collectively described.

Example 1

Tables 1 and 2 show specific lens data corresponding to the configuration of the imaging lens shown in FIG. 1. Particularly, Table 1 shows basic lens data, and Table 2 shows aspheric surface data. In the column of the surface number Si in the lens data shown in Table 1, the number i represents the sequential number of i-th surface (i=1 to 13) that sequentially increases as it gets closer to the image side when a surface of a component closest to the object side is regarded as a first surface in the imaging lens according to Example 1. In the column of the radius of curvature Ri, there are values (mm) of the radius of curvature of i-th surface from the object side to correspond to the reference sign Ri in FIG. 1. Likewise, in the column of the on-axis surface spacing Di, there are spaces (mm) on the optical axis between the i-th surface Si and the (i+1)th surface Si+1 on the optical axis from the object side. In the columns of Ndj and vdj, there are values of the refractive index and the Abbe number of the j-th optical component from the object side at the d-line (587.6 nm).

In the imaging lens according to Example 1, both surfaces of each of the first lens G1, the second lens G2, the third lens G3, the fourth lens G4, and the fifth lens G5 are aspheric. In the basic lens data shown in Table 1, the radiuses of curvature of these aspheric surfaces are represented as numerical values of the radius of curvature near the optical axis.

Table 2 shows aspheric surface data in the imaging lens according to Example 1. In the numerical values represented as the aspheric surface data, the reference sign "E" means that a numerical value following this is a "power exponent" having a base of 10 and that this numerical value having a base of 10 and expressed by an exponential function is multiplied by a numerical value before the "E". For example, it means that "1.0E-02" is "$1.0 \times 10^{-2}$".

As regards the aspheric surface data of the imaging lens according to Example 1, there are noted the respective coefficients $A_i$ and K used in an aspheric surface shape expression expressed by the following Expression (A). The imaging lens according to Example 1 is represented by effectively using the aspheric surface coefficients of A, up to 10th-order. Furthermore, although omitted in the table, 1st-order and 2nd-order aspheric surface coefficients $A_1$ and $A_2$ are set to 0 (that is, $A_1=0$, $A_2=0$).

TABLE 1

Example 1 • Basic Lens Data

|   | Si (Surface Number) | Ri (Radius of Curvature) | Di (Surface Spacing) | Ndj (Refractive Index) | vdj (Abbe Number) |
|---|---|---|---|---|---|
|   | 1 (Aperture Diaphragm) | — | −0.1000 | | |
| G1 | 2 | 4.4215 | 0.8769 | 1.68986 | 53.2 |
|   | 3 | −104.2130 | 0.3314 | | |

TABLE 1-continued

Example 1 • Basic Lens Data

| | Si (Surface Number) | Ri (Radius of Curvature) | Di (Surface Spacing) | Ndj (Refractive Index) | νdj (Abbe Number) |
|---|---|---|---|---|---|
| G2 | 4 | −10.7061 | 0.6500 | 1.63171 | 23.3 |
| | 5 | 10.4605 | 0.4948 | | |
| G3 | 6 | 4.9474 | 0.7153 | 1.68986 | 53.2 |
| | 7 | 6.8950 | 1.4944 | | |
| G4 | 8 | −35.6161 | 1.4569 | 1.53112 | 55.4 |
| | 9 | −1.6266 | 0.1000 | | |
| G5 | 10 | 74.9982 | 0.6783 | 1.50956 | 56.5 |
| | 11 | 1.3907 | 1.3210 | | |
| GC | 12 | ∞ | 0.3000 | 1.51825 | 64.1 |
| | 13 | ∞ | 1.2337 | | |

TABLE 2

Example 1•Aspheric Surface Data

| Surface Number | K | A3 | A4 | A5 | A6 |
|---|---|---|---|---|---|
| 2 | 2.0754717E+00 | 1.1290395E−04 | −7.3269681E−03 | −3.6680888E−03 | 9.4906587E−03 |
| 3 | 1.9770211E+01 | 1.5728031E−03 | −1.2524534E−02 | 7.0770828E−03 | −2.3254781E−03 |
| 4 | 1.3666653E+01 | 3.7339090E−03 | −3.1624302E−03 | 1.0575882E−02 | 4.4986125E−04 |
| 5 | 7.5841699E+00 | 2.1654766E−03 | −2.1814879E−02 | 1.9479326E−02 | 3.5799863E−03 |
| 6 | −1.6961615E+01 | −5.3528334E−03 | −1.1769306E−02 | −4.3858557E−04 | 2.4341782E−03 |
| 7 | −3.5697777E+01 | −1.9747895E−03 | −9.6581041E−03 | 2.5092606E−04 | −2.4043987E−05 |
| 8 | 9.8998776E+01 | 2.5168453E−03 | −7.6949763E−03 | 6.2763520E−03 | −1.4836789E−03 |
| 9 | −6.0184699E+00 | −1.8822518E−02 | 2.3627949E−03 | 1.8850260E−03 | 4.3143776E−04 |
| 10 | −1.0096770E+02 | −3.0297508E−02 | −6.5767890E−03 | 2.0174633E−03 | −1.0761719E−04 |
| 11 | −5.2350629E+00 | −3.9204568E−02 | 4.4238412E−03 | −6.8582624E−04 | 1.0314890E−03 |

| | A7 | A8 | A9 | A10 |
|---|---|---|---|---|
| 2 | −1.0037850E−02 | 2.0306165E−03 | 1.7848515E−03 | −8.7171784E−04 |
| 3 | 1.4642568E−03 | −9.1401689E−04 | −1.3511042E−03 | 5.9710251E−04 |
| 4 | 4.8455930E−03 | −5.7744060E−03 | −7.6362498E−03 | 1.0261615E−03 |
| 5 | −2.0625104E−03 | −2.2137855E−03 | 3.3697069E−04 | 1.6334771E−04 |
| 6 | 1.6051221E−03 | −1.6147040E−03 | 7.6781501E−04 | −1.7460690E−04 |
| 7 | 1.7127007E−04 | 2.0050498E−04 | 7.6923123E−05 | −3.6447859E−05 |
| 8 | −5.7172387E−04 | 9.1173148E−05 | 5.8509546E−05 | −1.5806341E−05 |
| 9 | −4.7058571E−04 | 8.0323321E−05 | −7.2832467E−06 | 1.0118146E−06 |
| 10 | 8.9173214E−05 | 1.3881468E−05 | −9.1742084E−06 | 7.4271289E−07 |
| 11 | −5.0249936E−04 | 9.5536679E−05 | −6.7273505E−06 | −4.1834894E−08 |

Numerical Examples 2 to 21

Similar to the imaging lens according to the above-mentioned numerical Example 1, Tables 3 and 4 show specific lens data as numerical Example 2, corresponding to the configuration of the imaging lens shown in FIG. 2. Likewise, Tables 5 to 42 show specific lens data corresponding to as numerical Examples 3 to 21, corresponding to the configurations of the imaging lenses shown in FIGS. 3 to 21.

Furthermore, all the lens surfaces of the imaging lenses according to Examples 2 to 21 are formed in an aspheric shape, similar to the imaging lens according to Example 1.

TABLE 3

Example 2•Basic Lens Data

| | Si (Surface Number) | Ri (Radius of Curvature) | Di (Surface Spacing) | Ndj (Refractive Index) | νdj (Abbe Number) |
|---|---|---|---|---|---|
| | 1 (Aperture Diaphragm) | — | −0.1000 | | |
| G1 | 2 | 4.4802 | 0.8835 | 1.68986 | 53.2 |
| | 3 | −51.3955 | 0.3010 | | |
| G2 | 4 | −11.2764 | 0.6500 | 1.63171 | 23.3 |
| | 5 | 10.0488 | 0.4861 | | |
| G3 | 6 | 5.2185 | 0.7120 | 1.68986 | 53.2 |
| | 7 | 6.7507 | 1.2994 | | |
| G4 | 8 | −13.6435 | 1.2573 | 1.53112 | 55.4 |
| | 9 | −2.2896 | 0.2540 | | |
| | 10 | 19.0661 | 1.0444 | 1.50956 | 56.5 |

TABLE 3-continued

Example 2•Basic Lens Data

| | Si (Surface Number) | Ri (Radius of Curvature) | Di (Surface Spacing) | Ndj (Refractive Index) | νdj (Abbe Number) |
|---|---|---|---|---|---|
| G5 | 11 | 2.0718 | 1.3210 | | |
| GC | 12 | ∞ | 0.3000 | 1.51825 | 64.1 |
| | 13 | ∞ | 1.1417 | | |

TABLE 4

Example 2•Aspheric Surface Data

| Surface Number | K | A3 | A4 | A5 | A6 |
|---|---|---|---|---|---|
| 2 | 2.2744730E+00 | −1.0867445E−04 | −7.0700871E−03 | −4.7702336E−03 | 9.9876891E−03 |
| 3 | 1.8792893E+01 | 1.4887894E−03 | −1.3024541E−02 | 7.9055386E−03 | −3.8083515E−03 |
| 4 | 1.6446809E+01 | 5.1973210E−03 | −6.5011235E−03 | 1.5825051E−02 | −3.3658667E−03 |
| 5 | 8.7729286E+00 | 2.0584444E−03 | −2.1526942E−02 | 2.0316471E−02 | 2.7536033E−03 |
| 6 | −1.3844730E+01 | −6.4839751E−03 | −1.6502792E−02 | −1.0751912E−04 | 2.7735051E−03 |
| 7 | −2.7175779E+01 | −4.0561762E−03 | −1.0789741E−02 | −2.4097992E−04 | 1.1293396E−04 |
| 8 | 1.4299905E+01 | 1.1685255E−03 | −1.7438475E−03 | 5.8203725E−03 | −2.0761412E−03 |
| 9 | −4.5983808E+00 | −8.4636881E−03 | 1.3787508E−03 | 1.2422599E−03 | 6.5833052E−04 |
| 10 | −1.5174418E+01 | −1.3842331E−02 | −1.2824758E−02 | 2.2140203E−03 | −9.7724127E−05 |
| 11 | −5.4788536E+00 | −5.9362225E−03 | −1.7007892E−02 | 5.0884361E−03 | 5.4825985E−04 |

| Surface Number | A7 | A8 | A9 | A10 |
|---|---|---|---|---|
| 2 | −1.0254961E−02 | 2.1777731E−03 | 1.7363575E−03 | −8.8820602E−04 |
| 3 | 3.4638130E−03 | −2.4193687E−03 | −9.2310846E−04 | 5.7618397E−04 |
| 4 | 7.1511388E−03 | −7.2564098E−03 | −3.2206785E−04 | 1.0061244E−03 |
| 5 | −1.5315624E−03 | −2.4387401E−03 | 3.0158479E−04 | 1.8892967E−04 |
| 6 | 2.8254564E−03 | −2.4153767E−03 | 9.5719885E−04 | −1.9923798E−04 |
| 7 | 6.1600782E−04 | −8.3544753E−05 | 1.4808904E−04 | −4.3186230E−05 |
| 8 | −9.3910685E−04 | 2.9758505E−04 | 5.2252684E−05 | −2.2892374E−05 |
| 9 | −6.5627483E−04 | 1.0716329E−04 | −5.4582236E−06 | 1.8550019E−06 |
| 10 | 1.0097307E−04 | 1.9623729E−05 | −1.0211352E−05 | 7.2024209E−07 |
| 11 | −5.8918611E−04 | 1.1156463E−04 | −6.1031809E−06 | −1.8835940E−07 |

TABLE 5

Example 3•Basic Lens Data

| | Si (Surface Number) | Ri (Radius of Curvature) | Di (Surface Spacing) | Ndj (Refractive Index) | νdj (Abbe Number) |
|---|---|---|---|---|---|
| | 1 (Aperture Diaphragm) | — | −0.0786 | | |
| G1 | 2 | 3.4904 | 0.8507 | 1.68986 | 53.2 |
| | 3 | −79.8026 | 0.4130 | | |
| G2 | 4 | −3.0281 | 0.6288 | 1.63171 | 23.3 |
| | 5 | −9.2618 | 0.3629 | | |
| G3 | 6 | 4.4529 | 0.9414 | 1.68986 | 53.2 |
| | 7 | 10.1786 | 1.1280 | | |
| G4 | 8 | −8.5833 | 0.7860 | 1.53112 | 55.4 |
| | 9 | −1.5356 | 0.1742 | | |
| G5 | 10 | −8.4528 | 0.6289 | 1.53112 | 55.4 |
| | 11 | 1.6179 | 0.9429 | | |
| GC | 12 | ∞ | 0.2357 | 1.51825 | 64.1 |
| | 13 | ∞ | 0.3374 | | |

TABLE 6

Example 3•Aspheric Surface Data

| Surface Number | K | A3 | A4 | A5 | A6 |
|---|---|---|---|---|---|
| 2 | −6.7644902E−01 | −1.1927604E−03 | −2.7250621E−03 | −1.0865248E−02 | 4.1710184E−03 |
| 3 | 3.6719424E+01 | 5.3752654E−04 | −2.6406891E−02 | −1.1453737E−02 | 5.9708462E−03 |
| 4 | −2.9334857E+00 | −1.2563775E−03 | 3.0234275E−03 | −1.6456866E−02 | 4.9565403E−03 |
| 5 | 2.5804981E−01 | 3.7723752E−03 | −2.7694071E−03 | −5.8258157E−03 | 1.2461703E−02 |
| 6 | −2.4183715E+01 | 5.5782756E−03 | 3.3771607E−03 | −1.9841058E−02 | 1.0168773E−02 |
| 7 | −3.4262984E+01 | 9.4100144E−03 | −1.6664577E−02 | −1.5188814E−03 | 1.3280830E−03 |
| 8 | −9.3010983E−01 | −2.4627571E−03 | −7.6487230E−04 | 3.5936786E−04 | −1.9998766E−04 |
| 9 | −8.7629799E+00 | −1.6131191E−02 | 6.9687091E−04 | 9.4675168E−03 | 6.8956177E−04 |
| 10 | −7.0896885E+00 | 6.9397486E−02 | −1.7462177E−02 | −7.8936626E−03 | 7.7595982E−04 |
| 11 | −1.1735737E+01 | 4.8275813E−02 | −3.0105946E−02 | −1.5746895E−04 | 3.4711427E−03 |

| Surface Number | A7 | A8 | A9 | A10 |
|---|---|---|---|---|
| 2 | 1.1242264E−02 | −2.6263295E−02 | 1.5781136E−02 | −3.8876247E−03 |
| 3 | −5.4110816E−03 | 1.2689810E−03 | −7.2878478E−04 | 7.1034278E−04 |
| 4 | 1.5810585E−02 | −7.0941563E−03 | 3.4281844E−03 | −1.1852352E−03 |
| 5 | 1.5027992E−02 | −1.2234268E−02 | 3.4463262E−03 | −5.2810564E−04 |

TABLE 6-continued

Example 3•Aspheric Surface Data

| | | | | |
|---|---|---|---|---|
| 6 | 7.2163076E−04 | −1.6125511E−03 | 4.2230075E−04 | −6.5125791E−05 |
| 7 | 3.7034607E−04 | 2.1110494E−04 | −6.7957535E−05 | −1.1537386E−05 |
| 8 | −6.5044237E−05 | −6.1254979E−06 | 7.4401385E−05 | −1.6998233E−05 |
| 9 | −2.0016516E−03 | 3.1566806E−04 | 4.4495090E−05 | −1.0014707E−05 |
| 10 | 8.5987309E−04 | −4.3247304E−06 | −5.8773983E−05 | 6.6461829E−06 |
| 11 | −9.0768253E−04 | 3.9617359E−05 | 7.7910035E−06 | −1.9930247E−07 |

TABLE 7

Example 4•Basic Lens Data

| | Si (Surface Number) | Ri (Radius of Curvature) | Di (Surface Spacing) | Ndj (Refractive Index) | vdj (Abbe Number) |
|---|---|---|---|---|---|
| | 1 (Aperture Diaphragm) | — | −0.2000 | | |
| G1 | 2 | 4.0688 | 0.8756 | 1.68986 | 53.2 |
| | 3 | 24.5034 | 0.1040 | | |
| G2 | 4 | 9.3035 | 0.6250 | 1.63171 | 23.3 |
| | 5 | 3.8720 | 0.6558 | | |
| G3 | 6 | 8.4124 | 0.8342 | 1.53112 | 55.4 |
| | 7 | 35.8662 | 1.3253 | | |
| G4 | 8 | −4.4939 | 0.9991 | 1.53112 | 55.4 |
| | 9 | −2.4337 | 0.1000 | | |
| G5 | 10 | 7.3050 | 1.4770 | 1.50956 | 56.5 |
| | 11 | 2.3719 | 1.3210 | | |
| GC | 12 | ∞ | 0.3000 | 1.51825 | 64.1 |
| | 13 | ∞ | 1.0970 | | |

TABLE 9

Example 5•Basic Lens Data

| | Si (Surface Number) | Ri (Radius of Curvature) | Di (Surface Spacing) | Ndj (Refractive Index) | vdj (Abbe Number) |
|---|---|---|---|---|---|
| | 1 (Aperture Diaphragm) | — | −0.1000 | | |
| G1 | 2 | 4.8213 | 0.8458 | 1.68986 | 53.2 |
| | 3 | −38.6695 | 0.3755 | | |
| G2 | 4 | −14.6754 | 0.6498 | 1.63171 | 23.3 |
| | 5 | 8.2683 | 0.5636 | | |
| G3 | 6 | 6.8131 | 0.7726 | 1.68986 | 53.2 |
| | 7 | 11.3242 | 1.4799 | | |
| G4 | 8 | −30.5361 | 1.1526 | 1.53112 | 55.4 |
| | 9 | −1.7386 | 0.1000 | | |
| G5 | 10 | 7.6734 | 0.6508 | 1.50956 | 56.5 |
| | 11 | 1.2829 | 1.3210 | | |
| GC | 12 | ∞ | 0.3000 | 1.51825 | 64.1 |
| | 13 | ∞ | 1.4384 | | |

TABLE 8

Example 4•Aspheric Surface Data

| Surface Number | K | A3 | A4 | A5 | A6 |
|---|---|---|---|---|---|
| 2 | 2.2122284E+00 | −1.5057807E−03 | −2.2107536E−03 | −7.3474930E−03 | 6.0331257E−03 |
| 3 | 1.7289343E+01 | 4.7407067E−03 | −5.7994622E−02 | 5.8178534E−02 | −2.9586510E−02 |
| 4 | −1.0101835E+02 | 1.3420775E−02 | −8.0098025E−02 | 8.3541109E−02 | −3.7891305E−02 |
| 5 | 9.8549655E−01 | 1.0124422E−02 | −5.4319057E−02 | 3.9679527E−02 | −1.1224996E−02 |
| 6 | 3.9531421E+00 | 8.3335023E−04 | −8.9482697E−03 | −9.2401559E−03 | 4.9876241E−03 |
| 7 | 9.8936912E+01 | 4.9939593E−03 | −7.6468540E−03 | −6.3549072E−04 | −1.4512379E−03 |
| 8 | −1.5655636E+01 | 1.1573814E−03 | 3.8967214E−03 | 4.9401519E−03 | −5.3075985E−03 |
| 9 | −5.9646002E+00 | −1.2942118E−02 | 2.5496719E−03 | 3.0221343E−03 | −1.1129269E−04 |
| 10 | −2.0922784E+01 | −4.7914394E−03 | −1.1877572E−02 | 1.5464871E−03 | −5.4590434E−05 |
| 11 | −7.2697237E+00 | 1.0333060E−02 | −2.1767729E−02 | 7.9319562E−03 | −1.0233669E−03 |

| | A7 | A8 | A9 | A10 |
|---|---|---|---|---|
| 2 | 2.1144551E−03 | −1.0165627E−02 | 7.7075002E−03 | −1.9458445E−03 |
| 3 | 2.0636195E−02 | −1.2124699E−02 | 2.1349228E−03 | 2.1382799E−04 |
| 4 | 2.8034089E−02 | −2.0452606E−02 | 5.2902791E−03 | −5.9699432E−05 |
| 5 | 6.4952744E−03 | −4.9589920E−03 | 7.2215945E−04 | 1.8034240E−04 |
| 6 | 4.7325528E−03 | −4.9998281E−03 | 2.0728521E−03 | −3.6370190E−04 |
| 7 | 1.6161319E−03 | −1.0490110E−03 | 5.8014377E−04 | −1.0568181E−04 |
| 8 | 7.5948507E−04 | 1.2623058E−04 | 5.9807614E−06 | −2.1291657E−05 |
| 9 | −4.2124210E−04 | 3.3130115E−05 | −2.9970904E−06 | 3.0313990E−06 |
| 10 | 2.2878382E−04 | −6.1714785E−05 | 5.8261132E−06 | −2.3414412E−07 |
| 11 | −2.8570481E−04 | 1.4561774E−04 | −2.5069615E−05 | 1.6142387E−06 |

TABLE 10

Example 5•Aspheric Surface Data

| Surface Number | K | A3 | A4 | A5 | A6 |
|---|---|---|---|---|---|
| 2 | 2.6469660E+00 | −5.5017647E−04 | −6.8833106E−03 | −4.5247037E−03 | 7.7163825E−03 |
| 3 | 4.9970344E+01 | 1.6139535E−03 | −1.2693694E−02 | 2.7263837E−03 | 7.0783232E−05 |
| 4 | 1.6464290E+01 | −1.3445563E−03 | 2.9296634E−04 | −3.1935149E−03 | 8.4609496E−03 |
| 5 | 3.8456773E+00 | 3.8751712E−03 | −2.5697336E−02 | 1.6867235E−02 | 3.8646233E−03 |
| 6 | −7.3790775E+01 | 4.4620556E−03 | −8.7305846E−03 | −4.7303103E−03 | 1.5778465E−03 |
| 7 | −1.4110522E+02 | 2.4118786E−03 | −1.6737707E−02 | 2.3551103E−03 | −8.2249076E−04 |
| 8 | 7.6743982E+01 | 7.8253312E−03 | −1.5097634E−02 | 6.6405666E−03 | 4.2045097E−04 |
| 9 | −6.7663862E+00 | −3.2573192E−02 | 7.1367410E−03 | 1.4801029E−03 | 9.9575764E−04 |
| 10 | −8.0872803E+01 | −4.9336909E−02 | 7.1530365E−03 | −1.8864091E−04 | −1.5270070E−04 |
| 11 | −4.4972524E+00 | −4.6208757E−02 | 9.1010043E−03 | −1.7382719E−03 | 8.8775751E−04 |

| Surface Number | A7 | A8 | A9 | A10 |
|---|---|---|---|---|
| 2 | −7.8433747E−03 | 1.0132531E−03 | 2.1028385E−03 | −9.4380220E−04 |
| 3 | 1.0550576E−03 | −9.5987235E−04 | −8.1684998E−04 | 3.8774723E−04 |
| 4 | 2.8301802E−03 | −4.6626665E−04 | −5.8150984E−04 | 7.5865701E−04 |
| 5 | −1.2664045E−03 | −2.3107217E−03 | 5.4549288E−04 | 4.7340874E−05 |
| 6 | 2.8246002E−04 | −5.6133714E−05 | 4.2694887E−04 | −1.6074689E−04 |
| 7 | 3.5842203E−04 | 3.4488705E−05 | 3.0920941E−06 | 2.2507795E−05 |
| 8 | −8.2840305E−04 | −7.2437345E−05 | 7.3795280E−05 | −5.4170372E−06 |
| 9 | −4.5473321E−04 | 3.9704808E−05 | −4.6061678E−06 | 8.8754797E−07 |
| 10 | 1.6927776E−04 | −2.6747389E−06 | −1.0910889E−05 | 1.2662132E−06 |
| 11 | −3.0061749E−04 | 2.7408925E−05 | 3.5715602E−06 | −6.1424842E−07 |

TABLE 11

Example 6•Basic Lens Data

| | Si (Surface Number) | Ri (Radius of Curvature) | Di (Surface Spacing) | Ndj (Refractive Index) | νdj (Abbe Number) |
|---|---|---|---|---|---|
| | 1 (Aperture Diaphragm) | — | −0.0900 | | |
| G1 | 2 | 2.2332 | 0.5734 | 1.53339 | 55.9 |
| | 3 | −7.6772 | 0.1000 | | |
| G2 | 4 | 6.9070 | 0.4000 | 1.63351 | 23.6 |
| | 5 | 2.0027 | 0.3353 | | |
| G3 | 6 | 3.6082 | 0.5503 | 1.53339 | 55.9 |
| | 7 | 6.4731 | 0.4503 | | |
| G4 | 8 | −7.3699 | 0.7880 | 1.53339 | 55.9 |
| | 9 | −1.0668 | 0.1000 | | |
| G5 | 10 | 1.6806 | 0.4141 | 1.53339 | 55.9 |
| | 11 | 0.6217 | 0.6000 | | |
| GC | 12 | ∞ | 0.1450 | 1.51633 | 64.1 |
| | 13 | ∞ | 0.4207 | | |

TABLE 12

Example 6•Aspheric Surface Data

| Surface Number | K | A3 | A4 | A5 | A6 |
|---|---|---|---|---|---|
| 2 | 1.7225467E+00 | −2.2871883E−02 | 1.4991957E−01 | −7.1526603E−01 | 9.7269252E−01 |
| 3 | 0.0000000E+00 | 3.8634354E−02 | −4.5296378E−01 | 1.1430204E+00 | −1.9147638E+00 |
| 4 | 0.0000000E+00 | 4.4405676E−02 | −5.2454281E−01 | 1.1975100E+00 | −2.0644832E+00 |
| 5 | 3.9148721E+00 | 4.0924355E−02 | −4.2549258E−01 | 6.7101148E−01 | −6.2879148E−01 |
| 6 | −1.4865722E+01 | −1.5914585E−02 | 3.7287612E−02 | −4.1391882E−01 | 4.6825801E−01 |
| 7 | −2.2500109E+02 | −2.1022896E−02 | 2.2642402E−01 | −5.9099110E−01 | 3.5594436E−01 |
| 8 | 1.6560866E+01 | −6.1653033E−02 | 4.0367083E−01 | −7.1702502E−01 | 3.9129737E−01 |
| 9 | −1.0228922E+01 | −3.4078359E−01 | 2.7839610E−01 | −3.2616948E−02 | −1.1374494E−01 |
| 10 | −6.2728982E+00 | −2.1420953E−01 | −8.5896798E−02 | 1.0474134E−01 | −1.8996120E−02 |
| 11 | −4.0054792E+00 | 2.5883967E−02 | −2.9884739E−01 | 2.6577511E−01 | −4.6397460E−02 |

| Surface Number | A7 | A8 | A9 | A10 |
|---|---|---|---|---|
| 2 | 4.5967845E−01 | −3.0311879E+00 | 3.2859603E+00 | −1.2141624E+00 |
| 3 | 2.6151660E+00 | −2.8008950E+00 | 1.7539036E+00 | −4.6449968E−01 |
| 4 | 3.6136654E+00 | −4.4623276E+00 | 2.8859846E+00 | −7.2176920E−01 |
| 5 | 7.4649891E−01 | −8.4683039E−01 | 4.9949302E−01 | −1.0837182E−01 |

TABLE 12-continued

Example 6•Aspheric Surface Data

| | | | | |
|---|---|---|---|---|
| 6 | 4.2658976E−01 | −1.2737952E+00 | 9.8860518E−01 | −2.6666781E−01 |
| 7 | 3.1331946E−01 | −5.5465639E−01 | 2.8013754E−01 | −4.8072028E−02 |
| 8 | 1.0391569E−01 | −2.6262516E−01 | 1.5675555E−01 | −3.8502743E−02 |
| 9 | −1.0576123E−02 | 7.2748733E−02 | −1.7248250E−02 | −2.3624352E−03 |
| 10 | 1.1241371E−02 | −1.1316970E−02 | 3.7457747E−03 | −4.1159358E−04 |
| 11 | −6.5310045E−02 | 4.5990149E−02 | −1.2108874E−02 | 1.1883710E−03 |

TABLE 13

Example 7•Basic Lens Data

| | Si (Surface Number) | Ri (Radius of Curvature) | Di (Surface Spacing) | Ndj (Refractive Index) | νdj (Abbe Number) |
|---|---|---|---|---|---|
| | 1 (Aperture Diaphragm) | — | −0.0900 | | |
| G1 | 2 | 2.2433 | 0.5733 | 1.53339 | 55.9 |
| | 3 | −7.8455 | 0.1000 | | |
| G2 | 4 | 6.9750 | 0.4000 | 1.63351 | 23.6 |
| | 5 | 2.0147 | 0.3087 | | |
| G3 | 6 | 3.6294 | 0.5681 | 1.53339 | 55.9 |
| | 7 | 7.5787 | 0.4690 | | |
| G4 | 8 | −7.3637 | 0.7167 | 1.53339 | 55.9 |
| | 9 | −1.0940 | 0.1109 | | |
| G5 | 10 | 1.6311 | 0.4198 | 1.53339 | 55.9 |
| | 11 | 0.6189 | 0.6000 | | |
| GC | 12 | ∞ | 0.1450 | 1.51633 | 64.1 |
| | 13 | ∞ | 0.3715 | | |

TABLE 15

Example 8•Basic Lens Data

| | Si (Surface Number) | Ri (Radius of Curvature) | Di (Surface Spacing) | Ndj (Refractive Index) | νdj (Abbe Number) |
|---|---|---|---|---|---|
| | 1 (Aperture Diaphragm) | — | −0.0900 | | |
| G1 | 2 | 2.2947 | 0.5789 | 1.53339 | 55.9 |
| | 3 | −6.9045 | 0.1000 | | |
| G2 | 4 | 7.3628 | 0.4000 | 1.63351 | 23.6 |
| | 5 | 2.0143 | 0.3224 | | |
| G3 | 6 | 3.4106 | 0.4701 | 1.53339 | 55.9 |
| | 7 | 6.2565 | 0.4731 | | |
| G4 | 8 | −6.7626 | 0.7385 | 1.53339 | 55.9 |
| | 9 | −1.1131 | 0.1000 | | |
| G5 | 10 | 1.4164 | 0.4010 | 1.53339 | 55.9 |
| | 11 | 0.6084 | 0.6000 | | |
| GC | 12 | ∞ | 0.1450 | 1.51633 | 64.1 |
| | 13 | ∞ | 0.4485 | | |

TABLE 14

Example 7•Aspheric Surface Data

| Surface Number | K | A3 | A4 | A5 | A6 |
|---|---|---|---|---|---|
| 2 | 1.7720806E+00 | −2.3641036E−02 | 1.4927621E−01 | −7.1565859E−01 | 9.7207144E−01 |
| 3 | 0.0000000E+00 | 3.8913017E−02 | −4.5595655E−01 | 1.1419873E+00 | −1.9154282E+00 |
| 4 | 0.0000000E+00 | 4.4296473E−02 | −5.2458376E−01 | 1.1971060E+00 | −2.0649909E+00 |
| 5 | 3.8480009E−01 | 4.0202770E−02 | −4.2499942E−01 | 6.7157497E−01 | −6.2836080E−01 |
| 6 | −1.5620956E+01 | −1.5894263E−02 | 3.8324462E−02 | −4.1306671E−01 | 4.6850231E−01 |
| 7 | −3.3984115E+02 | −2.3087158E−02 | 2.2612397E−01 | −5.9195364E−01 | 3.5490601E−01 |
| 8 | 1.6520887E+01 | −5.5681968E−02 | 4.0291092E−01 | −7.1740409E−01 | 3.9019588E−01 |
| 9 | −1.0820266E+01 | −3.4179795E−01 | 2.7834548E−01 | −3.2233374E−02 | −1.1294774E−01 |
| 10 | −6.9008151E+00 | −2.0822981E−01 | −8.5522366E−02 | 1.0475290E−01 | −1.8970985E−02 |
| 11 | −3.9667786E+00 | 2.7129400E−02 | −2.9596668E−01 | 2.6495454E−01 | −4.6424645E−02 |

| | A7 | A8 | A9 | A10 |
|---|---|---|---|---|
| 2 | 4.5904606E−01 | −3.0316677E+00 | 3.2852896E+00 | −1.2135927E+00 |
| 3 | 2.6152276E+00 | −2.8005733E+00 | 1.7545604E+00 | −4.6503584E−01 |
| 4 | 3.6132970E+00 | −4.4626526E+00 | 2.8861074E+00 | −7.2135948E−01 |
| 5 | 7.4673518E−01 | −8.4665884E−01 | 4.9925851E−01 | −1.0874836E−01 |
| 6 | 4.2660122E−01 | −1.2739197E+00 | 9.8846714E−01 | −2.6676943E−01 |
| 7 | 3.1274643E−01 | −5.5475594E−01 | 2.8001305E−01 | −4.8078653E−02 |
| 8 | 1.0322945E−01 | −2.6283585E−01 | 1.5669014E−01 | −3.8489935E−02 |
| 9 | −1.0452332E−02 | 7.2809392E−02 | −1.7222877E−02 | −2.3783424E−03 |
| 10 | 1.1246068E−02 | −1.1320593E−02 | 3.7444503E−03 | −4.1152160E−04 |
| 11 | −6.5214631E−02 | 4.6010466E−02 | −1.2111947E−02 | 1.1869086E−03 |

TABLE 16

Example 8・Aspheric Surface Data

| Surface Number | K | A3 | A4 | A5 | A6 |
|---|---|---|---|---|---|
| 2 | 1.7767865E+00 | −2.4416632E−02 | 1.4819985E−01 | −7.0869942E−01 | 9.6978791E−01 |
| 3 | 0.0000000E+00 | 4.2259936E−02 | −4.5590664E−01 | 1.1424874E+00 | −1.9195059E+00 |
| 4 | 0.0000000E+00 | 4.8640823E−02 | −5.2372723E−01 | 1.1964125E+00 | −2.0659644E+00 |
| 5 | 3.3201597E−01 | 4.1620049E−02 | −4.2317888E−01 | 6.7134825E−01 | −6.2882988E−01 |
| 6 | −1.6228059E+01 | −2.1694421E−02 | 3.3506855E−02 | −4.1476716E−01 | 4.6651331E−01 |
| 7 | −1.9541364E+02 | −3.4636732E−02 | 2.2437631E−01 | −5.9630870E−01 | 3.5378419E−01 |
| 8 | 1.5225957E+01 | −6.2595305E−02 | 4.0473408E−01 | −7.1500493E−01 | 3.9175344E−01 |
| 9 | −1.0933329E+01 | −3.5675108E−01 | 2.8223257E−01 | −2.9135928E−02 | −1.1178005E−01 |
| 10 | −5.7980917E+00 | −2.0897724E−01 | −8.7158858E−02 | 1.0441190E−01 | −1.8989809E−02 |
| 11 | −3.7745367E+00 | 2.7128062E−02 | −3.0219734E−01 | 2.6587470E−01 | −4.6243798E−02 |

| Surface Number | A7 | A8 | A9 | A10 |
|---|---|---|---|---|
| 2 | 4.5378014E−01 | −3.0401584E+00 | 3.2907514E+00 | −1.2077217E+00 |
| 3 | 2.6129863E+00 | −2.8010698E+00 | 1.7586789E+00 | −4.6641827E−01 |
| 4 | 3.6122435E+00 | −4.4636475E+00 | 2.8853499E+00 | −7.1994537E−01 |
| 5 | 7.4636505E−01 | −8.4681472E−01 | 4.9943061E−01 | −1.0846272E−01 |
| 6 | 4.2448317E−01 | −1.2744424E+00 | 9.8863773E−01 | −2.6570121E−01 |
| 7 | 3.1216621E−01 | −5.5526237E−01 | 2.7948051E−01 | −4.8961164E−02 |
| 8 | 1.0380391E−01 | −2.6330992E−01 | 1.5618964E−01 | −3.9074913E−02 |
| 9 | −9.9943738E−03 | 7.2134926E−02 | −1.7382724E−02 | −2.3404937E−03 |
| 10 | 1.1241069E−02 | −1.1319415E−02 | 3.7447363E−03 | −4.1018767E−04 |
| 11 | −6.5120647E−02 | 4.5954560E−02 | −1.2109069E−02 | 1.1851884E−03 |

TABLE 17

Example 9・Basic Lens Data

| | Si (Surface Number) | Ri (Radius of Curvature) | Di (Surface Spacing) | Ndj (Refractive Index) | νdj (Abbe Number) |
|---|---|---|---|---|---|
| G1 | 1 | 2.2469 | 0.5397 | 1.53339 | 55.9 |
|    | 2 | −8.5048 | 0.0000 | | |
|    | 3 (Aperture Diaphragm) | — | 0.1000 | | |
| G2 | 4 | 6.9780 | 0.4000 | 1.63351 | 23.6 |
|    | 5 | 2.0578 | 0.3582 | | |
| G3 | 6 | 3.6321 | 0.5449 | 1.53339 | 55.9 |
|    | 7 | 7.5993 | 0.4222 | | |
| G4 | 8 | −6.9838 | 0.8940 | 1.53339 | 55.9 |
|    | 9 | −1.1517 | 0.1000 | | |
| G5 | 10 | 1.5751 | 0.4245 | 1.53339 | 55.9 |
|    | 11 | 0.6356 | 0.6000 | | |
| GC | 12 | ∞ | 0.1450 | 1.51633 | 64.1 |
|    | 13 | ∞ | 0.4302 | | |

TABLE 18

Example 9・Aspheric Surface Data

| Surface Number | K | A3 | A4 | A5 | A6 |
|---|---|---|---|---|---|
| 1 | 1.5548927E+00 | −2.6414855E−02 | 1.5433541E−01 | −7.0735809E−01 | 9.7539518E−01 |
| 2 | 0.0000000E+00 | 3.2445812E−02 | −4.4204892E−01 | 1.1474418E+00 | −1.9113122E+00 |
| 4 | 0.0000000E+00 | 3.9069686E−02 | −5.2040949E−01 | 1.2039024E+00 | −2.0588265E+00 |
| 5 | 3.8569578E−01 | 4.4547541E−02 | −4.2574042E−01 | 6.7019682E−01 | −6.2773057E−01 |
| 6 | −9.9177812E+00 | −1.4512188E−02 | 3.8171740E−02 | −4.1279785E−01 | 4.6959087E−01 |
| 7 | −2.8665779E+02 | −3.1312777E−02 | 2.2843608E−01 | −5.9220595E−01 | 3.5443834E−01 |
| 8 | 1.8619421E+01 | −6.5767950E−02 | 3.9657621E−01 | −7.1928385E−01 | 3.9042796E−01 |
| 9 | −1.1345491E+01 | −3.3832022E−01 | 2.7806288E−01 | −3.2529908E−02 | −1.1316854E−01 |
| 10 | −4.5497597E+00 | −2.0919040E−01 | −8.6034995E−02 | 1.0455378E−01 | −1.9063841E−02 |
| 11 | −3.8686078E+00 | 3.8271921E−02 | −3.0103768E−01 | 2.6584393E−01 | −4.6182534E−02 |

| Surface Number | A7 | A8 | A9 | A10 |
|---|---|---|---|---|
| 1 | 4.5496631E−01 | −3.0386546E+00 | 3.2846290E+00 | −1.1975096E+00 |
| 2 | 2.6190482E+00 | −2.7982252E+00 | 1.7517516E+00 | −4.7191316E−01 |
| 4 | 3.6159099E+00 | −4.4655540E+00 | 2.8789933E+00 | −7.2701015E−01 |
| 5 | 7.4909311E−01 | −8.4500614E−01 | 4.9794099E−01 | −1.1456844E−01 |

TABLE 18-continued

Example 9•Aspheric Surface Data

| | | | | |
|---|---|---|---|---|
| 6 | 4.2793562E−01 | −1.2727574E+00 | 9.8901565E−01 | −2.6710130E−01 |
| 7 | 3.1278406E−01 | −5.5435344E−01 | 2.8087072E−01 | −4.7212824E−02 |
| 8 | 1.0396394E−01 | −2.6218738E−01 | 1.5707354E−01 | −3.8495550E−02 |
| 9 | −1.0173874E−02 | 7.2840028E−02 | −1.7336366E−02 | −2.5075335E−03 |
| 10 | 1.1229179E−02 | −1.1316278E−02 | 3.7492070E−03 | −4.0880739E−04 |
| 11 | −6.5226634E−02 | 4.6012009E−02 | −1.2105060E−02 | 1.1886120E−03 |

TABLE 19

Example 10•Basic Lens Data

| | Si (Surface Number) | Ri (Radius of Curvature) | Di (Surface Spacing) | Ndj (Refractive Index) | νdj (Abbe Number) |
|---|---|---|---|---|---|
| G1 | 1 | 2.1475 | 0.4816 | 1.53339 | 55.9 |
| | 2 | −507800.9011 | 0.0500 | | |
| | 3 (Aperture Diaphragm) | — | 0.1000 | | |
| G2 | 4 | 5.6431 | 0.4000 | 1.63351 | 23.6 |
| | 5 | 2.0879 | 0.3133 | | |
| G3 | 6 | 3.4046 | 0.5069 | 1.53339 | 55.9 |
| | 7 | 6.9183 | 0.5054 | | |
| G4 | 8 | −8.0942 | 0.7694 | 1.53339 | 55.9 |
| | 9 | −1.1435 | 0.1000 | | |
| G5 | 10 | 1.5349 | 0.4083 | 1.53339 | 55.9 |
| | 11 | 0.6543 | 0.6000 | | |
| GC | 12 | ∞ | 0.1450 | 1.51633 | 64.1 |
| | 13 | ∞ | 0.6084 | | |

TABLE 21

Example 11•Basic Lens Data

| | Si (Surface Number) | Ri (Radius of Curvature) | Di (Surface Spacing) | Ndj (Refractive Index) | νdj (Abbe Number) |
|---|---|---|---|---|---|
| G1 | 1 | 2.1309 | 0.4546 | 1.53339 | 55.9 |
| | 2 | 89.2662 | 0.0500 | | |
| | 3 (Aperture Diaphragm) | — | 0.1000 | | |
| G2 | 4 | 5.9790 | 0.4000 | 1.63351 | 23.6 |
| | 5 | 2.1148 | 0.2881 | | |
| G3 | 6 | 3.3366 | 0.4888 | 1.53339 | 55.9 |
| | 7 | 7.3444 | 0.5398 | | |
| G4 | 8 | −8.4891 | 0.7407 | 1.53339 | 55.9 |
| | 9 | −1.1411 | 0.1000 | | |
| G5 | 10 | 1.5139 | 0.4015 | 1.53339 | 55.9 |
| | 11 | 0.6560 | 0.6000 | | |
| GC | 12 | ∞ | 0.1450 | 1.51633 | 64.1 |
| | 13 | ∞ | 0.6255 | | |

TABLE 20

Example 10•Aspheric Surface Data

| Surface Number | K | A3 | A4 | A5 | A6 |
|---|---|---|---|---|---|
| 1 | 1.3501774E+00 | −2.1384287E−02 | 1.5736183E−01 | −6.9998709E−01 | 9.8517341E−01 |
| 2 | 0.0000000E+00 | 4.6586984E−02 | −4.4242964E−01 | 1.1431781E+00 | −1.9117542E+00 |
| 4 | 0.0000000E+00 | 5.1961046E−02 | −5.3205381E−01 | 1.1877028E+00 | −2.0700524E+00 |
| 5 | 2.6194440E−01 | 4.4507917E−02 | −4.2852942E−01 | 6.6740701E−01 | −6.2936686E−01 |
| 6 | −1.2194472E+01 | −1.8245184E−02 | 3.6729466E−02 | −4.1293453E−01 | 4.7006960E−01 |
| 7 | −2.8342189E+02 | −2.9152851E−02 | 2.2865991E−01 | −5.9237699E−01 | 3.5391231E−01 |
| 8 | 1.9286484E+01 | −6.1009036E−02 | 4.0202635E−01 | −7.1697380E−01 | 3.9081136E−01 |
| 9 | −1.0969106E+01 | −3.4466700E−01 | 2.7525095E−01 | −3.3061325E−02 | −1.1301251E−01 |
| 10 | −5.4894827E+00 | −2.1014472E−01 | −8.5783872E−02 | 1.0472556E−01 | −1.8993798E−02 |
| 11 | −3.9785315E+00 | 3.2948340E−02 | −3.0450965E−01 | 2.6559846E−01 | −4.6066872E−02 |

| | A7 | A8 | A9 | A10 |
|---|---|---|---|---|
| 1 | 4.6366594E−01 | −3.0334032E+00 | 3.2857973E+00 | −1.1997217E+00 |
| 2 | 2.6236811E+00 | −2.7913759E+00 | 1.7557001E+00 | −4.7754012E−01 |
| 4 | 3.6114564E+00 | −4.4648468E+00 | 2.8817473E+00 | −7.2543341E−01 |
| 5 | 7.4867357E−01 | −8.4474922E−01 | 4.9835388E−01 | −1.1423978E−01 |
| 6 | 4.2843724E−01 | −1.2725801E+00 | 9.8874310E−01 | −2.6779644E−01 |
| 7 | 3.1213185E−01 | −5.5494438E−01 | 2.8041981E−01 | −4.7522774E−02 |
| 8 | 1.0369106E−01 | −2.6253035E−01 | 1.5680827E−01 | −3.8679660E−02 |
| 9 | −9.9529156E−03 | 7.2970293E−02 | −1.7288545E−02 | −2.5061898E−03 |
| 10 | 1.1248774E−02 | −1.1315706E−02 | 3.7447875E−03 | −4.1319790E−04 |
| 11 | −6.5170845E−02 | 4.6023954E−02 | −1.2106046E−02 | 1.1860713E−03 |

TABLE 22

Example 11•Aspheric Surface Data

| Surface Number | K | A3 | A4 | A5 | A6 |
|---|---|---|---|---|---|
| 1 | 1.1055618E+00 | −2.1390196E−02 | 1.5790455E−01 | −6.9516009E−01 | 9.9035113E−01 |
| 2 | 0.0000000E+00 | 5.1335901E−02 | −4.4520404E−01 | 1.1407300E+00 | −1.9092037E+00 |
| 4 | 0.0000000E+00 | 5.5184492E−02 | −5.3181270E−01 | 1.1844630E+00 | −2.0721834E+00 |
| 5 | 2.8781043E−01 | 4.5636042E−02 | −4.2777227E−01 | 6.6750744E−01 | −6.2965649E−01 |
| 6 | −1.1836107E+01 | −1.7483633E−02 | 3.6596972E−02 | −4.1281962E−01 | 4.7046485E−01 |
| 7 | −3.4584850E+02 | −2.7189018E−02 | 2.2916614E−01 | −5.9255397E−01 | 3.5348913E−01 |
| 8 | 1.7732820E+01 | −6.2462758E−02 | 4.0452844E−01 | −7.1616782E−01 | 3.9073713E−01 |
| 9 | −1.1226106E+01 | −3.4788471E−01 | 2.7362131E−01 | −3.2999589E−02 | −1.1260731E−01 |
| 10 | −5.3952971E+00 | −2.1368521E−01 | −8.6121620E−02 | 1.0466345E−01 | −1.8996376E−02 |
| 11 | −4.0678696E+00 | 3.8378501E−02 | −3.0730472E−01 | 2.6497507E−01 | −4.6107352E−02 |

| | A7 | A8 | A9 | A10 |
|---|---|---|---|---|
| 1 | 4.6593117E−01 | −3.0348807E+00 | 3.2816318E+00 | −1.2045123E+00 |
| 2 | 2.6293018E+00 | −2.7876657E+00 | 1.7514891E+00 | −4.9591740E−01 |
| 4 | 3.6121050E+00 | −4.4633974E+00 | 2.8798464E+00 | −7.3556344E−01 |
| 5 | 7.4794948E−01 | −8.4570240E−01 | 4.9769029E−01 | −1.1391368E−01 |
| 6 | 4.2881320E−01 | −1.2724255E+00 | 9.8855117E−01 | −2.6833916E−01 |
| 7 | 3.1172094E−01 | −5.5525660E−01 | 2.8026979E−01 | −4.7503747E−02 |
| 8 | 1.0352105E−01 | −2.6260211E−01 | 1.5679189E−01 | −3.8694807E−02 |
| 9 | −9.6636623E−03 | 7.3095869E−02 | −1.7266433E−02 | −2.5293744E−03 |
| 10 | 1.1254002E−02 | −1.1312277E−02 | 3.7460732E−03 | −4.1312559E−04 |
| 11 | −6.5161242E−02 | 4.6030936E−02 | −1.2104625E−02 | 1.1855436E−03 |

TABLE 23

Example 12•Basic Lens Data

| | Si (Surface Number) | Ri (Radius of Curvature) | Di (Surface Spacing) | Ndj (Refractive Index) | νdj (Abbe Number) |
|---|---|---|---|---|---|
| G1 | 1 | 2.1002 | 0.4523 | 1.53339 | 55.9 |
| | 2 | 92.7065 | 0.0500 | | |
| | 3 (Aperture Diaphragm) | — | 0.1000 | | |
| G2 | 4 | 5.7016 | 0.4000 | 1.63351 | 23.6 |
| | 5 | 2.2186 | 0.3247 | | |
| | 6 | 3.1376 | 0.6450 | 1.53339 | 55.9 |
| G3 | 7 | 9.3298 | 10.4668 | | |
| G4 | 8 | −17.8638 | 10.7542 | 1.53339 | 55.9 |
| | 9 | −1.0298507800.9011 | 0.1483 | | |
| G5 | 10 | | 0.4576 | 1.53339 | 55.9 |
| | 11 | 0.8882 | 0.6000 | | |
| GC | 12 | ∞ | 0.1450 | 1.51633 | 64.1 |
| | 13 | ∞ | 0.3068 | | |

TABLE 24

Example 12•Aspheric Surface Data

| Surface Number | K | A3 | A4 | A5 | A6 |
|---|---|---|---|---|---|
| 1 | 1.0162139E+00 | −2.1679655E−02 | 1.5561070E−01 | −6.9693414E−01 | 9.8905928E−01 |
| 2 | 0.0000000E+00 | 5.0452774E−02 | −4.4673095E−01 | 1.1392809E+00 | −1.9099516E+00 |
| 4 | 0.0000000E+00 | 5.5858573E−02 | −5.2940068E−01 | 1.1867947E+00 | −2.0703190E+00 |
| 5 | 3.1290231E−01 | 4.4421440E−02 | −4.2746832E−01 | 6.6816198E−01 | −6.2926193E−01 |
| 6 | −1.0022310E+01 | −1.2419035E−02 | 3.8013644E−02 | −4.1215847E−01 | 4.7090488E−01 |
| 7 | −3.4661726E+02 | −2.8060893E−02 | 2.2914863E−01 | −5.9289620E−01 | 3.5310148E−01 |
| 8 | 3.6884123E+01 | −8.1660688E−02 | 3.9921551E−01 | −7.1782794E−01 | 3.8897386E−01 |
| 9 | −8.4961245E+00 | −3.4352765E−01 | 2.7426561E−01 | −3.3591537E−02 | −1.1288401E−01 |
| 10 | −1.0100001E+02 | −1.9765135E−01 | −8.2475422E−02 | 1.0621554E−01 | −1.8440110E−02 |
| 11 | −6.5249133E+00 | 4.5324066E−02 | −2.9928915E−01 | 2.6527176E−01 | −4.6323689E−02 |

| | A7 | A8 | A9 | A10 |
|---|---|---|---|---|
| 1 | 4.6405313E−01 | −3.0370030E+00 | 3.2795541E+00 | −1.2062440E+00 |
| 2 | 2.6290610E+00 | −2.7879909E+00 | 1.7502568E+00 | −4.9896177E−01 |
| 4 | 3.6137696E+00 | −4.4617900E+00 | 2.8813226E+00 | −7.3519237E−01 |
| 5 | 7.4776102E−01 | −8.4643624E−01 | 4.9650578E−01 | −1.1462089E−01 |

TABLE 24-continued

Example 12•Aspheric Surface Data

| | | | | |
|---|---|---|---|---|
| 6 | 4.2901328E−01 | −1.2725767E+00 | 9.8796193E−01 | −2.6938202E−01 |
| 7 | 3.1161252E−01 | −5.5493105E−01 | 2.8087357E−01 | −4.6626997E−02 |
| 8 | 1.0162807E−01 | −2.6396137E−01 | 1.5612264E−01 | −3.8829717E−02 |
| 9 | −9.6544669E−03 | 7.3180417E−02 | −1.7236450E−02 | −2.5545492E−03 |
| 10 | 1.1287252E−02 | −1.1321402E−02 | 3.7385945E−03 | −4.2753833E−04 |
| 11 | −6.5095388E−02 | 4.6101765E−02 | −1.2097785E−02 | 1.1665278E−03 |

TABLE 25

Example 13•Basic Lens Data

| | | Si (Surface Number) | Ri (Radius of Curvature) | Di (Surface Spacing) | Ndj (Refractive Index) | νdj (Abbe Number) |
|---|---|---|---|---|---|---|
| G1 | { | 1 | 2.2424 | 0.4155 | 1.53339 | 55.9 |
| | | 2 | −12.4973 | 0.0500 | | |
| | | 3 (Aperture Diaphragm) | — | 0.1000 | | |
| G2 | { | 4 | 9.3866 | 0.4000 | 1.63351 | 23.6 |
| | | 5 | 2.2477 | 0.4067 | | |
| G3 | { | 6 | 2.7496 | 0.3897 | 1.53339 | 55.9 |
| | | 7 | 7.7281 | 0.7855 | | |
| G4 | { | 8 | −28.9002 | 0.5817 | 1.53339 | 55.9 |
| | | 9 | −1.0229 | 0.1557 | | |
| G5 | { | 10 | 558580.9912 | 0.4306 | 1.53339 | 55.9 |
| | | 11 | 0.8641 | 0.6000 | | |
| GC | { | 12 | ∞ | 0.1450 | 1.51633 | 64.1 |
| | | 13 | ∞ | 0.2811 | | |

TABLE 27

Example 14•Basic Lens Data

| | | Si (Surface Number) | Ri (Radius of Curvature) | Di (Surface Spacing) | Ndj (Refractive Index) | νdj (Abbe Number) |
|---|---|---|---|---|---|---|
| G1 | { | 1 | 2.0669 | 0.4620 | 1.53339 | 55.9 |
| | | 2 | −239.6368 | 0.0500 | | |
| | | 3 (Aperture Diaphragm) | — | 0.1000 | | |
| G2 | { | 4 | 6.4780 | 0.4000 | 1.63351 | 23.6 |
| | | 5 | 2.1353 | 0.3289 | | |
| G3 | { | 6 | 3.1861 | 0.6226 | 1.53339 | 55.9 |
| | | 7 | 7.9461 | 0.4991 | | |
| G4 | { | 8 | 99.5915 | 0.7469 | 1.53339 | 55.9 |
| | | 9 | −1.0346 | 0.1180 | | |
| G5 | { | 10 | 507800.9011 | 0.4331 | 1.53339 | 55.9 |
| | | 11 | 0.8969 | 0.6000 | | |
| GC | { | 12 | ∞ | 0.1450 | 1.51633 | 64.1 |
| | | 13 | ∞ | 0.4391 | | |

TABLE 26

Example 13•Aspheric Surface Data

| Surface Number | K | A3 | A4 | A5 | A6 |
|---|---|---|---|---|---|
| 1 | 1.1403023E+00 | −2.1983876E−02 | 1.5515124E−01 | −7.0945412E−01 | 9.8451318E−01 |
| 2 | 0.0000000E+00 | 3.6432326E−02 | −3.8816303E−01 | 1.0862827E+00 | −1.9509693E+00 |
| 4 | 0.0000000E+00 | 4.6517894E−02 | −4.9891819E−01 | 1.1756458E+00 | −2.1018531E+00 |
| 5 | 1.8850613E−01 | 4.6132304E−02 | −4.2575320E−01 | 6.5825061E−01 | −6.3698843E−01 |
| 6 | −2.2401572E+00 | −1.2853144E−02 | 2.2796124E−02 | −4.2361792E−01 | 4.6435186E−01 |
| 7 | −4.4673681E+02 | −3.3784848E−02 | 2.5428561E−01 | −6.0292451E−01 | 3.4499344E−01 |
| 8 | 4.8442875E+01 | −9.6237352E−02 | 3.9713674E−01 | −6.9656561E−01 | 3.9068534E−01 |
| 9 | −9.3804827E+00 | −3.0893661E−01 | 2.5143005E−01 | −3.4397216E−02 | −1.0813074E−01 |
| 10 | 9.9000009E+01 | −1.4974062E−01 | −7.9132242E−02 | 1.0344430E−01 | −1.9740194E−02 |
| 11 | −7.4740660E+00 | 8.7460248E−02 | −3.1578876E−01 | 2.6545585E−01 | −4.8193228E−02 |

| | A7 | A8 | A9 | A10 |
|---|---|---|---|---|
| 1 | 4.6967075E−01 | −3.0311039E+00 | 3.2776334E+00 | −1.2060522E+00 |
| 2 | 2.6563614E+00 | −2.7186343E+00 | 1.7894541E+00 | −5.6939645E−01 |
| 4 | 3.6319273E+00 | −4.4081297E+00 | 2.9162871E+00 | −7.9463316E−01 |
| 5 | 7.5254125E−01 | −8.3081501E−01 | 5.0782932E−01 | −1.3011571E−01 |
| 6 | 4.2102389E−01 | −1.2752432E+00 | 9.9238775E−01 | −2.6650111E−01 |
| 7 | 3.0720364E−01 | −5.5747062E−01 | 2.8130756E−01 | −4.4505466E−02 |
| 8 | 9.5509735E−02 | −2.6636972E−01 | 1.5402187E−01 | −3.5015338E−02 |
| 9 | −6.5241108E−03 | 7.4103286E−02 | −1.7595852E−02 | −3.2807476E−03 |
| 10 | 1.0929596E−02 | −1.1376569E−02 | 3.7466464E−03 | −4.0126271E−04 |
| 11 | −6.5105306E−02 | 4.6262235E−02 | −1.2054654E−02 | 1.1621730E−03 |

TABLE 28

Example 14•Aspheric Surface Data

| Surface Number | Coefficient | | | | |
|---|---|---|---|---|---|
| | K | A3 | A4 | A5 | A6 |
| 1 | 9.8552570E−01 | −1.7839020E−02 | 1.5189359E−01 | −6.9624921E−01 | 9.9357009E−01 |
| 2 | 0.0000000E+00 | 5.2818036E−02 | −4.4573597E−01 | 1.1389850E+00 | −1.9067154E+00 |
| 4 | 0.0000000E+00 | 5.2981708E−02 | −5.2805849E−01 | 1.1859782E+00 | −2.0711103E+00 |
| 5 | 2.8902789E−01 | 4.4627726E−02 | −4.2793240E−01 | 6.6771727E−01 | −6.3020915E−01 |
| 6 | −7.9134165E+00 | −7.6093078E−03 | 3.8105224E−02 | −4.1398390E−01 | 4.6913003E−01 |
| 7 | −3.1636092E+02 | −2.5048876E−02 | 2.3239116E−01 | −5.9397315E−01 | 3.5082989E−01 |
| 8 | −2.7064449E+01 | −8.5946588E−02 | 3.9783002E−01 | −7.1805450E−01 | 3.8924878E−01 |
| 9 | −9.9667787E+00 | −3.4444110E−01 | 2.7576141E−01 | −3.2915661E−02 | −1.1256086E−01 |
| 10 | −1.0100001E+02 | −1.8904383E−01 | −8.6215699E−02 | 1.0520800E−01 | −1.8463545E−02 |
| 11 | −7.7320212E+00 | 5.3326353E−02 | −2.9420996E−01 | 2.5909971E−01 | −4.8593308E−02 |
| | A7 | A8 | A9 | A10 | |
| 1 | 4.6877350E−01 | −3.0342859E+00 | 3.2800156E+00 | −1.2072274E+00 | |
| 2 | 2.6354961E−01 | −2.7817608E+00 | 1.7516839E+00 | −5.0745620E−01 | |
| 4 | 3.6139859E+00 | −4.4617766E+00 | 2.8797186E+00 | −7.3838260E−01 | |
| 5 | 7.4594782E−01 | −8.4817138E−01 | 4.9634636E−01 | −1.1188332E−01 | |
| 6 | 4.2841203E−01 | −1.2722798E+00 | 9.8855774E−01 | −2.6901408E−01 | |
| 7 | 3.1045131E−01 | −5.5468982E−01 | 2.8114033E−01 | −4.6928265E−02 | |
| 8 | 1.0220922E−01 | −2.6365376E−01 | 1.5585987E−01 | −3.9649323E−02 | |
| 9 | −9.4967024E−03 | 7.3229093E−02 | −1.7260019E−02 | −2.6122950E−03 | |
| 10 | 1.1393647E−02 | −1.1258047E−02 | 3.7528202E−03 | −4.4054521E−04 | |
| 11 | −6.4776795E−02 | 4.6219417E−02 | −1.2079356E−02 | 1.1611935E−03 | |

TABLE 29

Example 15•Basic Lens Data

| | Si (Surface Number) | Ri (Radius of Curvature) | Di (Surface Spacing) | Ndj (Refractive Index) | νdj (Abbe Number) |
|---|---|---|---|---|---|
| | 1 (Aperture Diaphragm) | — | −0.0900 | | |
| G1 | 2 | 2.0796 | 0.4200 | 1.53339 | 55.9 |
| | 3 | −49.4482 | 0.1500 | | |
| G2 | 4 | 6.8717 | 0.4000 | 1.63351 | 23.6 |
| | 5 | 2.1792 | 0.3226 | | |
| G3 | 6 | 3.0568 | 0.5513 | 1.53339 | 55.9 |
| | 7 | 9.8312 | 0.5638 | | |
| G4 | 8 | −142.7549 | 0.6577 | 1.53339 | 55.9 |
| | 9 | −1.0472 | 0.1803 | | |
| G5 | 10 | −1182.1852 | 0.4045 | 1.53339 | 55.9 |
| | 11 | 0.8500 | 0.6000 | | |
| GC | 12 | ∞ | 0.1450 | 1.51633 | 64.1 |
| | 13 | ∞ | 0.2700 | | |

TABLE 30

Example 15•Aspheric Surface Data

| Surface Number | Coefficient | | | | |
|---|---|---|---|---|---|
| | K | A3 | A4 | A5 | A6 |
| 2 | 8.9958441E−01 | −2.3255357E−02 | 1.4867542E−01 | −6.8962294E−01 | 9.8539314E−01 |
| 3 | 0.0000000E+00 | 5.0615182E−02 | −4.4237793E−01 | 1.1167448E+00 | −1.9150690E+00 |
| 4 | 0.0000000E+00 | 5.9731797E−02 | −5.3601564E−01 | 1.1850672E+00 | −2.0691280E+00 |
| 5 | 3.4567500E−01 | 4.2261027E−02 | −4.2880925E−01 | 6.6949622E−01 | −6.2793170E−01 |
| 6 | −1.0201455E+01 | −9.4768191E−03 | 3.5283158E−02 | −4.1532322E−01 | 4.6999065E−01 |

TABLE 30-continued

Example 15•Aspheric Surface Data

| | | | | | |
|---|---|---|---|---|---|
| 7 | −5.0100001E+02 | −3.6262556E−02 | 2.2628294E−01 | −5.9502676E−01 | 3.5105060E−01 |
| 8 | −1.0080736E+02 | −8.6901689E−02 | 3.9872096E−01 | −7.2260104E−01 | 3.8839437E−01 |
| 9 | −1.0529487E+01 | −3.3654670E−01 | 2.7364287E−01 | −3.3672234E−02 | −1.1296434E−01 |
| 10 | −1.0100001E+02 | −1.8363380E−01 | −7.8540673E−02 | 1.0611118E−01 | −1.8183574E−02 |
| 11 | −7.7566565E+00 | 8.0371678E−02 | −3.0687085E−01 | 2.5765733E−01 | −4.4869042E−02 |

| | A7 | A8 | A9 | A10 |
|---|---|---|---|---|
| 2 | 4.5598385E−01 | −3.0441507E+00 | 3.2674864E+00 | −1.1941450E+00 |
| 3 | 2.6307727E+00 | −2.7796186E+00 | 1.7484350E+00 | −4.9742062E−01 |
| 4 | 3.6144214E+00 | −4.4595721E+00 | 2.8857622E+00 | −7.2873259E−01 |
| 5 | 7.4852455E−01 | −8.4685505E−01 | 4.9805435E−01 | −1.1389497E−01 |
| 6 | 4.2817255E−01 | −1.2729765E+00 | 9.8807208E−01 | −2.6882197E−01 |
| 7 | 3.1052905E−01 | −5.5569490E−01 | 2.8075950E−01 | −4.6409291E−02 |
| 8 | 1.0135427E−01 | −2.6373098E−01 | 1.5573774E−01 | −3.9316461E−02 |
| 9 | −8.4708525E−03 | 7.3330429E−02 | −1.7175602E−02 | −2.4506589E−03 |
| 10 | 1.1277689E−02 | −1.1337105E−02 | 3.7187319E−03 | −4.4182931E−04 |
| 11 | −6.4778776E−02 | 4.6012052E−02 | −1.2086196E−02 | 1.1751847E−03 |

TABLE 31

Example 16•Basic Lens Data

| | Si (Surface Number) | Ri (Radius of Curvature) | Di (Surface Spacing) | Ndj (Refractive Index) | vdj (Abbe Number) |
|---|---|---|---|---|---|
| | 1 (Aperture Diaphragm) | — | −0.0900 | | |
| G1 | 2 | 2.2279 | 0.5907 | 1.53339 | 55.9 |
| | 3 | −7.2322 | 0.1000 | | |
| G2 | 4 | 7.2754 | 0.4000 | 1.63351 | 23.6 |
| | 5 | 2.0149 | 0.3371 | | |
| G3 | 6 | 3.7883 | 0.6688 | 1.53339 | 55.9 |
| | 7 | 7.6158 | 0.4281 | | |
| G4 | 8 | 43.6578 | 0.7001 | 1.53339 | 55.9 |
| | 9 | −0.9580 | 0.1194 | | |
| G5 | 10 | 558580.9912 | 0.4092 | 1.53339 | 55.9 |
| | 11 | 0.8143 | 0.6000 | | |
| GC | 12 | ∞ | 0.1450 | 1.51633 | 64.1 |
| | 13 | ∞ | 0.3248 | | |

TABLE 32

Example 16•Aspheric Surface Data

| Surface Number | Coefficient | | | | |
|---|---|---|---|---|---|
| | K | A3 | A4 | A5 | A6 |
| 2 | 1.8729162E+00 | −2.3586076E−02 | 1.5308152E−01 | −7.3235520E−01 | 9.8106328E−01 |
| 3 | 0.0000000E+00 | 3.7217122E−02 | −4.5557019E−01 | 1.1405553E+00 | −1.9153754E+00 |
| 4 | 0.0000000E+00 | 4.2101295E−02 | −5.2538303E−01 | 1.1975733E+00 | −2.0645021E+00 |
| 5 | 4.0032008E−01 | 4.0270556E−02 | −4.2510985E−01 | 6.7167749E−01 | −6.2851946E−01 |
| 6 | −1.5272729E+01 | −1.1676267E−01 | 3.6131519E−02 | −1.4449499E−01 | 4.6849697E−01 |
| 7 | −1.9088869E+02 | −2.9803578E−02 | 2.2067882E−01 | −5.9205115E−01 | 3.5297515E−01 |
| 8 | 9.9000009E+01 | −7.1101939E−02 | 3.8691194E−01 | −7.1711711E−01 | 3.8846939E−01 |
| 9 | −9.1175474E+00 | −3.3254367E−01 | 2.8022113E−01 | −3.3607845E−02 | −1.1493754E−01 |
| 10 | 9.9000009E+01 | −1.8374606E−01 | −8.0785485E−02 | 1.0567675E−01 | −1.8894293E−02 |
| 11 | −7.4286456E+00 | 7.1679168E−02 | −3.0963839E−01 | 2.6313901E−01 | −4.6587700E−02 |

| | A7 | A8 | A9 | A10 |
|---|---|---|---|---|
| 2 | 4.6414066E−01 | −3.0272747E+00 | 3.2663425E+00 | −1.2054217E+00 |
| 3 | 2.6157610E+00 | −2.7996188E+00 | 1.7545735E+00 | −4.6618815E−01 |
| 4 | 3.6132917E+00 | −4.4625864E+00 | 2.8854537E+00 | −7.2119946E−01 |

TABLE 32-continued

Example 16•Aspheric Surface Data

| | | | | |
|---|---|---|---|---|
| 5 | 7.4651424E−01 | −8.4652744E−01 | 4.9940783E−01 | −1.0931416E−01 |
| 6 | 4.2668535E−01 | −1.2739221E+00 | 9.8842479E−01 | −2.6683262E−01 |
| 7 | 3.1162975E−01 | −5.5522686E−01 | 2.8024127E−01 | −4.7857605E−02 |
| 8 | 1.0177971E−01 | −2.6431898E−01 | 1.5603853E−01 | −3.8949403E−02 |
| 9 | −1.0541436E−02 | 7.2914584E−02 | −1.7082604E−02 | −2.2760671E−03 |
| 10 | 1.1173853E−02 | −1.1345850E−02 | 3.7336853E−03 | −4.1821476E−04 |
| 11 | −6.5107276E−02 | 4.5983343E−02 | −1.2100896E−02 | 1.1884476E−03 |

TABLE 33

Example 17•Basic Lens Data

| | Si (Surface Number) | Ri (Radius of Curvature) | Di (Surface Spacing) | Ndj (Refractive Index) | νdj (Abbe Number) |
|---|---|---|---|---|---|
| | 1 (Aperture Diaphragm) | — | −0.0900 | | |
| G1 | 2 | 2.2898 | 0.5711 | 1.53339 | 55.9 |
| | 3 | −7.6537 | 0.1000 | | |
| G2 | 4 | 5.5006 | 0.4000 | 1.63351 | 23.6 |
| | 5 | 1.9134 | 0.3702 | | |
| G3 | 6 | 4.1964 | 0.5971 | 1.53339 | 55.9 |
| | 7 | 7.0536 | 0.4539 | | |
| G4 | 8 | 11.9420 | 0.7130 | 1.53339 | 55.9 |
| | 9 | −0.9331 | 0.1000 | | |
| G5 | 10 | −100.5627 | 0.4000 | 1.53339 | 55.9 |
| | 11 | 0.7982 | 0.6000 | | |
| GC | 12 | ∞ | 0.1450 | 1.51633 | 64.1 |
| | 13 | ∞ | 0.3748 | | |

TABLE 34

Example 17•Aspheric Surface Data

| Surface Number | Coefficient | | | | |
|---|---|---|---|---|---|
| | K | A3 | A4 | A5 | A6 |
| 2 | 2.0147359E+00 | −2.2798893E−02 | 1.4768487E−01 | −7.1772744E−01 | 9.6819267E−01 |
| 3 | 0.0000000E+00 | 3.6252967E−02 | −4.5270318E−01 | 1.1423778E+00 | −1.9281776E+00 |
| 4 | 0.0000000E+00 | 4.3760477E−02 | −5.3118961E−01 | 1.1929172E+00 | −2.0697569E+00 |
| 5 | 2.7727140E−01 | 4.4895969E−02 | −4.2848844E−01 | 6.6412287E−01 | −6.3281281E−01 |
| 6 | −4.1928155E+00 | −1.7819259E−02 | 1.4872921E−02 | −4.1443682E−01 | 4.6976883E−01 |
| 7 | −2.3514629E+02 | −4.7734029E−02 | 2.1868179E−01 | −5.9202923E−01 | 3.5327985E−01 |
| 8 | 2.5145033E+01 | −1.0042372E−01 | 3.6076073E−01 | −6.8867494E−01 | 3.8316439E−01 |
| 9 | −9.0479536E+00 | −3.3501337E−01 | 2.8261077E−01 | −6.3805570E−02 | −1.1321755E−01 |
| 10 | 3.0219121E+01 | −1.4922776E−01 | −8.1362898E−02 | 1.0384088E−01 | −2.0176707E−02 |
| 11 | −7.4666569E+00 | 9.6707826E−02 | −3.2653742E−01 | 2.6505296E−01 | −4.7136718E−02 |

| | A7 | A8 | A9 | A10 |
|---|---|---|---|---|
| 2 | 4.6878645E−01 | −3.0149166E+00 | 3.2361401E+00 | −1.1871206E+00 |
| 3 | 2.6201081E+00 | −2.7800577E+00 | 1.7224149E+00 | −4.4966791E−01 |
| 4 | 3.6101160E+00 | −4.4579922E+00 | 2.8888274E+00 | −7.2255891E−01 |
| 5 | 7.4847896E−01 | −8.4648689E−01 | 5.0028969E−01 | −1.0912531E−01 |
| 6 | 4.2920970E−01 | −1.2736308E+00 | 9.8850186E−01 | −2.6761898E−01 |
| 7 | 3.0953154E−01 | −5.5565194E−01 | 2.8022312E−01 | −4.7558694E−02 |
| 8 | 9.5449287E−02 | −2.6309408E−01 | 1.5656682E−01 | −3.8914161E−02 |
| 9 | −1.1205081E−02 | 7.4265063E−02 | −1.7125198E−02 | −2.6288498E−03 |
| 10 | 1.1123319E−02 | −1.1406522E−02 | 3.7622483E−03 | −4.0467100E−04 |
| 11 | −6.4542042E−02 | 4.6082328E−02 | −1.2127605E−02 | 1.1785153E−03 |

TABLE 35

Example 18·Basic Lens Data

| | Si (Surface Number) | Ri (Radius of Curvature) | Di (Surface Spacing) | Ndj (Refractive Index) | vdj (Abbe Number) |
|---|---|---|---|---|---|
| | 1 (Aperture Diaphragm) | — | −0.0900 | | |
| G1 | 2 | 2.3040 | 0.6135 | 1.53339 | 55.9 |
| | 3 | −6.8075 | 0.1000 | | |
| G2 | 4 | 6.4941 | 0.4000 | 1.63351 | 23.6 |
| | 5 | 1.9424 | 0.2988 | | |
| G3 | 6 | 4.0780 | 0.6792 | 1.53339 | 55.9 |
| | 7 | 7.1151 | 0.4200 | | |
| G4 | 8 | 8.6196 | 0.7552 | 1.53339 | 55.9 |
| | 9 | −0.9322 | 0.1000 | | |
| G5 | 10 | −100.5627 | 0.4000 | 1.53339 | 55.9 |
| | 11 | 0.7886 | 0.6000 | | |
| GC | 12 | ∞ | 0.1450 | 1.51633 | 64.1 |
| | 13 | ∞ | 0.3080 | | |

TABLE 36

Example 18·Aspheric Surface Data

| Surface Number | Coefficient | | | | |
|---|---|---|---|---|---|
| | K | A3 | A4 | A5 | A6 |
| 2 | 1.7151314E+00 | −2.3986918E−02 | 1.5546836E−01 | −7.2060390E−01 | 9.7628244E−01 |
| 3 | 0.0000000E+00 | 3.8938342E−02 | −4.4331923E−01 | 1.1372510E+00 | −1.9339345E+00 |
| 4 | 0.0000000E+00 | 4.8125657E−02 | −5.2820766E−01 | 1.1922697E+00 | −2.0694693E+00 |
| 5 | 2.2307198E−01 | 3.9886777E−02 | −4.2606604E−01 | 6.6550901E−01 | −6.3126196E−01 |
| 6 | −4.6481673E−01 | −2.5329943E−02 | 1.5269358E−02 | −4.0820564E−01 | 4.7041382E−01 |
| 7 | −1.1932709E+02 | −7.3615091E−02 | 2.4465636E−01 | −5.8969496E−01 | 3.5455742E−01 |
| 8 | 2.1911407E+01 | −1.1538105E−01 | 3.5158670E−01 | −6.8056923E−01 | 3.8855437E−01 |
| 9 | −8.7034365E+00 | −3.4555186E−01 | 2.8460466E−01 | −3.6104352E−02 | −1.1272721E−01 |
| 10 | 9.9000009E+01 | −1.4183302E−01 | −8.2787211E−02 | 1.0335492E−01 | −2.0190172E−02 |
| 11 | −6.5221361E+00 | 8.1500911E−02 | −3.0830557E−01 | 2.6257524E−01 | −4.9101008E−02 |

| | A7 | A8 | A9 | A10 |
|---|---|---|---|---|
| 2 | 4.7203939E−01 | −3.0216224E+00 | 3.2174872E+00 | −1.1617476E+00 |
| 3 | 2.6188399E+00 | −2.7773103E+00 | 1.7248295E+00 | −4.4894389E−01 |
| 4 | 3.6038968E+00 | −4.4598855E+00 | 2.8896800E+00 | −7.2059833E−01 |
| 5 | 7.4931771E−01 | −8.4648372E−01 | 5.0065725E−01 | −1.0954063E−01 |
| 6 | 4.2715720E−01 | −1.2747167E+00 | 9.8821402E−01 | −2.6649856E−01 |
| 7 | 3.0868770E−01 | −5.5609035E−01 | 2.7995204E−01 | −4.7782863E−02 |
| 8 | 9.5692470E−02 | −2.6395686E−01 | 1.5663789E−01 | −3.8453309E−02 |
| 9 | −1.0810819E−02 | 7.4741520E−02 | −1.7141745E−02 | −2.7866666E−03 |
| 10 | 1.1236887E−02 | −1.1417151E−02 | 3.7469834E−03 | −3.9956100E−04 |
| 11 | −6.4552783E−02 | 4.6518435E−02 | −1.2176635E−02 | 1.1665936E−03 |

TABLE 37

Example 19·Basic Lens Data

| | Si (Surface Number) | Ri (Radius of Curvature) | Di (Surface Spacing) | Ndj (Refractive Index) | vdj (Abbe Number) |
|---|---|---|---|---|---|
| | 1 (Aperture Diaphragm) | — | −0.0900 | | |
| G1 | 2 | 2.1660 | 0.6667 | 1.53339 | 55.9 |
| | 3 | −5.8837 | 0.1000 | | |

TABLE 37-continued

Example 19•Basic Lens Data

| | Si (Surface Number) | Ri (Radius of Curvature) | Di (Surface Spacing) | Ndj (Refractive Index) | vdj (Abbe Number) |
|---|---|---|---|---|---|
| G2 | 4 | 558580.9912 | 0.4000 | 1.63351 | 23.6 |
| | 5 | 2.4538 | 0.2857 | | |
| G3 | 6 | 2.9865 | 0.5307 | 1.53339 | 55.9 |
| | 7 | 5.0625 | 0.4746 | | |
| G4 | 8 | 18.7120 | 0.8577 | 1.53339 | 55.9 |
| | 9 | −0.9138 | 0.1000 | | |
| G5 | 10 | −100.5627 | 0.4000 | 1.53339 | 55.9 |
| | 11 | 0.7978 | 0.6000 | | |
| GC | 12 | ∞ | 0.1450 | 1.51633 | 64.1 |
| | 13 | ∞ | 0.3142 | | |

TABLE 38

Example 19•Aspheric Surface Data

| Surface Number | Coefficient | | | | |
|---|---|---|---|---|---|
| | K | A3 | A4 | A5 | A6 |
| 2 | 1.2492125E+00 | −2.0981952E−02 | 1.4756664E−01 | −6.9140498E−01 | 9.5678373E−01 |
| 3 | 0.0000000E+00 | 5.7266456E−02 | −4.4640876E−01 | 1.1302470E+00 | −1.9252378E+00 |
| 4 | 0.0000000E+00 | 6.5455621E−02 | −5.1310470E−01 | 1.1919353E+00 | −2.0731629E+00 |
| 5 | 5.8102636E−01 | 4.3345866E−02 | −4.1598765E−01 | 6.7157841E−01 | −6.2722055E−01 |
| 6 | −7.6365449E−01 | −3.9914131E−02 | 2.5067033E−03 | −4.1089131E−01 | 4.6806182E−01 |
| 7 | −3.0143566E+01 | −9.4404860E−02 | 2.6213345E−01 | −5.9145749E−01 | 3.5430731E−01 |
| 8 | 5.7933767E+01 | −1.1709812E−01 | 3.4918988E−01 | −6.6944508E−01 | 3.8083661E−01 |
| 9 | −8.8277900E+00 | −3.7446619E−01 | 2.8477205E−01 | −2.8954856E−02 | −1.1267364E−01 |
| 10 | −1.0100001E+02 | −1.3887680E−01 | −8.9244228E−02 | 1.0346234E−01 | −1.9962592E−02 |
| 11 | −7.8042352E+00 | 1.4392592E−01 | −3.6253078E−01 | 2.7728859E−01 | −4.8100105E−02 |

| | A7 | A8 | A9 | A10 |
|---|---|---|---|---|
| 2 | 4.7523980E−01 | −3.0036373E+00 | 3.1783615E+00 | −1.1349255E+00 |
| 3 | 2.6134939E+00 | −2.7832453E+00 | 1.7333332E+00 | −4.4966254E−01 |
| 4 | 3.6001749E+00 | −4.4592577E+00 | 2.8905357E+00 | −7.1884833E−01 |
| 5 | 7.5048150E−01 | −8.4782680E−01 | 4.9957146E−01 | −1.0797177E−01 |
| 6 | 4.2729816E−01 | −1.2792470E+00 | 9.8775732E−01 | −2.6386556E−01 |
| 7 | 3.0745979E−01 | −5.5568904E−01 | 2.8033145E−01 | −4.8279617E−02 |
| 8 | 9.7423620E−02 | −2.6018505E−01 | 1.5813380E−01 | −3.9648741E−02 |
| 9 | −1.2966063E−02 | 7.3182648E−02 | −1.7037980E−02 | −2.1483954E−03 |
| 10 | 1.1173986E−02 | −1.1239020E−02 | 3.7568703E−03 | −4.1712204E−04 |
| 11 | −6.4964138E−02 | 4.6313830E−02 | −1.2160475E−02 | 1.1761599E−03 |

TABLE 39

Example 20•Basic Lens Data

| | Si (Surface Number) | Ri (Radius of Curvature) | Di (Surface Spacing) | Ndj (Refractive Index) | vdj (Abbe Number) |
|---|---|---|---|---|---|
| | 1 (Aperture Diaphragm) | — | −0.0900 | | |
| G1 | 2 | 2.1269 | 0.6769 | 1.53339 | 55.9 |
| | 3 | −6.0016 | 0.1139 | | |
| G2 | 4 | −100.5630 | 0.4000 | 1.63351 | 23.6 |
| | 5 | 2.5810 | 0.2868 | | |
| G3 | 6 | 2.8399 | 0.4702 | 1.53339 | 55.9 |
| | 7 | 4.3444 | 0.4971 | | |

TABLE 39-continued

Example 20•Basic Lens Data

| | Si (Surface Number) | Ri (Radius of Curvature) | Di (Surface Spacing) | Ndj (Refractive Index) | vdj (Abbe Number) |
|---|---|---|---|---|---|
| G4 | 8 | 25.5552 | 0.7951 | 1.53339 | 55.9 |
| | 9 | −0.8804 | 0.1000 | | |
| G5 | 10 | −100.5528 | 0.4037 | 1.53339 | 55.9 |
| | 11 | 0.7745 | 0.6000 | | |
| GC | 12 | ∞ | 0.1450 | 1.51633 | 64.1 |
| | 13 | ∞ | 0.2934 | | |

TABLE 40

Example 20•Aspheric Surface Data

| Surface Number | Coefficient | | | | |
|---|---|---|---|---|---|
| | K | A3 | A4 | A5 | A6 |
| 2 | 1.2011551E+00 | −2.0272771E−02 | 1.4530931E−01 | −6.8865009E−01 | 9.4479363E−01 |
| 3 | 0.0000000E+00 | 4.9796051E−02 | −4.3658787E−01 | 1.1293108E+00 | −1.9362557E+00 |
| 4 | 0.0000000E+00 | 6.1992468E−02 | −4.9832564E−01 | 1.1935492E+00 | −2.0782344E+00 |
| 5 | 1.1567029E+00 | 4.3922163E−02 | −4.0835275E−01 | 6.7677201E−01 | −6.3224053E−01 |
| 6 | −2.9474992E+00 | −4.5389608E−02 | −6.8468940E−04 | −4.0825979E−01 | 4.7292311E−01 |
| 7 | −6.0376562E+01 | −7.6246916E−02 | 2.6055534E−01 | −5.9300581E−01 | 3.5401796E−01 |
| 8 | 9.9000009E+01 | −1.2878228E−01 | 3.5557797E−01 | −6.7093298E−01 | 3.8580060E−01 |
| 9 | −8.5757861E+00 | −3.8855959E−01 | 2.9395924E−01 | −2.5888722E−02 | −1.1934256E−01 |
| 10 | 9.9000009E+01 | −1.0927478E−01 | −1.0215156E−01 | 1.0090834E−01 | −2.0019183E−02 |
| 11 | −6.9768321E+00 | 1.3107494E−01 | −3.6075626E−01 | 2.8029376E−01 | −4.8782467E−02 |

| | A7 | A8 | A9 | A10 |
|---|---|---|---|---|
| 2 | 4.8552932E−01 | −2.9993292E+00 | 3.1800112E+00 | −1.1439793E+00 |
| 3 | 2.6155305E+00 | −2.7760041E+00 | 1.7327806E+00 | −4.5321593E−01 |
| 4 | 3.5982499E+00 | −4.4600805E+00 | 2.8882248E+00 | −7.1565739E−01 |
| 5 | 7.5003534E−01 | −8.4867388E−01 | 4.9886702E−01 | −1.0665345E−01 |
| 6 | 4.2265614E−01 | −1.2790221E+00 | 9.8362989E−01 | −2.6047180E−01 |
| 7 | 3.0350280E−01 | −5.5572175E−01 | 2.8081397E−01 | −4.8525966E−02 |
| 8 | 9.5900856E−02 | −2.5920481E−01 | 1.5877628E−01 | −4.1193692E−02 |
| 9 | −1.2641601E−02 | 7.3647747E−02 | −1.7056495E−02 | −1.8890357E−03 |
| 10 | 1.1217168E−02 | −1.0960196E−02 | 3.7391862E−03 | −4.3036836E−04 |
| 11 | −6.5343260E−02 | 4.6501508E−02 | −1.2190611E−02 | 1.1723720E−03 |

TABLE 41

Example 21•Basic Lens Data

| | Si (Surface Number) | Ri (Radius of Curvature) | Di (Surface Spacing) | Ndj (Refractive Index) | vdj (Abbe Number) |
|---|---|---|---|---|---|
| | 1 (Aperture Diaphragm) | — | −0.0900 | | |
| G1 | 2 | 2.0658 | 0.6788 | 1.53339 | 55.9 |
| | 3 | −6.2163 | 0.1000 | | |
| G2 | 4 | −50.2674 | 0.3310 | 1.63351 | 23.6 |
| | 5 | 2.6725 | 0.3044 | | |
| G3 | 6 | 2.8387 | 0.4589 | 1.53339 | 55.9 |
| | 7 | 4.2429 | 0.5170 | | |
| G4 | 8 | −216.3501 | 0.8355 | 1.53339 | 55.9 |
| | 9 | −0.7610 | 0.0401 | | |
| G5 | 10 | −100.5612 | 0.4394 | 1.53339 | 55.9 |
| | 11 | 0.6798 | 0.6000 | | |

TABLE 41-continued

Example 21•Basic Lens Data

| | Si (Surface Number) | Ri (Radius of Curvature) | Di (Surface Spacing) | Ndj (Refractive Index) | vdj (Abbe Number) |
|---|---|---|---|---|---|
| GC { | 12 | ∞ | 0.1450 | 1.51633 | 64.1 |
| | 13 | ∞ | 0.3309 | | |

TABLE 42

Example 21•Aspheric Surface Data

| Surface Number | Coefficient | | | | |
|---|---|---|---|---|---|
| | K | A3 | A4 | A5 | A6 |
| 2 | 9.7983185E−01 | −2.0928507E−02 | 1.5048158E−01 | −6.8844766E−01 | 9.2829710E−01 |
| 3 | 0.0000000E+00 | 5.9039033E−02 | −4.4964292E−01 | 1.1384768E+00 | −1.9496097E+00 |
| 4 | 0.0000000E+00 | 5.5125650E−02 | −4.8194974E−01 | 1.1930393E+00 | −2.0793076E+00 |
| 5 | 1.3722373E+00 | 3.1946852E−02 | −3.8976714E−01 | 6.8704255E−01 | −6.3435928E−01 |
| 6 | −3.3613762E+00 | −3.1290385E−02 | −1.7239555E−02 | −4.0915269E−01 | 4.8163440E−01 |
| 7 | −4.6272634E+01 | −7.5135192E−02 | 2.6725541E−01 | −5.9893473E−01 | 3.5176548E−01 |
| 8 | 7.0892647E+01 | −1.3099303E−01 | 3.7474121E−01 | −6.6667939E−01 | 3.8516249E−01 |
| 9 | −7.1353899E+00 | −3.6824076E−01 | 2.8704191E−01 | −1.8395930E−02 | −1.2578916E−01 |
| 10 | 9.9000009E+01 | −7.0901526E−02 | −1.1964067E−01 | 9.9511529E−02 | −2.0479411E−02 |
| 11 | −6.3241337E+00 | 1.2940771E−01 | −3.7430926E−01 | 2.9755403E−01 | −5.3710314E−02 |

| | A7 | A8 | A9 | A10 |
|---|---|---|---|---|
| 2 | 5.0746713E−01 | −3.0079463E+00 | 3.1826024E+00 | −1.1483315E+00 |
| 3 | 2.6142116E+00 | −2.7626620E+00 | 1.7347334E+00 | −4.6121151E−01 |
| 4 | 3.5965212E+00 | −4.4585621E+00 | 2.8894459E+00 | −7.1629568E−01 |
| 5 | 7.4125459E−01 | −8.4636735E−01 | 4.9775299E−01 | −1.0341602E−01 |
| 6 | 4.1611264E−01 | −1.2770478E+00 | 9.7842763E−01 | −2.5743128E−01 |
| 7 | 3.0241827E−01 | −5.5269182E−01 | 2.8371704E−01 | −5.0667457E−02 |
| 8 | 8.1981642E−02 | −2.5547368E−01 | 1.6069683E−01 | −4.0550803E−02 |
| 9 | −1.1235797E−02 | 7.0042921E−02 | −1.6381227E−02 | −1.4686312E−03 |
| 10 | 1.1065772E−02 | −1.0523248E−02 | 3.7349127E−03 | −4.5451797E−04 |
| 11 | −6.5842452E−02 | 4.6454649E−02 | −1.1985409E−02 | 1.1364979E−03 |

Other Data of Examples

Table 43 shows values of the above-mentioned Conditional Expressions (1) to (4) and (5A) to (5C) collected in accordance with the respective examples. As can be seen from Table 43, the respective examples satisfy at least one of the Conditional Expressions. Table 43 shows data representing F number (FNO.).

TABLE 43

Values relating to Conditional Expressions

| | Examples | | | | | | | | | | |
|---|---|---|---|---|---|---|---|---|---|---|---|
| | 1 | 2 | 3 | 4 | 5 | 6 | 7 | 8 | 9 | 10 | 11 |
| FNO. | 2.80 | 2.80 | 2.80 | 2.80 | 2.80 | 2.2 | 2.1 | 2 | 2.2 | 2.2 | 2.2 |
| f | 7.95 | 7.85 | 5.86 | 7.96 | 7.85 | 3.64 | 3.54 | 3.53 | 3.65 | 3.70 | 3.63 |
| f1 | 6.17 | 6.01 | 4.87 | 6.95 | 6.26 | 3.31 | 3.34 | 3.30 | 3.39 | 4.03 | 4.09 |
| f2 | −8.28 | −8.31 | −7.41 | −10.99 | −8.28 | −4.60 | −4.62 | −4.51 | −4.76 | −5.47 | −5.38 |
| f3 | 22.08 | 28.01 | 10.75 | 20.48 | 23.17 | 14.33 | 12.44 | 13.29 | 12.45 | 11.97 | 11.00 |
| f4 | 3.16 | 4.99 | 3.39 | 8.56 | 3.42 | 2.24 | 2.32 | 2.39 | 2.45 | 2.40 | 2.39 |
| D6 | 0.72 | 0.71 | 0.94 | 0.83 | 0.77 | 0.55 | 0.57 | 0.47 | 0.54 | 0.51 | 0.49 |
| D7 | 1.49 | 1.30 | 1.13 | 1.33 | 1.48 | 0.45 | 0.47 | 0.47 | 0.42 | 0.51 | 0.54 |
| f/f1 | 1.29 | 1.31 | 1.20 | 1.15 | 1.25 | 1.10 | 1.06 | 1.07 | 1.08 | 0.92 | 0.89 |
| vd2 | 23.3 | 23.3 | 23.3 | 23.3 | 23.3 | 23.6 | 23.6 | 23.6 | 23.6 | 23.6 | 23.6 |

| | 12 | 13 | 14 | 15 | 16 | 17 | 18 | 19 | 20 | 21 |
|---|---|---|---|---|---|---|---|---|---|---|
| FNO. | 2.2 | 2.2 | 2.2 | 2.2 | 2.2 | 2.2 | 2 | 2 | 2 | 2 |
| f | 3.69 | 3.66 | 3.81 | 3.58 | 3.66 | 3.64 | 3.56 | 3.60 | 3.52 | 3.54 |
| f1 | 4.02 | 3.60 | 3.84 | 3.75 | 3.26 | 3.37 | 3.33 | 3.06 | 3.03 | 2.99 |
| f2 | −6.00 | −4.77 | −5.21 | −5.21 | −4.53 | −4.84 | −4.55 | −3.87 | −3.97 | −4.00 |
| f3 | 8.55 | 7.79 | 9.54 | 8.09 | 13.32 | 18.11 | 16.73 | 12.54 | 13.87 | 14.44 |
| f4 | 2.02 | 1.97 | 1.92 | 1.97 | 1.77 | 1.65 | 1.63 | 1.66 | 1.61 | 1.43 |

TABLE 43-continued

| Values relating to Conditional Expressions | | | | | | | | | |
|---|---|---|---|---|---|---|---|---|---|
| D6 | 0.65 | 0.39 | 0.62 | 0.55 | 0.67 | 0.60 | 0.68 | 0.53 | 0.47 | 0.46 |
| D7 | 0.47 | 0.79 | 0.50 | 0.56 | 0.43 | 0.45 | 0.42 | 0.47 | 0.50 | 0.52 |
| f/f1 | 0.92 | 1.02 | 0.99 | 0.95 | 1.12 | 1.08 | 1.07 | 1.18 | 1.16 | 1.18 |
| vd2 | 23.6 | 23.6 | 23.6 | 23.6 | 23.6 | 23.6 | 23.6 | 23.6 | 23.6 | 23.6 |

Aberration Performances

FIGS. 22A to 22C show spherical aberration, astigmatism, and distortion in the imaging lens according to numerical Example 1, respectively. In the aberration diagrams, there are aberrations at the C-line (a wavelength 656.27 nm) and the F-line (a wavelength 486.13 nm) when the d-line is set as a reference wavelength. In the astigmatism diagram, the reference sign (S) represents aberrations in the sagittal direction, and the reference sign (T) represents aberrations in the tangential direction. The ω represents a half angle of view. In FIG. 22A, the vertical axis represents a diameter (m) of the entrance pupil.

Figure 21:
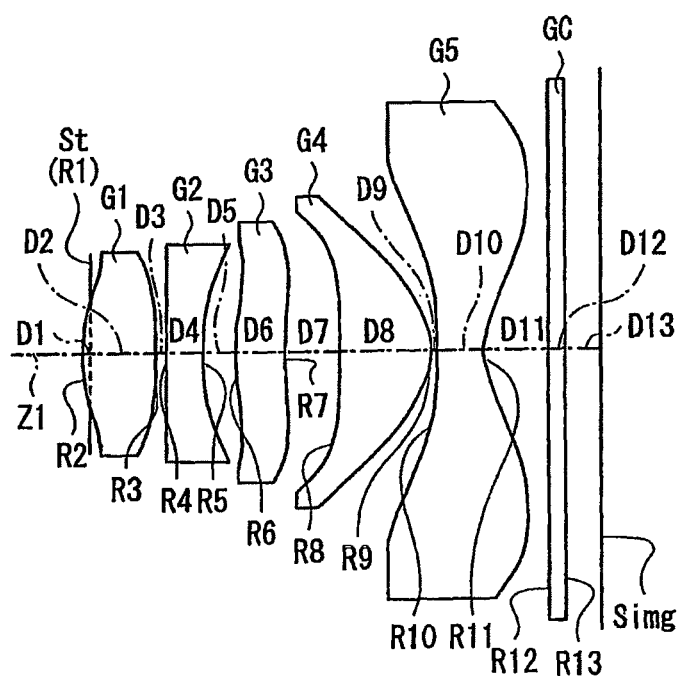
FIG. 21 is a sectional diagram illustrating a twenty first exemplary configuration of the imaging lens, corresponding to Example 21.
Figures 23A, 23B, 23C:
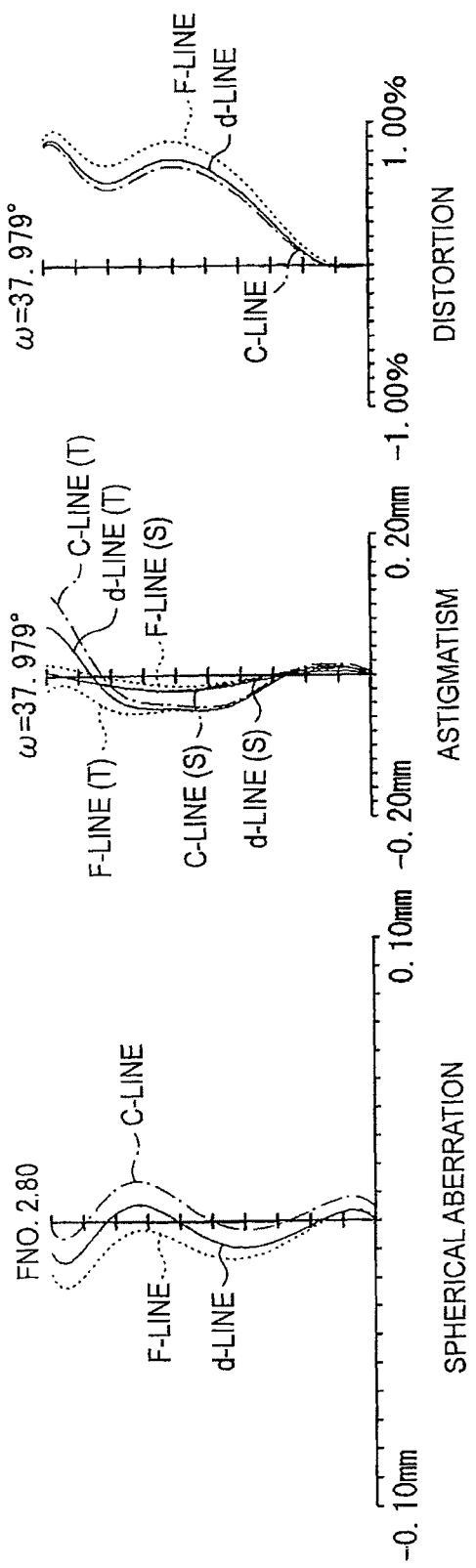
FIGS. 23A to 23C are aberration diagrams illustrating aberrations of the imaging lens according to Example 2, where
Figures 24A, 24B, 24C:
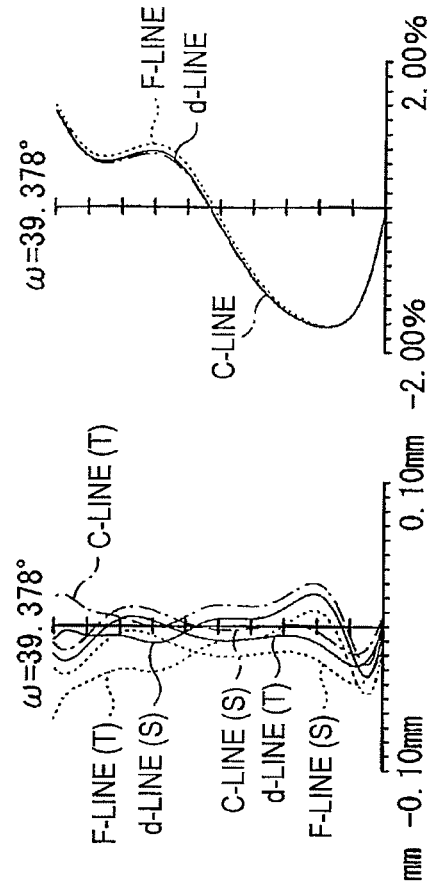
FIGS. 24A to 24C are aberration diagrams illustrating aberrations of the imaging lens according to Example 3, where
Figures 25A, 25B, 25C:
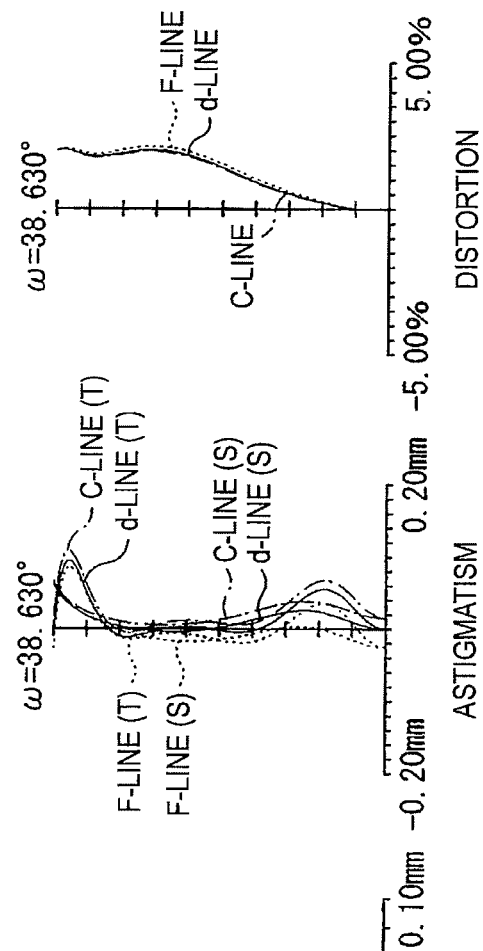
FIGS. 25A to 25C are aberration diagrams illustrating aberrations of the imaging lens according to Example 4, where
Figures 27A, 27B, 27C:
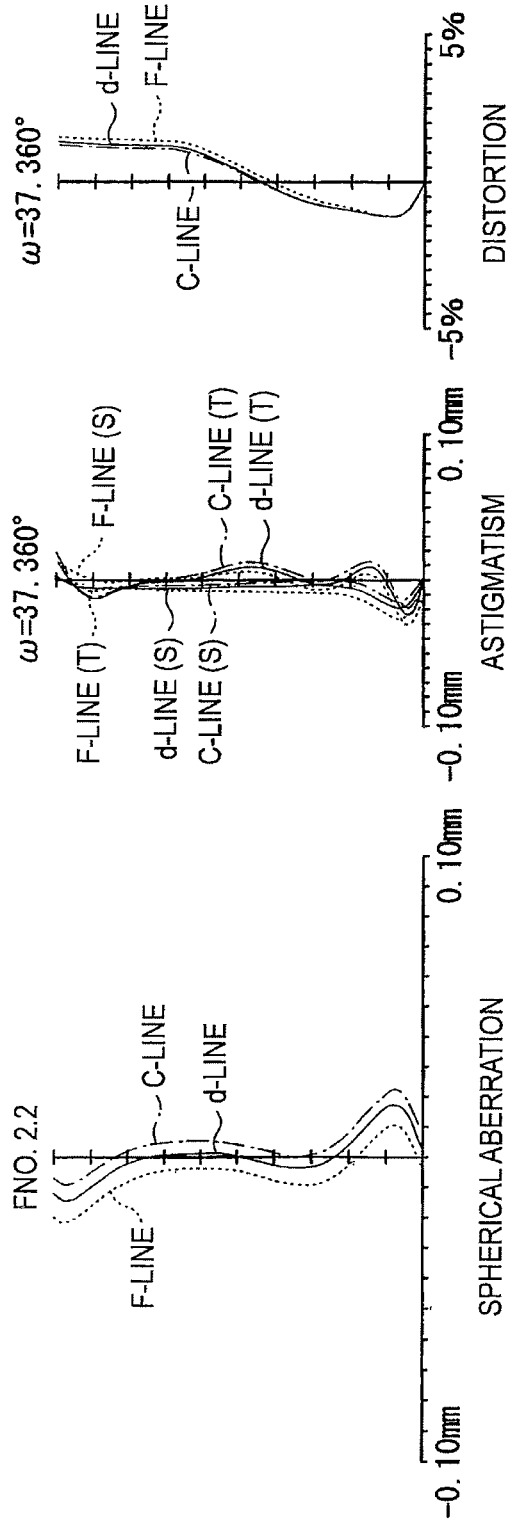
FIGS. 27A to 27C are aberration diagrams illustrating aberrations of the imaging lens according to Example 6, where
Figures 28A, 28B, 28C:
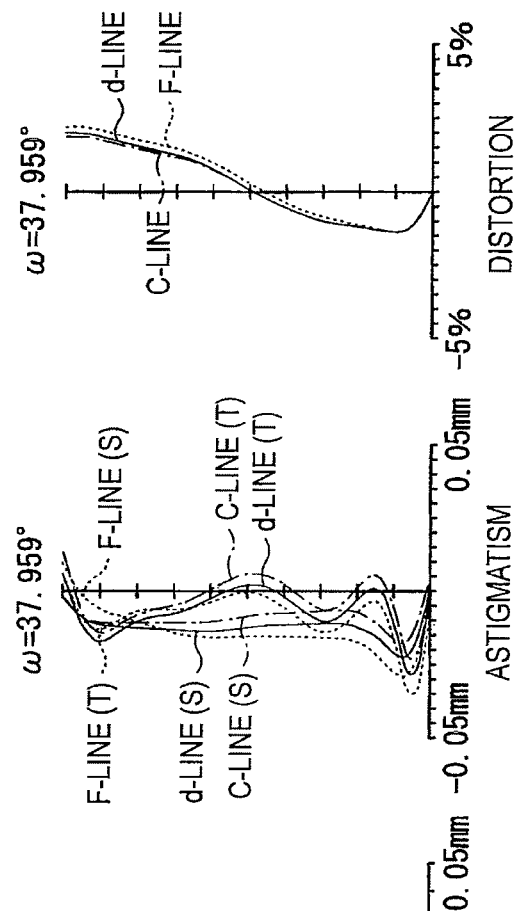
FIGS. 28A to 28C are aberration diagrams illustrating aberrations of the imaging lens according to Example 7, where
Figure 29A:
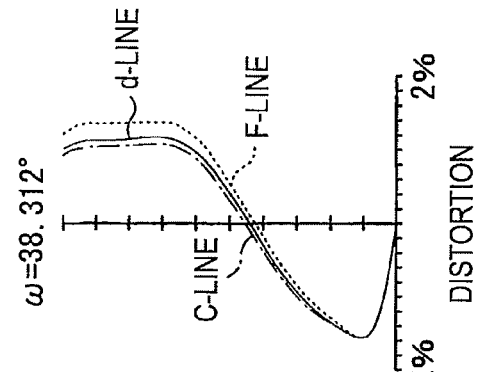
FIGS. 29A to 29C are aberration diagrams illustrating aberrations of the imaging lens according to Example 8, where
Figure 29B:
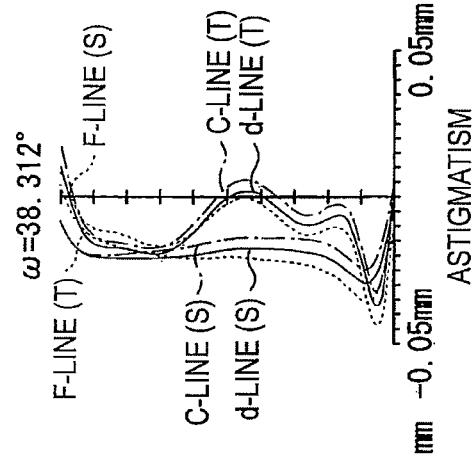
Figure 29C:
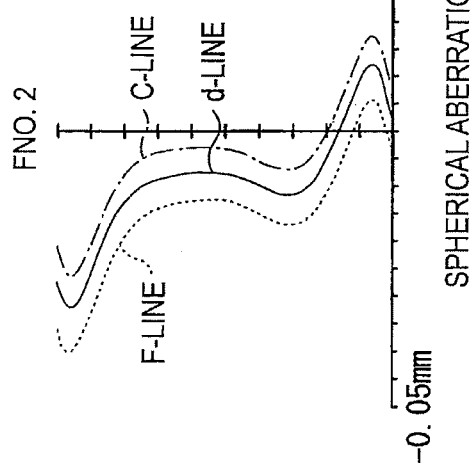
Figures 30A, 30B, 30C:
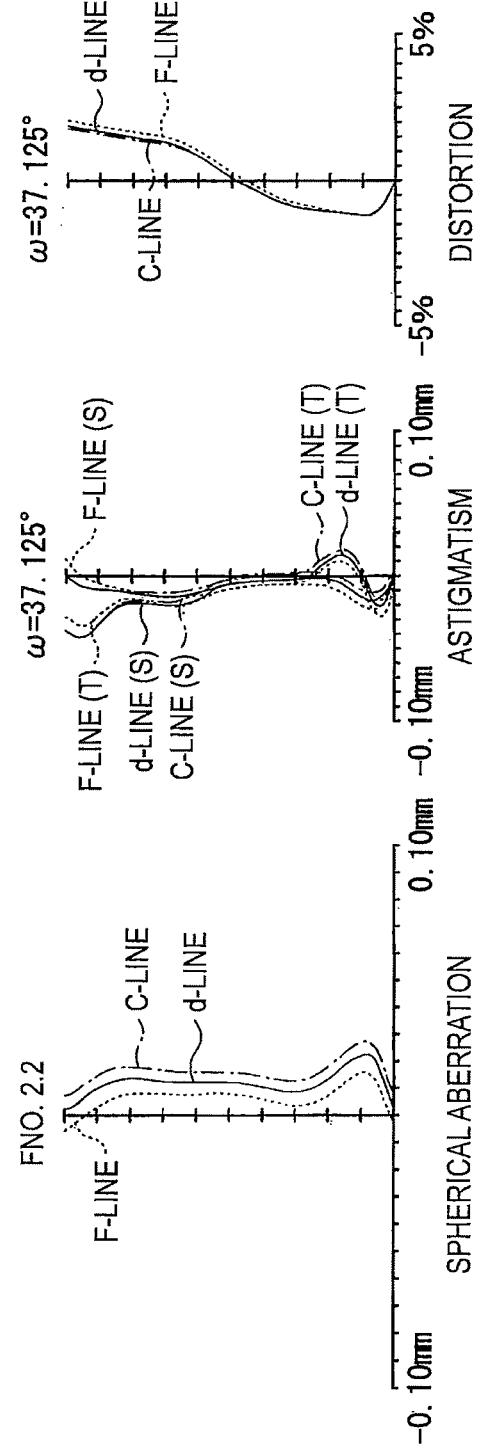
FIGS. 30A to 30C are aberration diagrams illustrating aberrations of the imaging lens according to Example 9, where
Figure 31C:
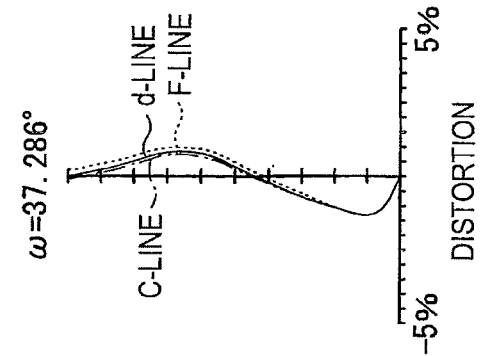
FIGS. 31A to 31C are aberration diagrams illustrating aberrations of the imaging lens according to Example 10, where
Figure 31B:
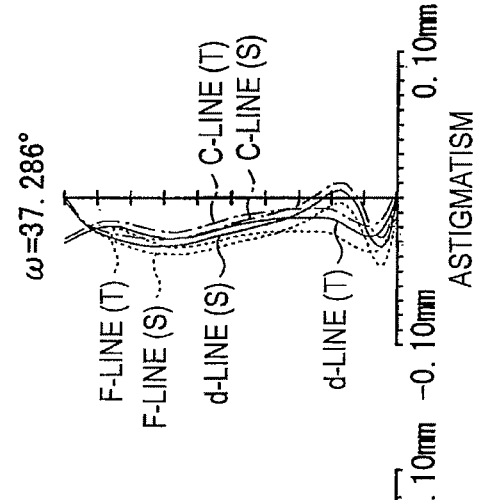
Figure 31A:
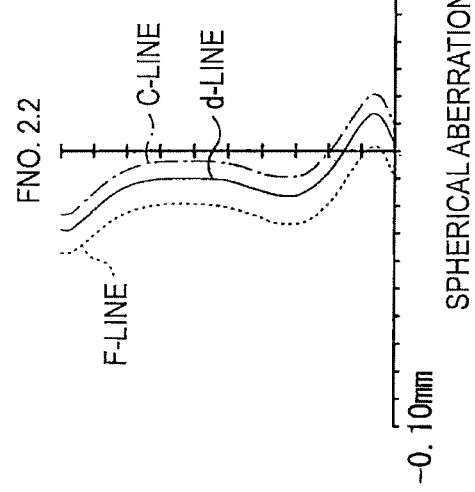
Figures 32A, 32B, 32C:
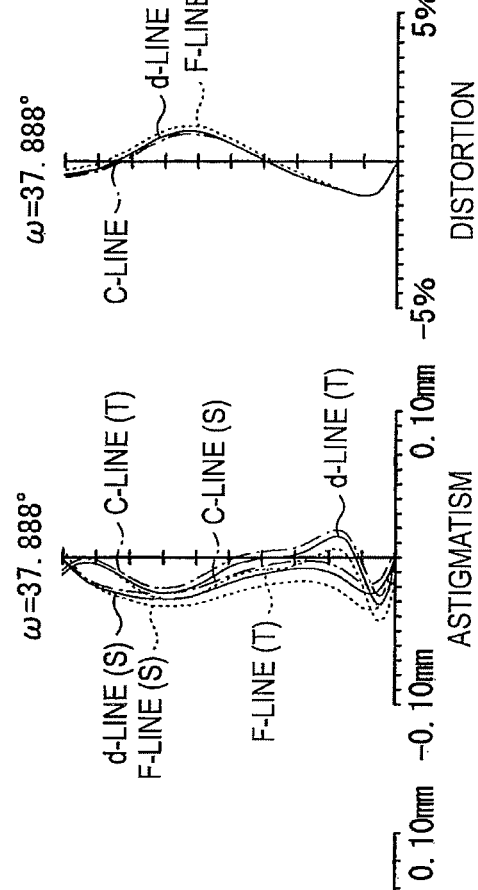
FIGS. 32A to 32C are aberration diagrams illustrating aberrations of the imaging lens according to Example 11, where
Figures 33A, 33B, 33C:
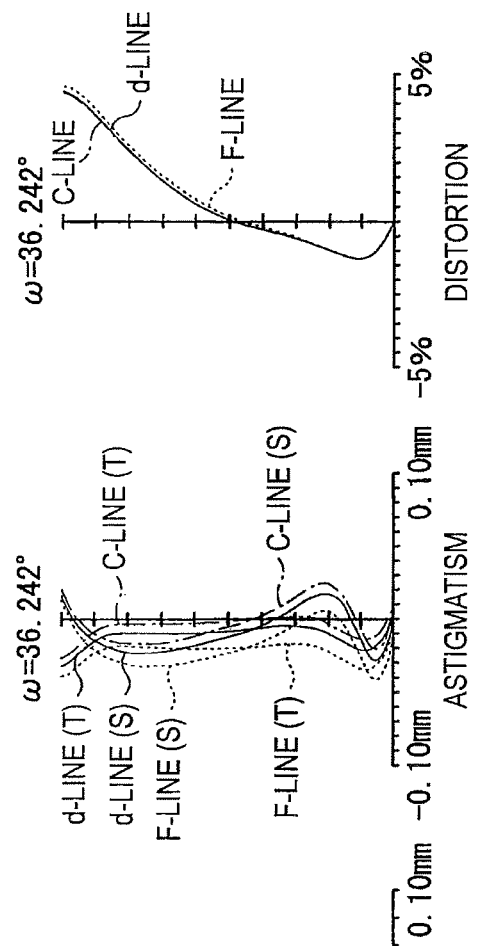
FIGS. 33A to 33C are aberration diagrams illustrating aberrations of the imaging lens according to Example 12, where
Figure 34A:
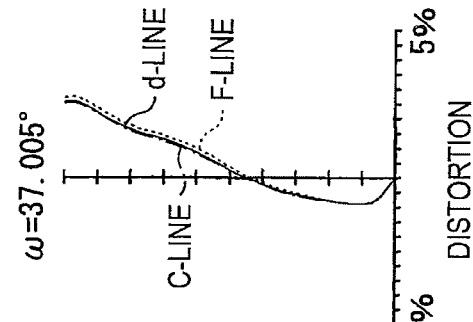
FIGS. 34A to 34C are aberration diagrams illustrating aberrations of the imaging lens according to Example 13, where
Figure 34B:
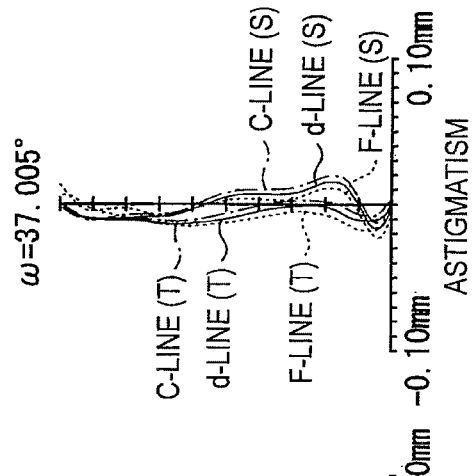
Figure 34C:
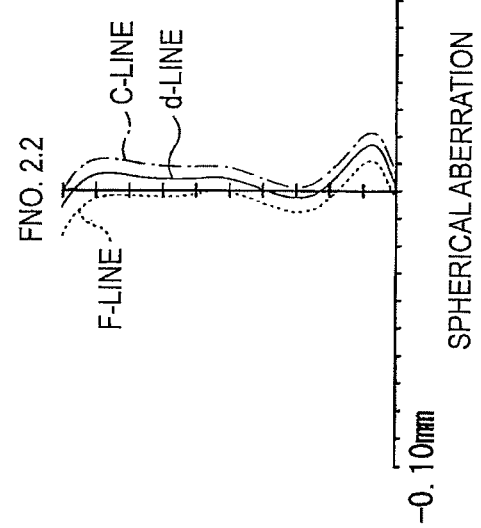
Figures 37A, 37B, 37C:
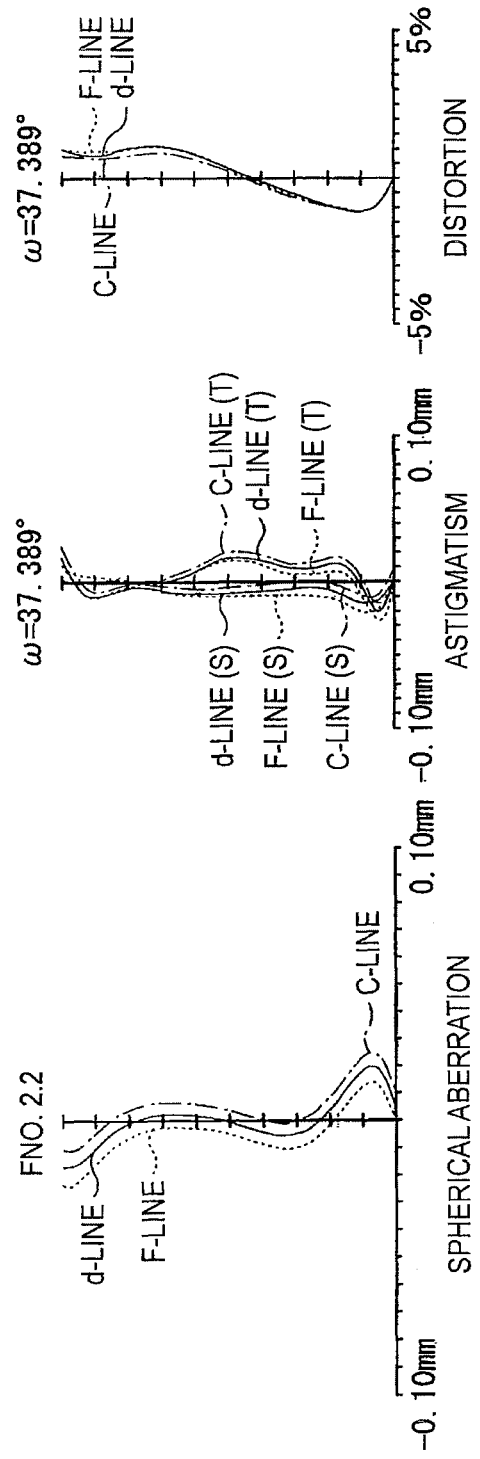
FIGS. 37A to 37C are aberration diagrams illustrating aberrations of the imaging lens according to Example 16, where
Figure 39C:
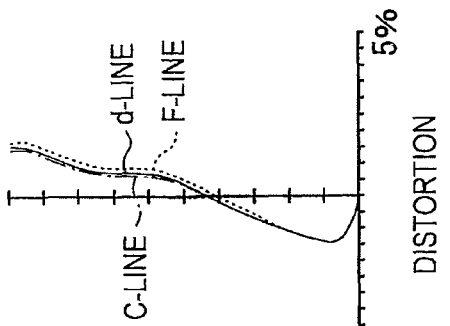
FIGS. 39A to 39C are aberration diagrams illustrating aberrations of the imaging lens according to Example 18, where
Figure 39B:
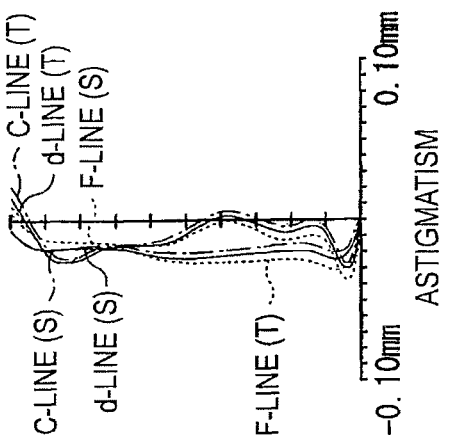
Figure 39A:
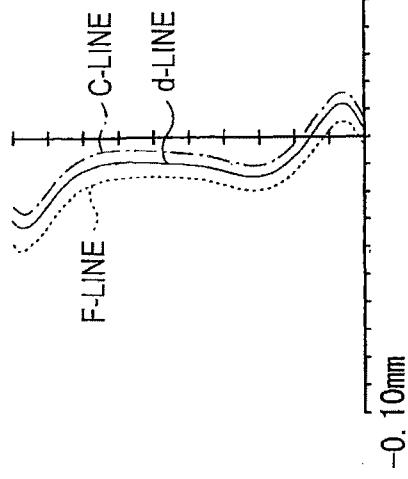
Figures 40A, 40B, 40C:
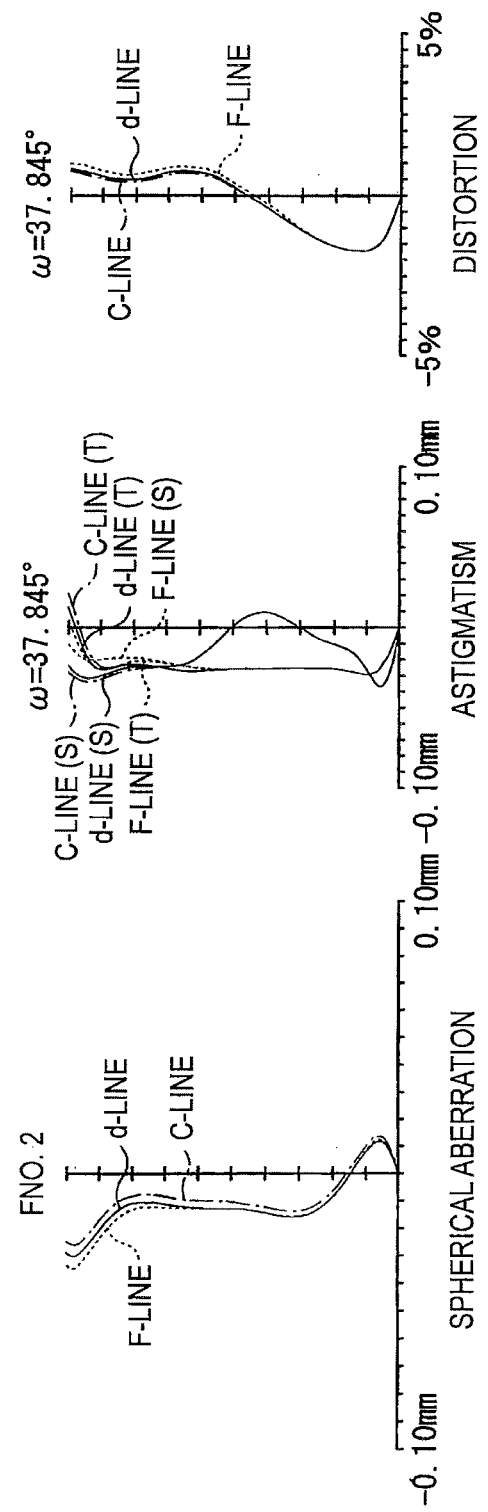
FIGS. 40A to 40C are aberration diagrams illustrating aberrations of the imaging lens according to Example 19, where
Figure 41A:
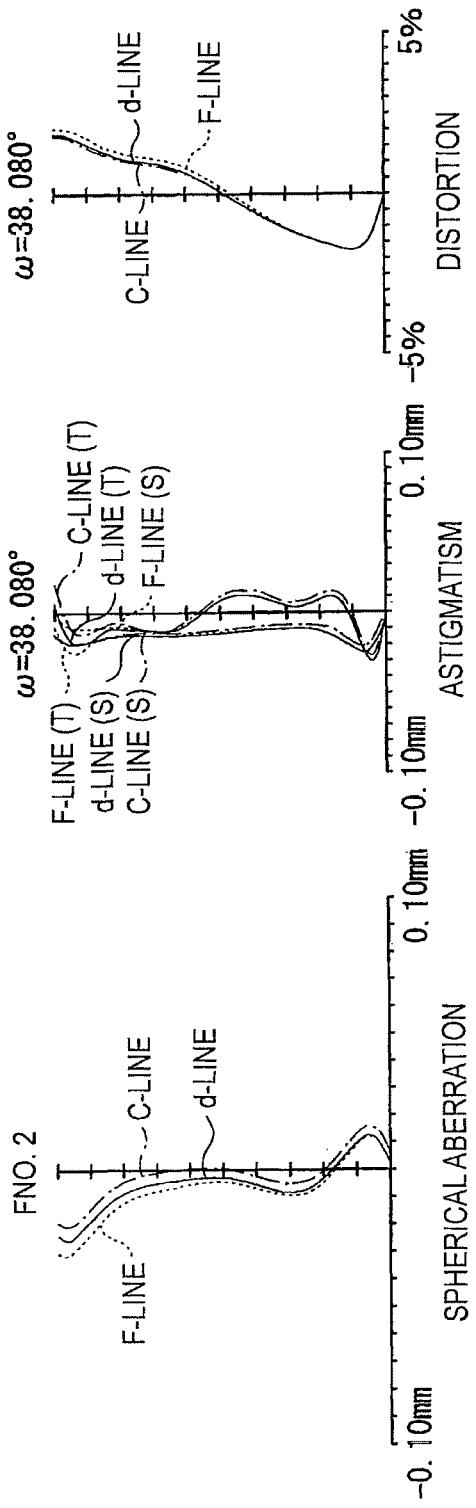
FIGS. 41A to 41C are aberration diagrams illustrating aberrations of the imaging lens according to Example 20, where
Figure 41B:
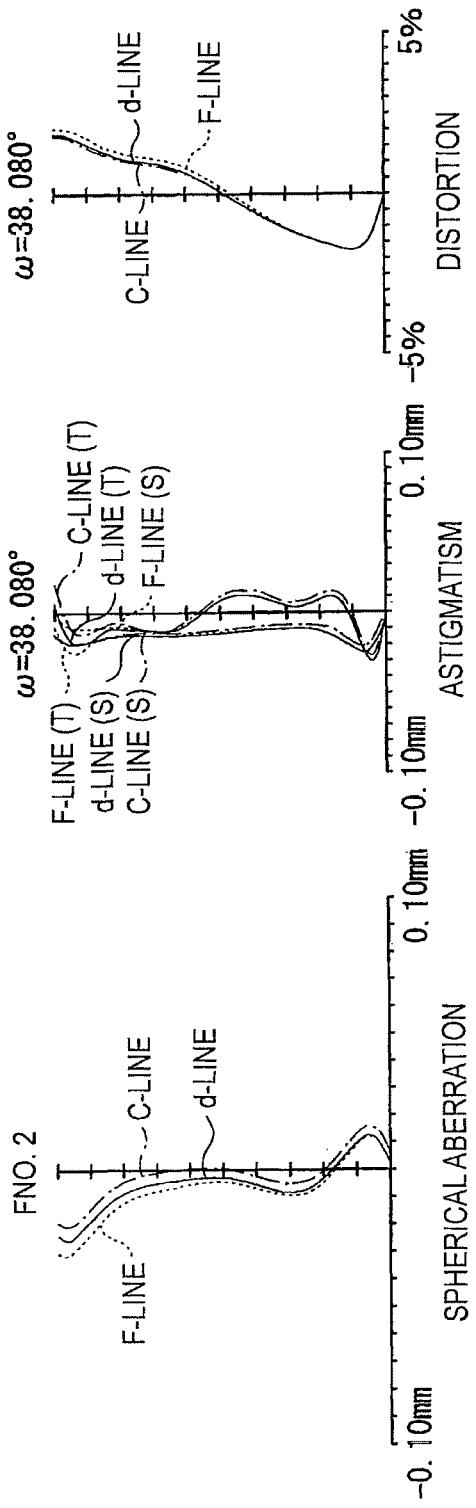
Figure 41C:
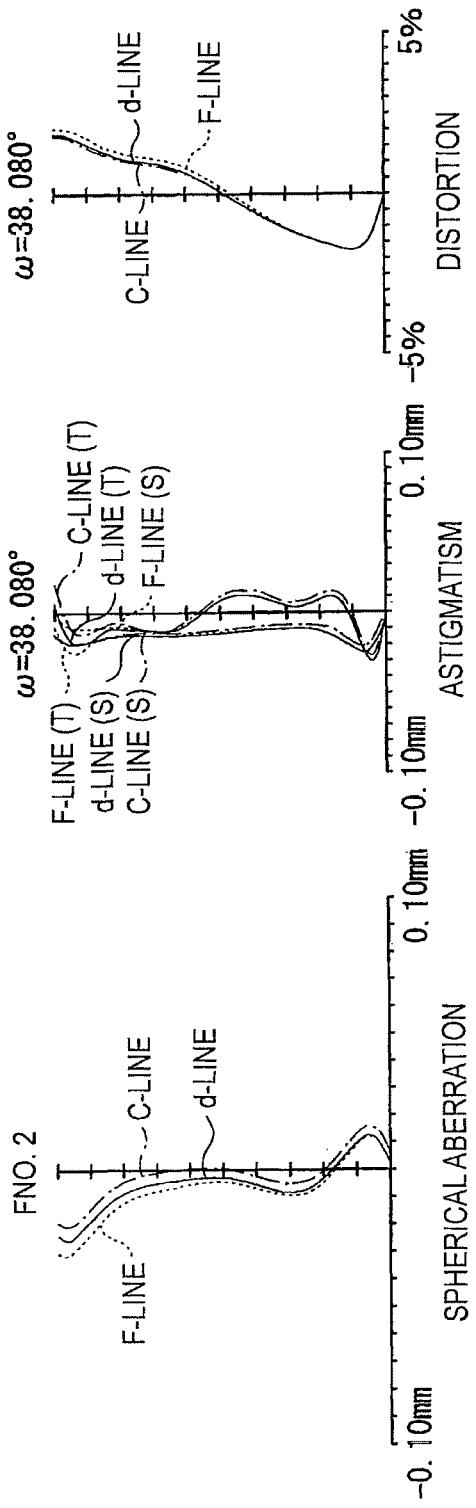
Figures 42A, 42B, 42C:
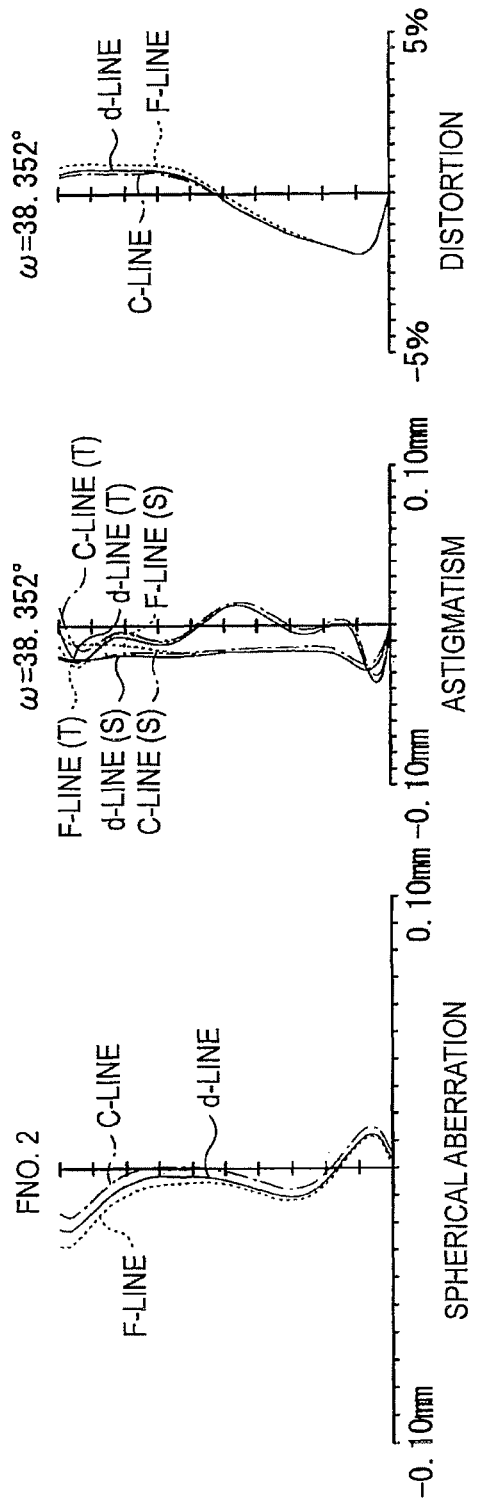

Likewise, FIGS. 23A to 23C show various aberrations in the imaging lens according to Example 2. Likewise, FIGS. 24A to 24C to FIGS. 42A to 42C show various aberrations in the imaging lens according to Examples 3 to 21. Furthermore, in FIGS. 39(B) and 39(C), the vertical axis represents the image height Y (mm).

As can be seen from the numerical data and the aberration diagrams mentioned above, with the lens configuration using a total of five elements, the imaging lens with high resolution performance is embodied in accordance with each of the examples.

In addition, the invention is not limited to the embodiments and the examples, and may be modified to various forms. For example, the values of the radius of curvature, the on-axis surface spacing, the refractive index, and the like of the lens components are not limited to the values shown in the numerical examples, and may have different values.

What is claimed is:

1. An imaging lens comprising: in order from an object side,
   a first lens having a positive refractive power;
   a second lens having a negative refractive power;
   a third lens having a concave surface on an image side near an optical axis thereof and having a positive refractive power;
   a fourth lens having a positive refractive power near the optical axis thereof; and
   a fifth lens having a negative refractive power near the optical axis thereof, wherein an image side surface of the fifth lens is concave near the optical axis and has a region where a negative power of the region decreases toward a periphery of the fifth lens as compared with a negative power near the optical axis,
   wherein the following conditional expression is further satisfied:

$$vd2<35 \quad (4)$$

wherein vd2 is an Abbe number of the second lens at the d-line.

2. The imaging lens according to claim 1, wherein an object side surface of the first lens is convex toward the object side near the optical axis, and an image side surface of the fourth lens is convex toward an image side near the optical axis.

3. The imaging lens according to claim 1, wherein the fifth lens is biconcave near the optical axis.

4. The imaging lens according to claim 1, wherein the following conditional expression is satisfied:

$$D7>D6 \quad (1)$$

wherein D6 is a thickness of the third lens on the optical axis, and D7 is an air space between the third lens and the fourth lens on the optical axis.

5. The imaging lens according to claim 1, wherein the following conditional expression is further satisfied:

$$0.8<f/f1<1.5 \quad (2)$$

wherein f1 is a focal length of the first lens, and f is a focal length of the imaging system.

6. The imaging lens according to claim 1, wherein the following conditional expression is further satisfied:

$$f1<|f2|<f3 \quad (3)$$

wherein f1 is a focal length of the first lens, f2 is a focal length of the second lens, and f3 is a focal length of the third lens.

7. The imaging lens according to claim 1, wherein the following conditional expression is satisfied:

$$f4<f1 \quad (5A)$$

$$f4<|f2| \quad (5B)$$

$$f4<f3 \quad (5C)$$

wherein f1 is a focal length of the first lens, f2 is a focal length of the second lens, f3 is a focal length of the third lens, and f4 is a focal length of the fourth lens.

8. The imaging lens according to claim 1, wherein both surfaces in each of the first lens, the second lens, the third lens, the fourth lens, and the fifth lens are aspheric.

9. The imaging lens according to claim 1, wherein an object side surface of the fifth lens is aspheric and has an inflection point in an effective diameter thereof.

10. The imaging lens according to claim 1, wherein the image side surface of the fifth lens has an aspheric shape having an inflection point in the effective diameter thereof.

11. The imaging lens according to claim 1, wherein the image side surface of the fifth lens is aspheric and has a local maximum or minimum point at a position other than the optical axis in the effective diameter thereof.

12. An imaging apparatus comprising:
   an imaging lens according to claim 1; and
   an imaging device for outputting an imaging signal based on an optical image formed by the imaging lens.

13. The imaging apparatus according to claim 12, wherein the imaging device has a pixel number of 2 mega or more and has a pixel pitch of 3 μm or less.

14. A portable terminal device comprising:
   an imaging apparatus according to claim 12; and
   a display unit that displays an image taken by the imaging apparatus.

* * * * *